US005457643A

United States Patent [19]
Vahey et al.

[11] Patent Number: 5,457,643
[45] Date of Patent: Oct. 10, 1995

[54] POCKET ELECTRONIC DATA RETRIEVAL DEVICE ALLOWING ACCESS TO COMPRESSED DATA ON A MEMORY CHIP WITH UNIQUE INTERCHANGEABLE CHIP CARRIER

[75] Inventors: John Vahey; John S. Campbell; Gerald van Mourik; Jonathon M. Schmidt, all of Laguna Hills, Calif.

[73] Assignee: AChip Technologies, Inc., Irvine, Calif.

[21] Appl. No.: 934,966

[22] Filed: Aug. 25, 1992

[51] Int. Cl.$^6$ .................................................. G06F 17/30
[52] U.S. Cl. .............................. 364/708.1; 364/715.07; 364/260.6; 364/285.4; 364/DIG. 2; 395/600
[58] Field of Search ..................... 395/600; 341/55; 364/705.6, 708.1, 715.02, 260.6, 285.4

[56] References Cited

U.S. PATENT DOCUMENTS

| | | | |
|---|---|---|---|
| 4,251,696 | 2/1981 | MacKenzie et al. | 179/103 |
| 4,295,181 | 8/1981 | Chang et al. | 361/395 |
| 4,742,478 | 5/1988 | Negro, Jr. et al. | 361/680 |
| 5,000,689 | 3/1991 | Ishizuka et al. | 439/73 |
| 5,025,374 | 6/1991 | Rorzen et al. | 364/413.2 |
| 5,058,144 | 10/1991 | Feala et al. | 375/122 |
| 5,155,484 | 10/1992 | Chambers, IV | 341/55 |
| 5,276,317 | 1/1994 | Ozouf et al. | 235/486 |
| 5,291,785 | 3/1994 | Downs | 73/585 |
| 5,299,519 | 4/1994 | Herabayashe | 112/456 |

OTHER PUBLICATIONS

Gartmer et al., "Future Automated Test Equipment Portable Maintenance Aids"; Autotest Con '88 IEEE, 4–6 Oct. 1988, pp. 111–115.

Primary Examiner—Thomas G. Black
Assistant Examiner—Val R. Choules
Attorney, Agent, or Firm—Hawes & Fischer

[57] ABSTRACT

A compact electronic data retrieval device allowing access to compressed data stored on interchangeable ROM chips. The chips which can contain directories, manuals or other materials that may be available for convenient access. The chips which are not easily copied may be economically distributing. Interchangeability of the chips is enhanced by a novel chip replacement system. The chip replacement system enabling a precise and easy way for the user of an electronic device to change a computer chip which is utilized in the electronic device. The chip is mounted onto a removable door in a manner to ensure proper placement of the chip and that proper forces are utilized to fit it within a chip socket. This system is particularly applicable to electronic appliances where a computer chip is used to carry large amounts of data and replaced from time to time.

14 Claims, 40 Drawing Sheets

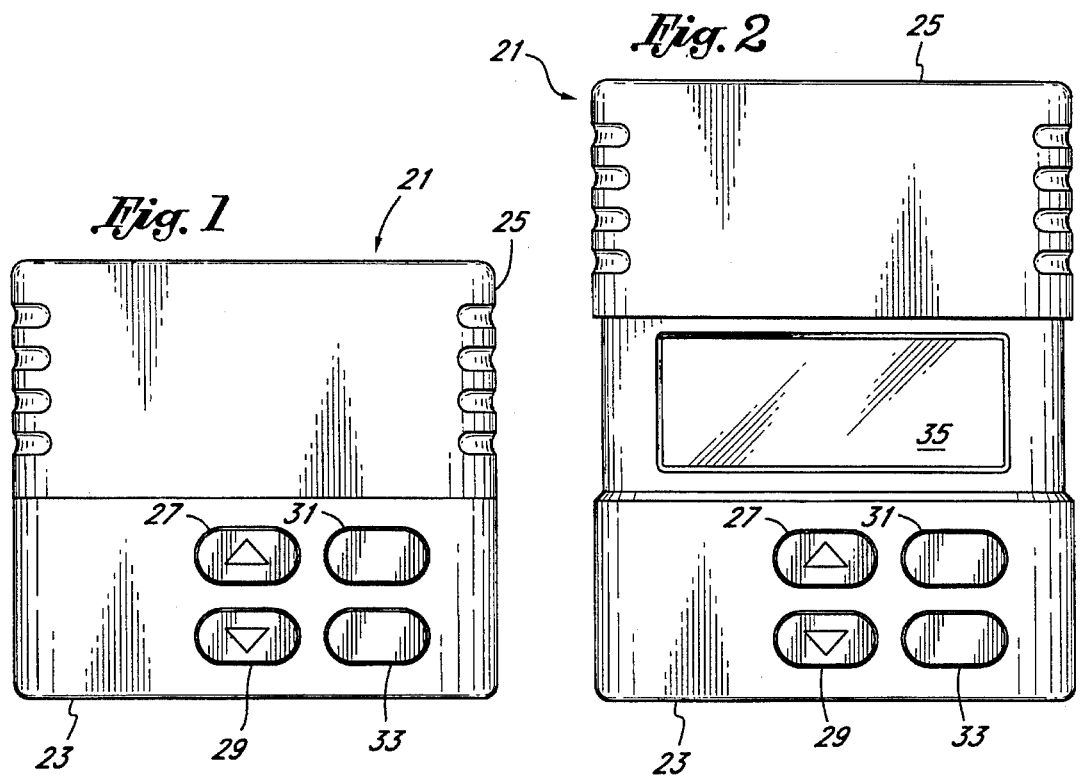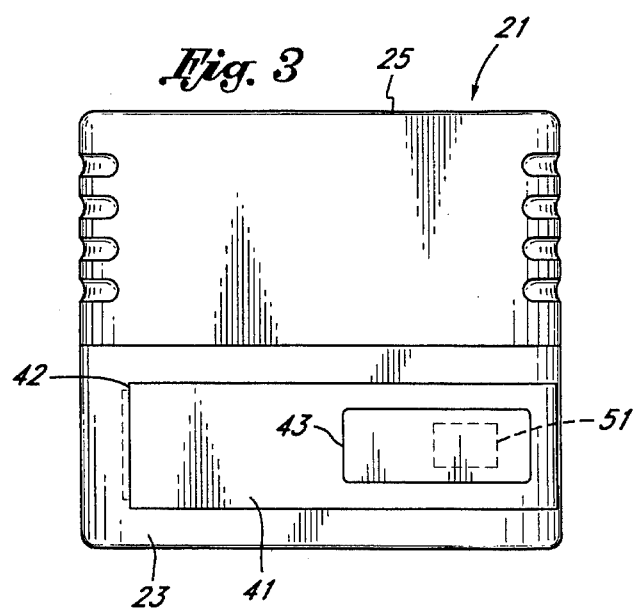

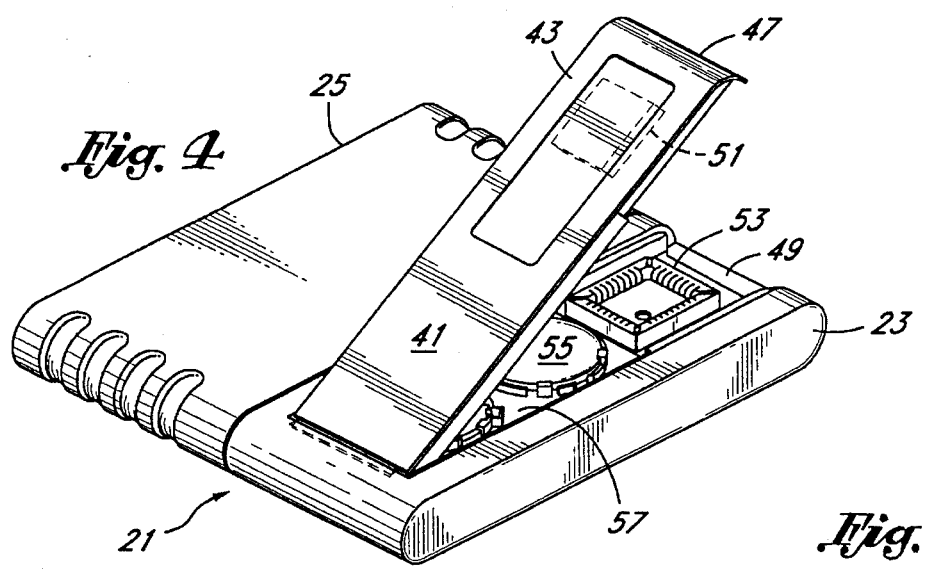
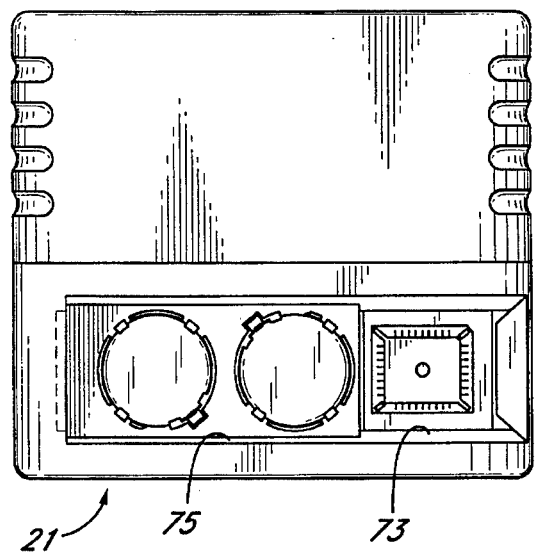
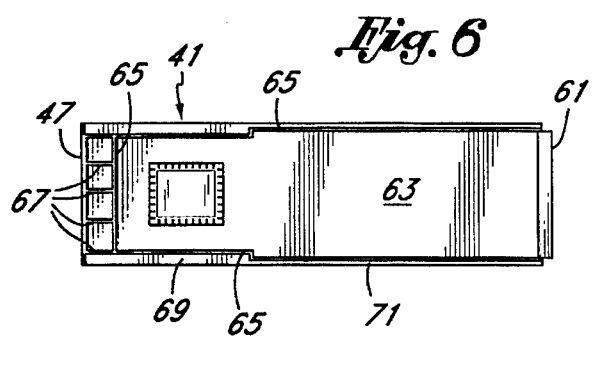
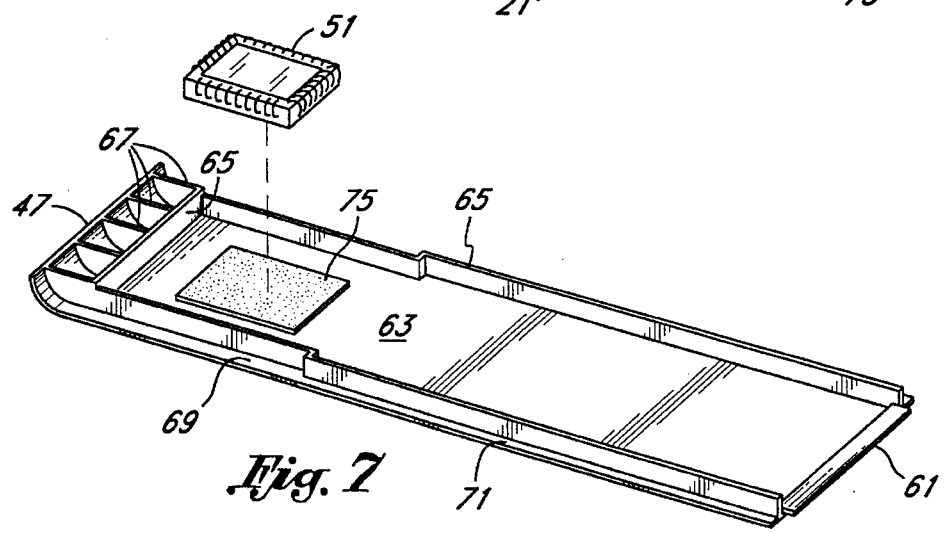

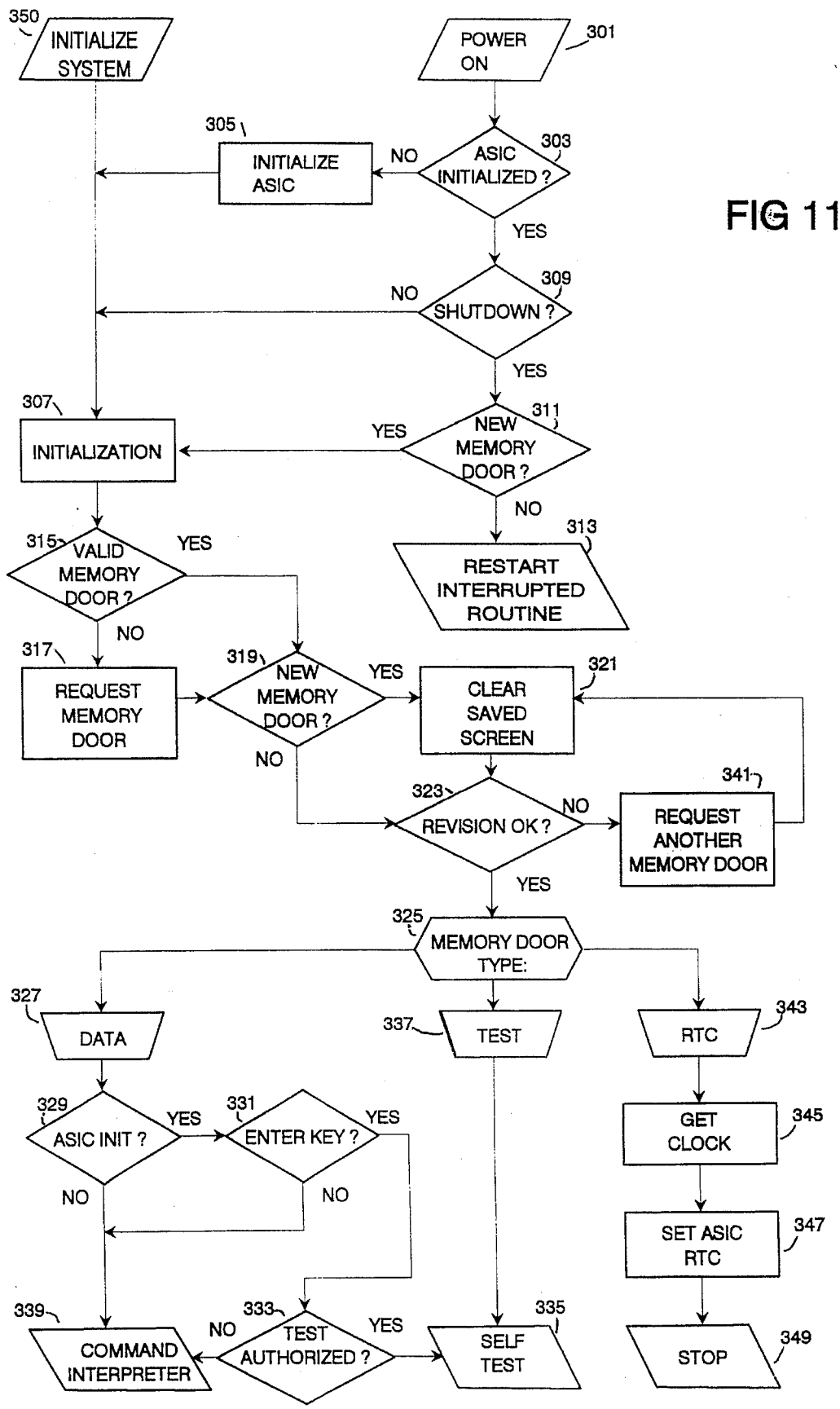

POCKET ELECTRONIC DATA RETRIEVAL DEVICE ALLOWING ACCESS TO COMPRESSED DATA ON A MEMORY CHIP WITH UNIQUE INTERCHANGEABLE CHIP CARRIER

FIELD OF THE INVENTION

The present invention relates to the field of portable electronic data retrieval devices. More specifically, the present invention relates to an electrical appliance and system for efficient distribution, interchange and control of information without the necessity for the generation and disposal of printed media by making the information available on a small electronic appliance having a replaceable chip and particularly to facilitate the efficient inexpensive updating of an information data base used by a large number of people.

BACKGROUND OF THE INVENTION

The increased need for rapid dissemination of standardized information is a product of the service economy. As computers have begun to serve this need, they have replaced paper media continuously since their popularization. Typically the information to be accessed by computer is on a large data base where the user selects a narrow area for viewing. In this instance, communication is usually made to a powerful computer by a modem using control information supplied by the user with actual control provided by the main computer.

The use of a computer in this manner pre-supposes the existence and accessibility structure for a large data base. The instrument utilized to access the data base is typically a personal computer. If a particular data base is not large enough and popular enough that a significant number of people want to utilize the data base, it is not economically feasible to make the data base available.

Smaller data bases can be popularly available through the use of software to be executed on a personal computer. The disadvantages inherent in this system of distribution is the loss of control over the information to be distributed, and the high cost portability. These problems are especially pronounced where the type of information and the users which are intended to receive the information occupy a more expansive position at the base of an organization's structure.

Bulk information supplied on a floppy disk can typically be accessed or copied at will. This is especially worrisome where the data or information is specific to a group and it is desired to keep the information confidential or controlled. For example, a company may wish to make its telephone list electronically available to the employees. This type of information is at the least sensitive, and most companies go to some lengths to avoid unintentional dissemination of this material. Where resort is had to paper media, the paper copies must be printed, shipped perhaps at substantial cost due to the weight involved, and distributed. When the paper media is to be replaced through updating, none of the old material may be re-used except through paper recycling. Collection of the old paper media requires assurance that disposal, regardless of whether re-cycling is involved, is secure from unauthorized access.

Portability is another issue, especially at the bottom of an organization's hierarchy. Not all organizations can afford a personal computer for its members, and not all members of an organization occupy an office position. Lap top computers which are more portable are quite expensive, thus further inhibiting the use of electronically stored data at the lower echelons of an organization.

One type of alternative device utilizable for maximum portability is the programmable personal directories and organizers which have user friendly software to enable the entry of a limited type and organization of data. Programmable personal directories have facilities for the entry of business names, addresses, and phone numbers.

Although user-friendly because of their limited data accessibility and abbreviated directory ability, these devices require a laborious effort for the manual entry of data. The entry is often made more laborious by the dearth and small size of the entry keys. The personal data bases built up over months and perhaps years could be accidentally erased upon power failure.

Re-entry of those data bases, even if the back up data were available, is impractical. For computerized data bases, the programmability of more complex organizational structure usually requires a level of expertise in excess of that found in the average user.

In both cases, the information and programming for a personal organizer could be electronically fed into the organizer with a modem, providing adequate input facilities were available on the organizer. However, attempting to individually feed a large number of personal organizers presents a logistical problem. Having to return a personal organizer to a central location for re-programming is burdensome. Further, the data transfer step may be error prone and time consuming. This process would be further limited where a large number of organizers had to be loaded one at a time, or a few at a time.

However, is known that changes in programming, especially changes in information combined with programming changes, can be provided in a replacement memory chip. For example, in many electronic game systems, chips having different game programs are removed and re-introduced to the game system by the plugging in and out of a game cartridge which is nothing more than a chip mounted on a plug-in board. In instances where a chip is soldered to a circuit board, interchangeability is best achieved though the use of interchangeable boards as in the case of a game system.

Interchangeability of a chip on a board requires disassembly of the electronic appliance, de-soldering of the old chip and re-soldering of the new chip. Given the present cost of labor, such a system is prohibitive. A plug-in chip and socket-could be employed, but disassembly of the outside cover of the electronic appliance would be necessary, perhaps in addition to special tooling to pry the old chip from its socket. A prying force is necessary since most chips are not available with handles or other structures for manual removal. This is especially true when the chips are also designed to take up as little room as necessary when mounted on a circuit board.

Further, a personal organizer would not be able to handle a wide variety of data chips because of the narrow accessibility afforded the limited directory programming available with those devices. Another significant limitation of the use of personal directories with information is the physical size of the chips required for a given level of data to be supplied.

What is needed is a method of using and accessing significant amounts of highly organized data in a system which provides for maximum portability and minimum cost in updating the information. The system should have a high density information capacity and cost significantly less than a laptop computer. The data should be controllable such that it should not be easily accessible by others. The data should be updatable in a controlled fashion without the need for bulky transport of new data nor secure disposal of old data.

SUMMARY OF THE INVENTION

The Pocket Electronic Communication System, hereafter directory, of the present invention is a personal electronic appliance which is battery powered and completely portable. The directory has an upper portion which is slidable to expose a screen for viewing and to trip an actuation switch to energize the directory. The system within the directory includes a replaceable data chip which works in conjunction with controller chips to access the data on the data chip.

The data is compressibly stored onto the data chip, along with information on the configuration in which the data is to be accessed. This is an important feature, both because of the amount of data which is needed for display even though the unit is pocket sized, but also because different types of data require different configurations of decision trees to enable a user to most quickly access the data.

The directory contains a chip replacement system where the chip is mounted in a rear access door of the directory. The closing action of the access door installs the chip mounted in the door. To effect a change of data, all that is needed is a new replacement door for the directory which contains an updated programmed chip. In this way, hundreds of electronic directories can be updated by simply distributing a lightweight chip-door assembly.

Since the operating system of the directory can recognize the chip-door assemblies connected to it, access to the data on the chip-door can be denied under a variety of circumstances including improper timing of the insertion of the replacement chip, an improper replacement chip for a particular directory, or the existence of an access code which is user required to allow entry. Further, the data and directory on the replacement chip is more protected due to the necessity for a decompression routine the logic of which is within the individual electronic directories.

BRIEF DESCRIPTION OF THE DRAWINGS

FIG. 1 is a front view of a directory of the present invention;

FIG. 2 is a front view of the directory shown in FIG. 1 in operating position with its display screen exposed;

FIG. 3 is a rear view of the directory of FIGS. 1 and 2 illustrating the door carrier system for computer chip replacement in a sealed position;

FIG. 4 is a perspective view of the pocket electronic communication system of FIG. 3 illustrating the pivoting removal of the door carrier;

FIG. 5 is a plan view of the compartment protected by the door carrier, including a chip socket and battery compartment;

FIG. 6 is a plan view of the door carrier, including a chip mounted thereon;

FIG. 7 is a perspective exploded view of the door carrier illustrating the structural detail of the door and the mounting of the chip onto the inside of the door.

FIG. 11, is a logic flowchart of power on startup sequence of the directory of FIGS. 1–10;

FIG. 39 is a logic flowchart of the GET TOKEN FROM

Figure 40:
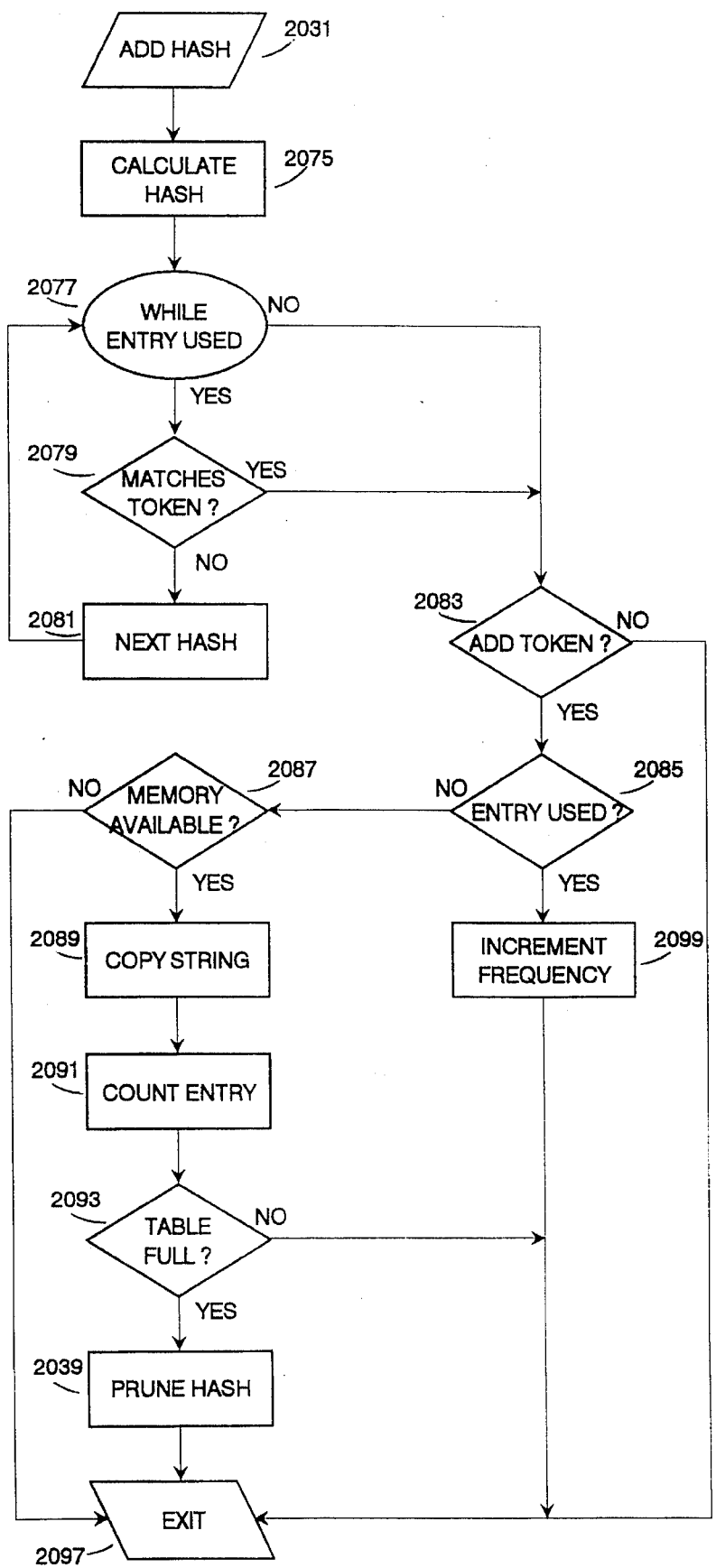
Figure 41:
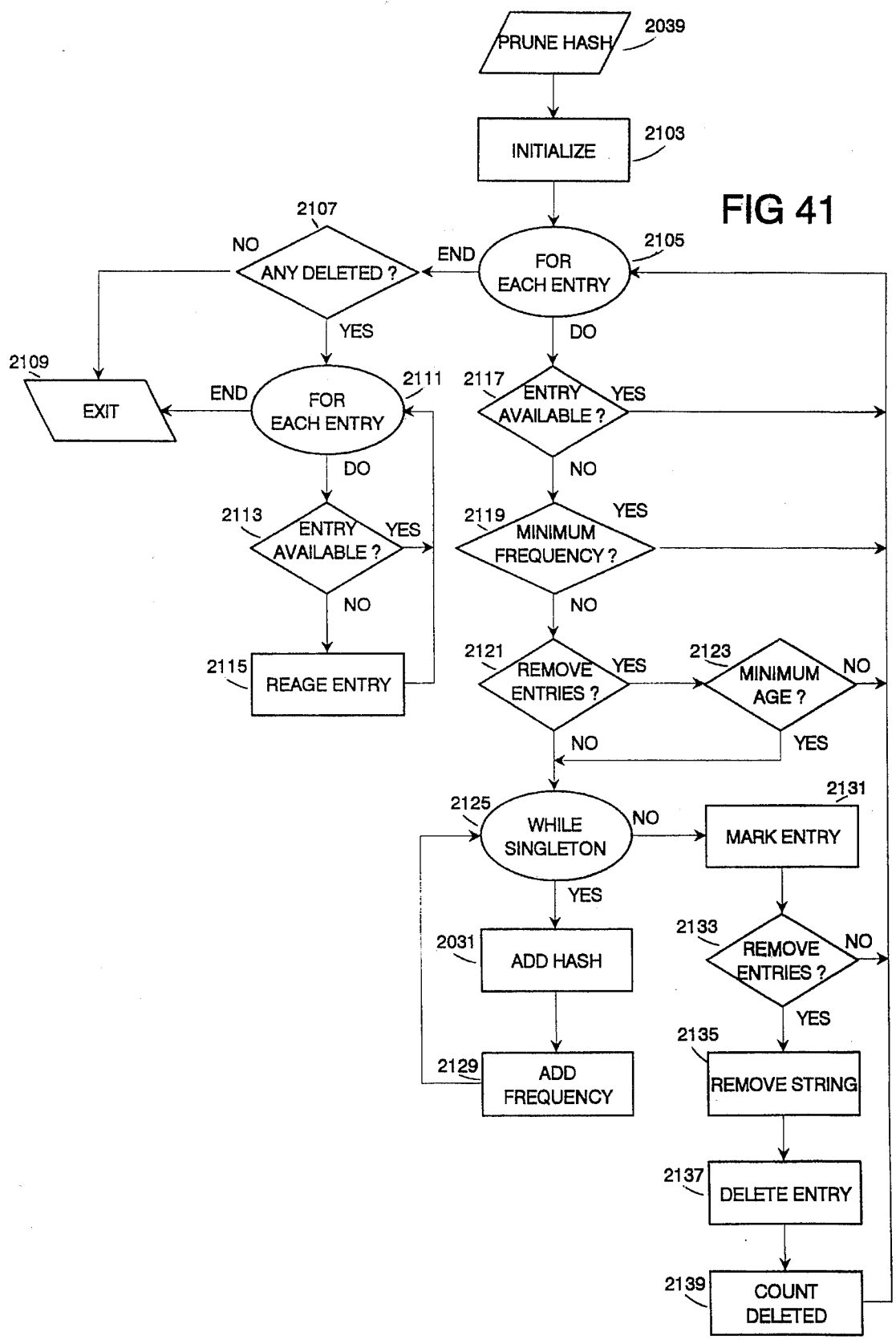
Figure 42:
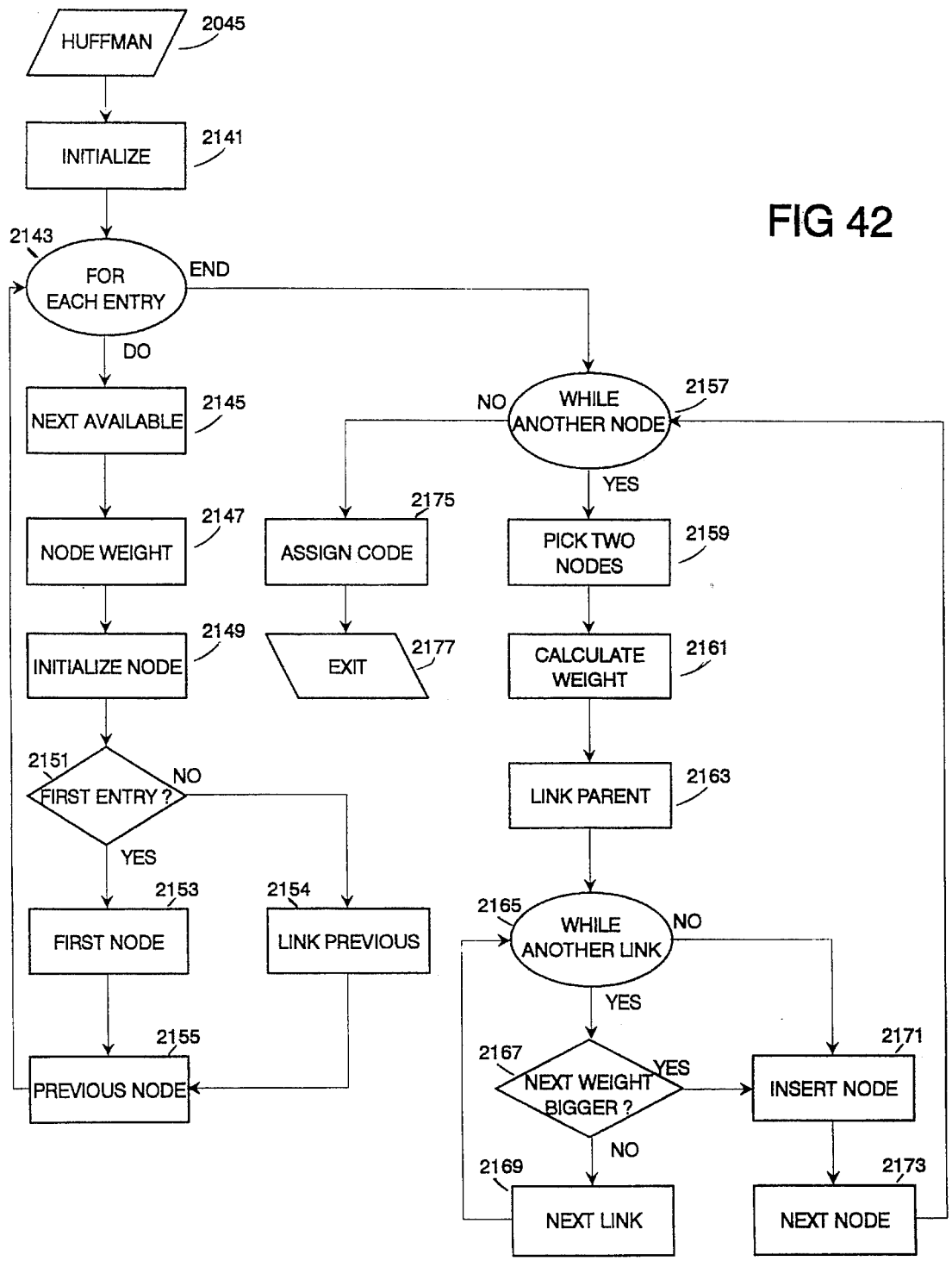
Figure 43:
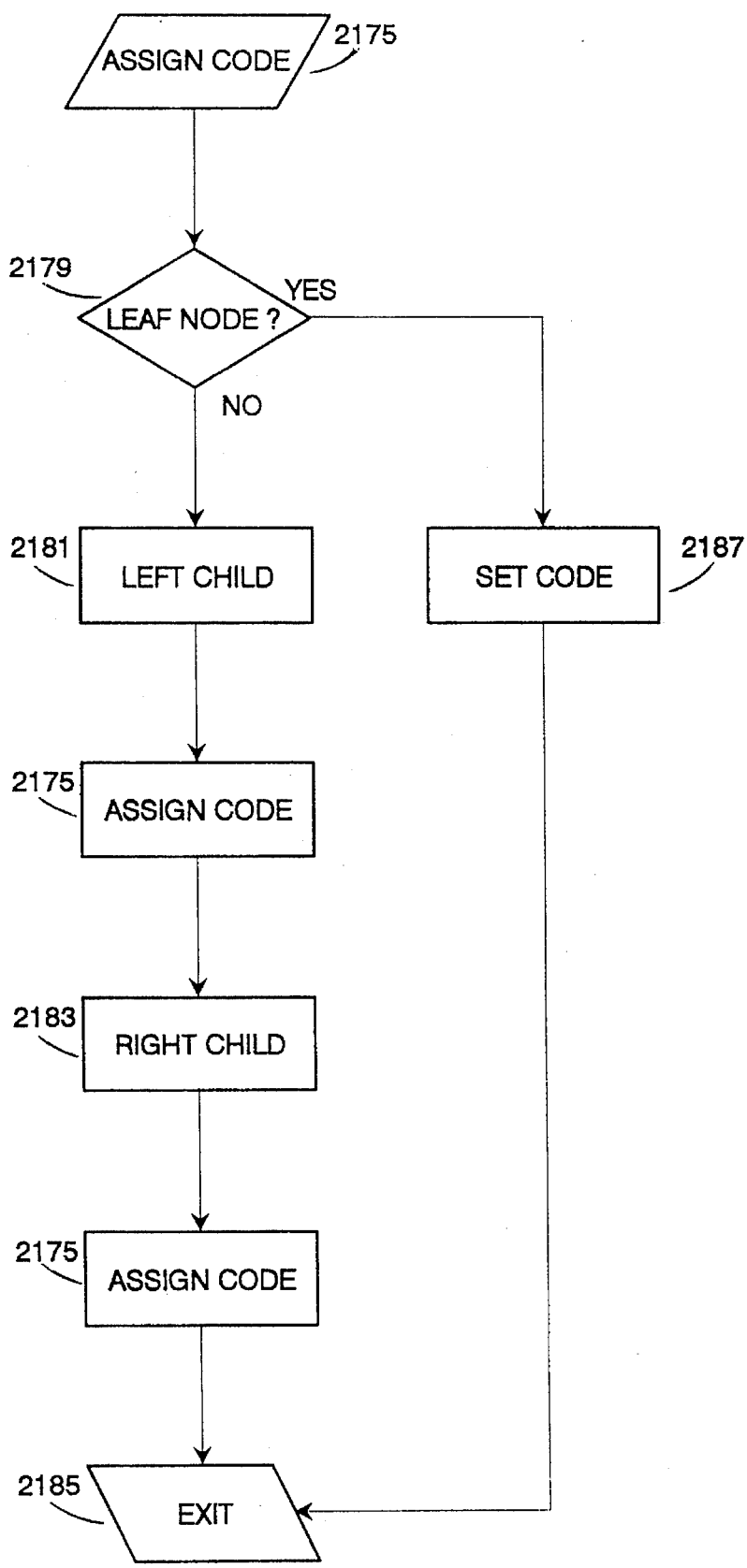
Figure 44:
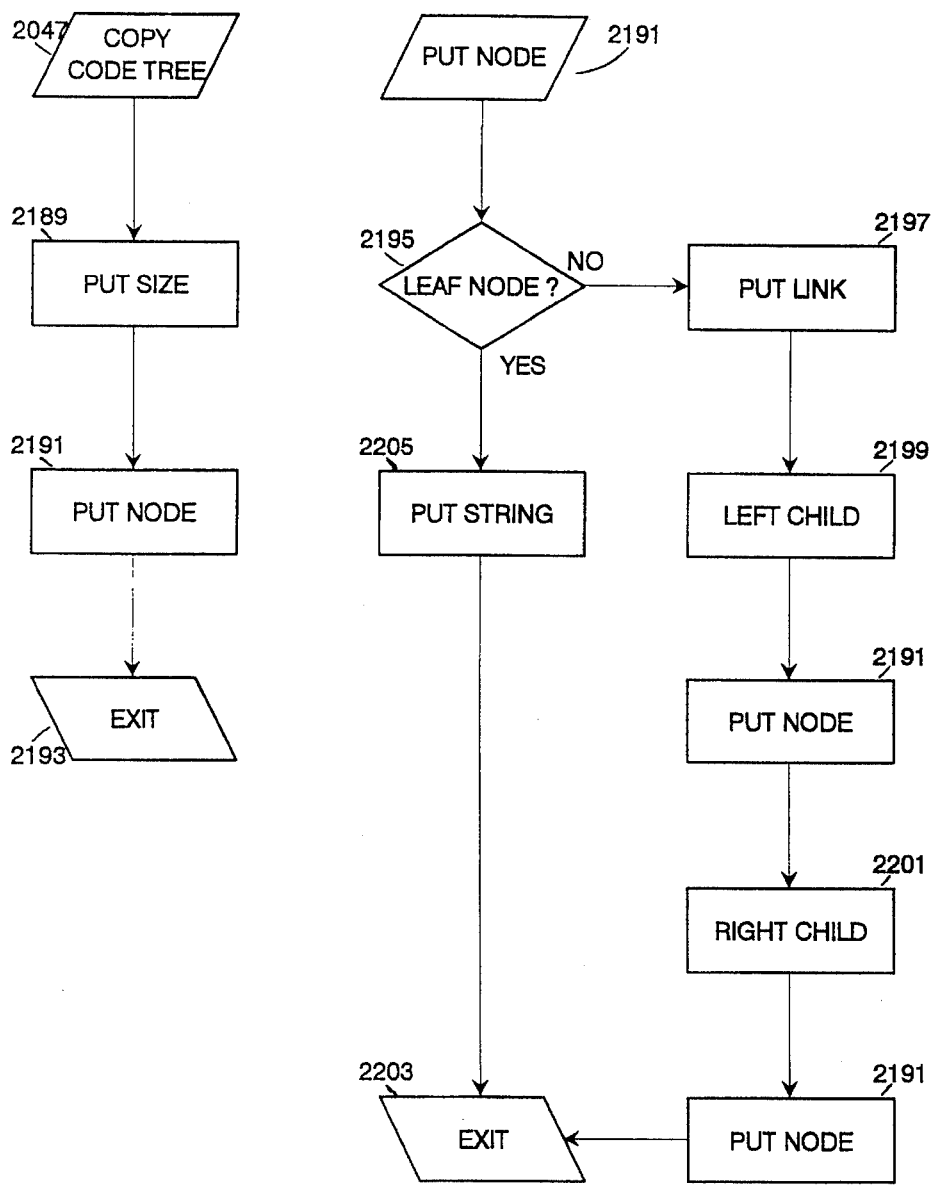
Figure 45:
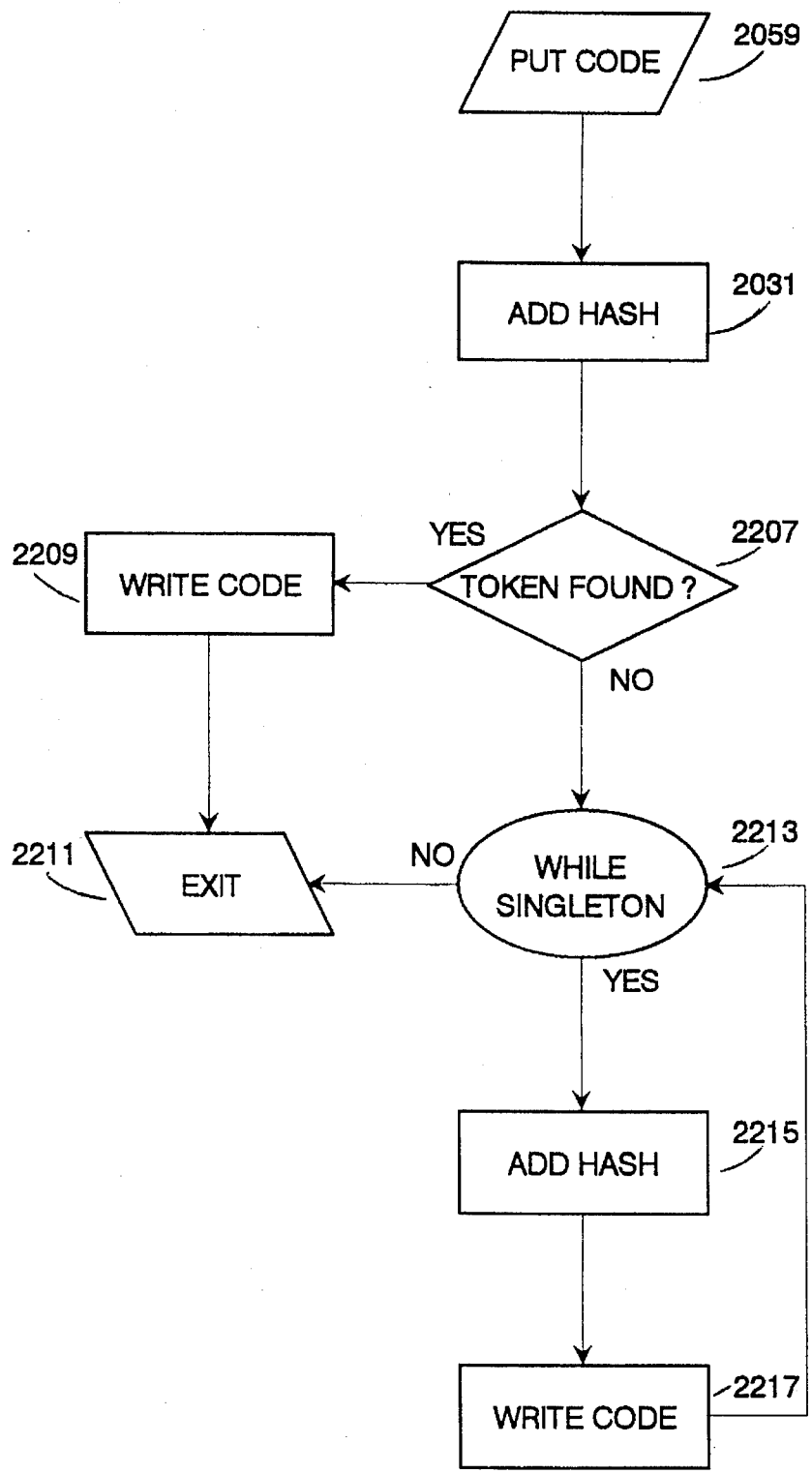

INPUT FILE subroutine utilized in conjunction with the data compression method of the present invention;

FIG. 40 is a logic flowchart of the ADD TOKEN TO HASH TABLE subroutine utilized in conjunction with the data compression method of the present invention;

FIG. 41 is a logic flowchart of the PRUNE HASH TABLE subroutine utilized in conjunction with the data compression method of the present invention;

FIG. 42 is a logic flowchart of the CREATE HUFFMAN CODE TREE subroutine utilized in conjunction with the data compression method of the present invention;

FIG. 43 is a logic flowchart of the ASSIGN HUFFMAN CODE FOR ROOT NODE subroutine utilized in conjunction with the data compression method of the present invention;

FIG. 44 is a logic flowchart of the COPY HUFFMAN CODE TREE TO OUTPUT FILE and WRITE NODE TO OUTPUT FILE subroutines utilized in conjunction with the data compression method of the present invention; and FIG. 45 is a logic flowchart of the PUT TOKEN TO OUTPUT FILE subroutine utilized in conjunction with the data compression method of the present invention.

DETAILED DESCRIPTION OF THE PREFERRED EMBODIMENT

The description and operation of the invention will be best described with reference to FIG. 1. FIG. 1 is a pocket electronic communication system as was shown in U.S. Pat. No. 318,462, and which has a door carrier system for computer chip replacement as was shown in co-pending U.S. patent application Ser. No. 07/907,170 now abandoned entitled "Chip Door Carrier" and filed Jul. 1, 1992.

The pocket electronic communication system is an electronic appliance which is intended to provide the user with structured access to information. Unlike the personal programmable electronic directories commonly available, both the bulk of the information and the manner in which it is accessed is mostly unaffected by the actions and wishes of the user.

Both the information and the manner in which it is accessed is determined by an information chip which is programmed by the programmer and distributor of the computer chips used to interact with other electronics in the directory.

More importantly, the access to the information is structured to meet the needs and requirements of both the user and to provide the quickest access time to the data. As a result of these built in considerations, the directory of the present invention 21 has only four entry button switches.

Referring to FIG. 1, system 21 has a base 23, a slidable cover 25, an up cursor button switch 27, a down cursor button switch 29, a menu button switch 31 and an enter button switch 33. Referring to FIG. 2, the system 21 is shown in the open position, exposing a display screen 35. Typically the screen 35 will be a liquid crystal display which is back plane illuminated using phased signals. In this position, the pocket electronic communication system is operative to be used to access the directory information.

Referring to FIG. 3, the rear side of system 21 reveals an access door 41 extending from the right side of the system 21 to an edge 42 on base 23 just short of the left side of system 21. A decal 43 is shown affixed to the outer surface of door 41. Decal 43 can be used for opening reinstallation instructions, as well as for identity of the chip carried by the door. When used for identity of the chip carried by the door, a system 21 can be rapidly identified as being in an up-to-date state.

Referring to FIG. 4, the perspective view of the system 21 illustrates the removal of the door 41 in a pivoting fashion. A slot exists between a edge 47 of the curved end of door 41 and an opposing edge 49 of the base 23 of system 21 when door 41 is in closed position. This slot facilitates the manual location of the door 41, edge 49 interface, and the removal of door 41 from the system 21. The path of travel of the edge 47 of the curved end of door 41 and right side of door 41 is arc shaped. However, the door 41 is completely detachable from the base 23 of system 21 after only traveling for only a small portion of the initial arc path.

Also visible in both FIGS. 3 and 4 in dashed line format is a chip 51 carried by door 41 and a portion of the chip socket 53 into which chip 51 connectably fits when door 41 is closed into place. Note that chip 51 is located at the far end of the door 41's axis of pivot with respect to base 23. In this configuration, chip 51 enters chip socket 53 at the least angle with respect to chip socket 53. It is understood that door 41 could support several such chips 51 opposing several such chip sockets 53 on any electronic appliance, such as system 21.

Depending upon the mechanism employed at the pivoting end of door 41, the door 41 may be made to pivot over a wider arc than is the case for the system 21. The hinge mechanism which causes door 41 to pivot may enable disengagement of door 41 only after a wide angle of swing.

In FIG. 5, a plan view of the system 21 illustrates the existence of batteries 55 in operating position in a compartment 57 of system 21 to one side of chip socket 53. In this case, the door 41 is utilized not only to assist in the removal and replacement of chip 51, but also to provide protective access to other structures in system 21, or any other electronic appliance. Although batteries are shown in the compartment 57 enclosed by door 41, the compartment 57 may contain a variety of structures, including dip switches for changing a microprocessor's function, rheostats, trimmer coils and trimmer capacitors. Compartment 57 can provide a protected space for any use.

Referring to FIG. 6, a plan view of the door 41 reveals a tab 61 extending the length of the shorter dimension of door 41 along one side. Tab 61 was shown in dashed line format in FIGS. 3 and 4. FIG. 6 best illustrates the inside surface 63 of door 41 and the inside surface of tab 61. It is tab 61 which engages door 41 with edge 42 of base 23, the bulk of the force on tab 61 occurring on its outer side.

The inside surface 63 of door 41 is bounded by a wall 65. Wall 65 extends about three sides of the perimeter of the door 41, and is interrupted along a length of the perimeter of door 41 adjacent tab 63. Wall 65 is inset slightly nearer the end of door 41 having edge 47. A series of reinforcing ribs 67 extend perpendicularly with respect to the edge 47 of the curved end of door 41 and the adjacent wall 65. Reinforcing ribs 67 lend additional strength to the door 41 when pressure is applied along edge 47 of the curved end of door 41.

Along the longer sides of door 41, the wall 63 forms grooves 69 and 71 with the inside surface 63 of door 41. These grooves 69 and 71 engage and are complimentary to surfaces 73 and 75, respectively, on base 23 of system 21 to form a more complete seal with respect to compartment 57.

Referring to FIG. 7, a perspective view of door 41, the decal 43 and the chip 51 is shown in an exploded configuration. The chip 51 is shown over a pad surface 75. This pad surface 75 is important to the functioning of the door 41 in its proper placement of the chip 51 within the socket 53. If the pad 75 is too low, the chip 51 will not make proper contact with the socket 53, perhaps causing the chip 51 to "pop out" of the socket 53. If the pad 75 is too high, the chip 51 will be difficult to remove and insert into the socket 53 and the edges of door 41 will not make good close contact with the base 23. Preferably, the pad 75 will be high enough to have a reinforcing thickness.

Figure 9:
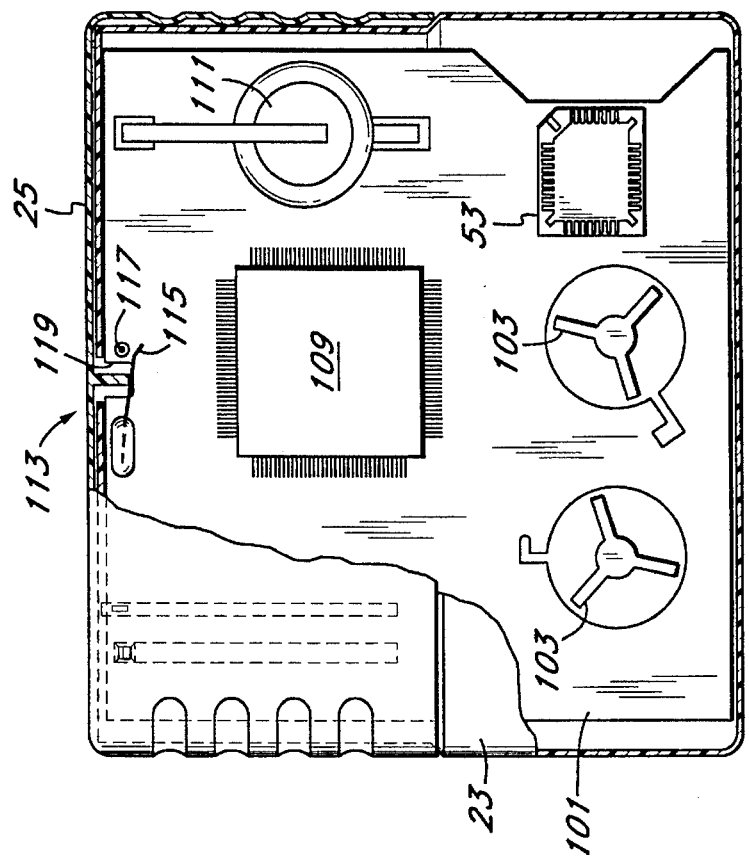
FIG. 9 is a plan view of the circuit board layout of the directory shown in FIGS. 1–8.
Figure 8:
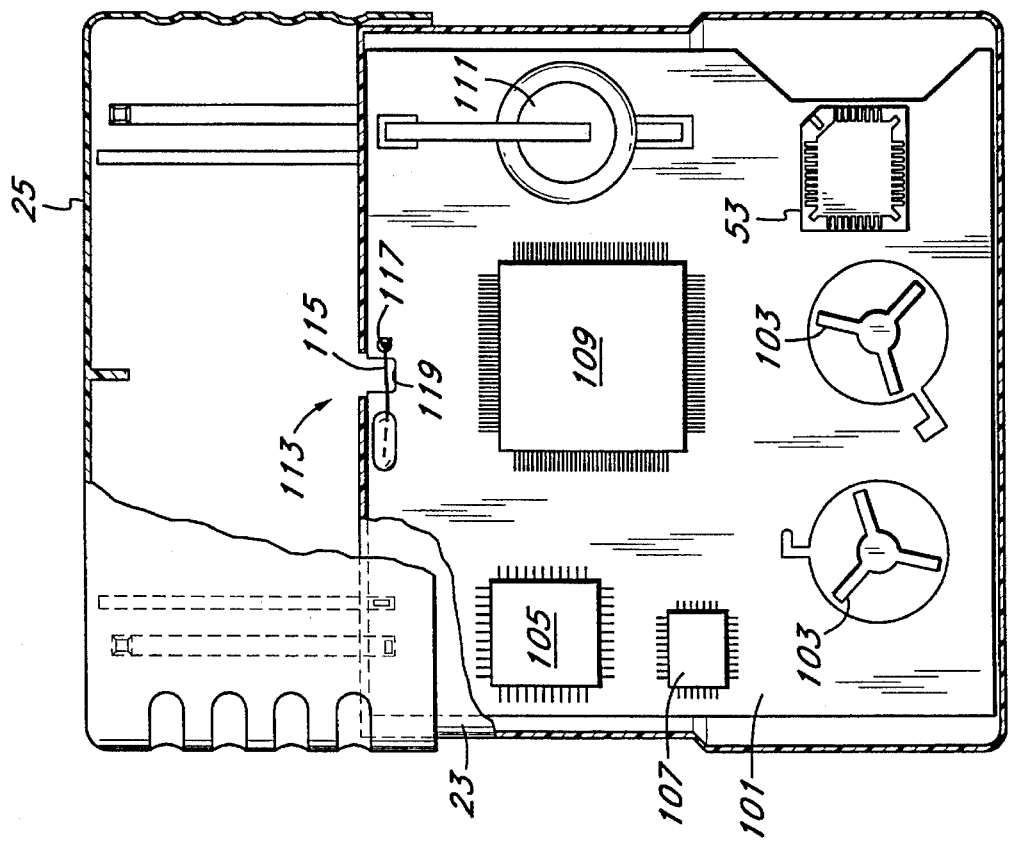
FIG. 8 is an exploded view of the directory of the present invention illustrating the slidable cover and the top portion of the base of the directory.

Referring to FIG. 9, a plan view of the circuit board of the directory reveals a number of circuit components mounted on a circuit board 101 having dimensions less than four inches square. At the bottom of the circuit board 101 are solder tabs 103 to conductively support the batteries 55 shown in FIG. 7.

Beginning at the left of the circuit board 101 are the main circuit components including a 44-pin microprocessor 105, 32 pin programmable operating system ROM 107, and a 144 pin application specific integrated circuit, or ASIC 109. ASIC 109 includes a 384 byte general purpose static RAM and a 208 byte static RAM used to store display information, both located within its boundaries. At the upper right side is a lithium battery 111. Above ASIC 109 is a switch 113. Switch 113 is formed by springingly extending a conductive strip 115 against a conductive post 117. Switch 113 is shown in a closed position in FIG. 9, which is the operating position for the system 21. Circuit board 101 is also provided with a notch 119 along the conductive strip 115 to enable a sufficient physical intrusion into the notch 119 which will cause the conductive strip 115 to break contact with the conductive post 117 to cause the switch 113 to open. As will be shown below, the structure for opening switch 113 is incorporated into slidable cover 25.

At the lower portion of the circuit board is the 32 pin chip socket 53 which was shown in FIG. 7. From an orientation standpoint, the microprocessor 105, operating system ROM 107, and ASIC 109 lie behind display screen 35 at the upper portion of the system 21. The lower portion of the circuit board 101 contains the structures to be accessed by access door 41, including the solder tabs 103 and the chip socket 53.

Figure 10:
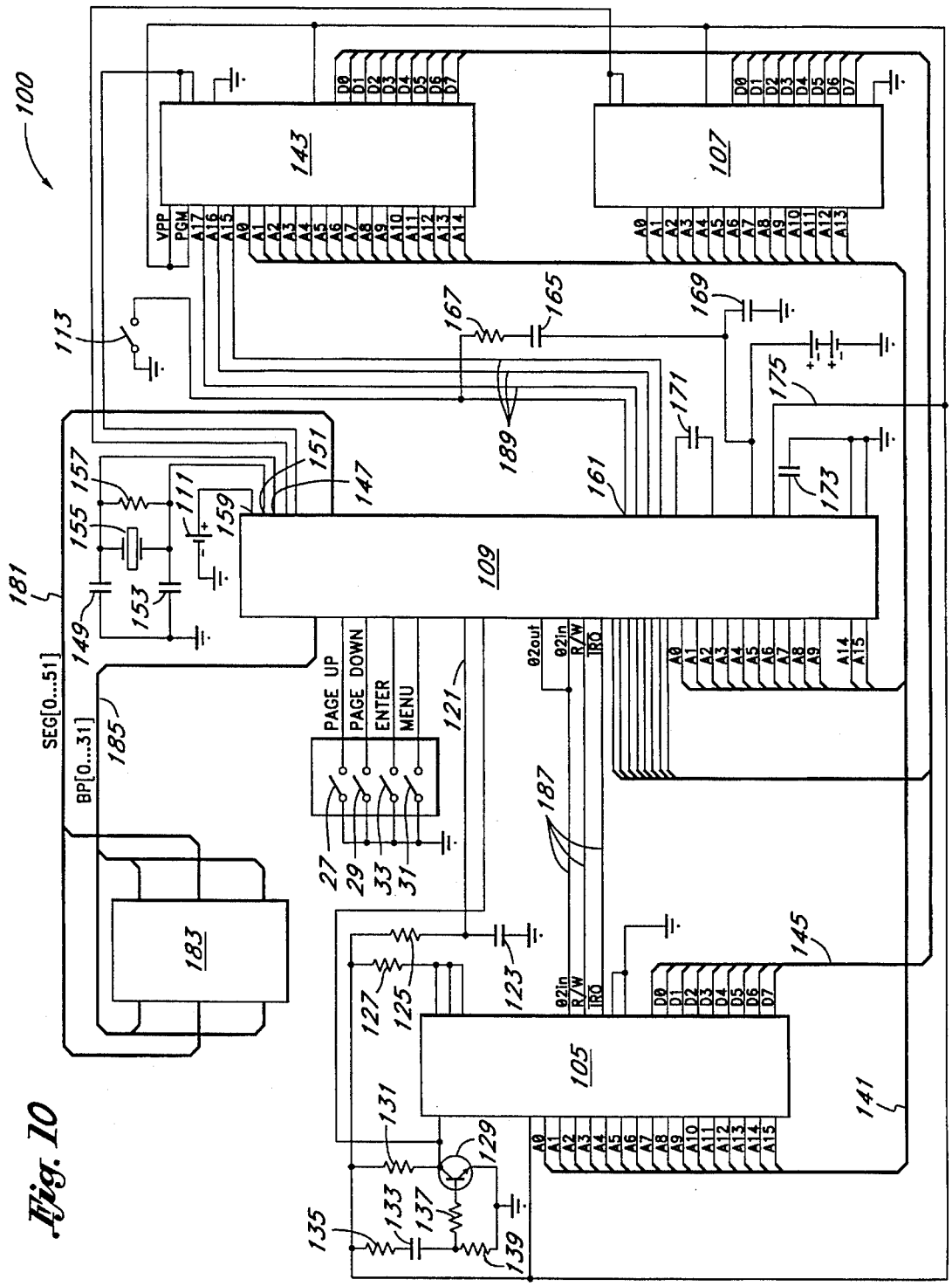
FIG. 10 is a schematic view of the circuitry of the directory shown in FIGS. 1–9.

Referring to FIG. 10, a schematic diagram of the system 21 is illustrated. The microprocessor 105 is preferably a CMOS 65C02 microprocessor. This microprocessor 105 is the central controller for the system 21. A transistor circuit is illustrated as connected to the upper side of microprocessor 105 which is designed to provide a 120 millisecond delay on power-up. As will be discussed below, the power is first directly provided to ASIC 109. ASIC 109 provides power to all of the other circuit components. To give the ASIC 109 sufficient time to achieve power-up of all the other circuits to their proper start-up states before the microprocessor is started, the 120 millisecond delay circuit is provided.

On power-up, a line 121 from ASIC 109 is supplied with positive direct current power. Current flows initially into a first side of a capacitor 123 having a nominal value of about 51 picofarads. The other side of capacitor 123 is grounded. The current then flows through a resistor 125 having a nominal value of 10k ohms. Current passing through resistor 125 is then available to the logic inputs of ASIC 105 through a resistor 127 having a nominal value of about 10k ohms.

Current passing through resistor 125 is also available to the collector of a transistor 129 through a resistor 131 having a nominal value of about 100k ohms, and to a capacitor 133 having a nominal value of about 0.1 microfarad, through a resistor 135 having a nominal value of about 10k ohms, and to a power input of ASIC 105.

The other end of capacitor 133 is connected to both the base of transistor 129 through a resistor 137 having a nominal value of about 100k ohms, and to ground through a resistor 139 having a value of about 100k ohms. The emitter of transistor 129 is grounded.

On start-up, the high potential current supplied through line 121 initially charges capacitor 123. The current continues through resistor 135, and initially begins to bring the base of transistor 129 to a slightly higher potential than the grounded potential of the emitter, causing transistor 129 to turn on, conducting current from a point downstream of resistor 125 through the transistor 129 to ground.

Once an appropriate amount of time passes, the slightly higher potential of the base of transistor 129 is drained to ground via the resistors 137 and 139. When this occurs, the base and emitter terminals of the transistor 129 are equalized and transistor 129 is shut off. When transistor 129 is shut off, its collector rises in voltage since it is no longer conductive with the ground through the emitter. The ASIC 105 then receives a "high" voltage state at its initialization input which is connected to the collector of transistor 129, to initialize the startup sequence.

The microprocessor 105 has two sets of conductors extending from its location. A first set of conductors comprise a bus 141. Bus 141 has 16 conductors, including lines A0 through A15. Lines A0–A9, A14 and A15 are connected from microprocessor 105 to ASIC 109. Lines A0–A13 are connected from microprocessor 105 to programmable operating system ROM 107. Lines A0–A14 are connected from microprocessor 105 to a specific type of chip 51 which is an information ROM and is utilized in the pocket electronic communication system 21, which will hereafter be referred to as an ROM 143. ROM 143 fits within the socket 53 referred to earlier.

A second set of conductors comprise a bus 145. Bus 145 has 8 conductors, including lines D0 through D7. Lines D0–D7 are connected in parallel from microprocessor 105 to ASIC 109, operating system ROM 107 and ROM 143.

ASIC 109 is a circuit especially formulated for the directory. At the top of ASIC 109 is a frequency determining circuit for the clock of the system 21 system. Into a first clock time input 147 input into ASIC 109 is a first end of a capacitor 149 having a value of about 33 picofarads, the other end of capacitor 149 being grounded. Into a second clock time input 151 into ASIC 109 is a first end of a capacitor 153 having a value of about 33 picofarads, the other end of capacitor 153 being grounded.

First clock time input 147 and second clock time input 151 are connected by a parallel combination of a crystal 155 and a resistor 157 having a value of about 10 million ohms. It is understood that the clock time inputs vary between individual integrated circuits, and that any clock time input circuit may be used.

ASIC 109 also includes a battery input 159, connected to the lithium battery 111 shown in FIG. 9. Lithium battery 111 powers the internal clock of ASIC 109 and enables ASIC 109 to mark time whether or not the system 21 is being currently used or not.

ASIC 109 also includes a power switch line 161 connected to a switch 163. The other end of switch 163 is connected to ground. In this configuration, the power switch line 161 is connected internally within ASIC 109 to have a 5 volt "high" potential. When the potential of this line is brought "low" by switching switch 163 closed and effectively grounding the power switch line 161, the directory 121 is activated.

Note also that power switch line 161 is connected to a capacitor 165, having a nominal value of 0.1 microfarad, through a resistor 167 having a nominal value of about 1000 ohms. The other end of capacitor 165 is connected to the power input to ASIC 109, labeled $V_{DD\ IN}$, and is grounded through a capacitor 169 having a nominal value of 1.0 microfarads. The $V_{DD\ IN}$ input of ASIC 109 is powered by a pair of series connected batteries 55 which were physically shown in FIGS. 4 and 5.

Batteries 55 are normally lithium batteries, each having a voltage output of about 3.1 volts. Therefore, the voltage input to $V_{DD\ IN}$ is about 6.2 volts. ASIC 109 utilizes this 6.2 volt $V_{DD\ IN}$ power source to provide a power supply of approximately 5.0 volts to the system 21's operating circuitry. The circuitry including capacitors 169, 165 and resistor 167 are intended to minimize the power disturbance to the ASIC 109 upon the opening and closing of switch 113 when the system 21 system is activated and deactivated.

ASIC 109 also makes use of a capacitor 171 connected in series between two of its terminals and having a nominal value of 0.033 microfarads. A companion capacitor 173 is connected in series between another one of the terminals of ASIC 109 and ground, and having a nominal value of 0.033 microfarads. ASIC 109 uses capacitors 171 and 173 in a voltage doubler scheme to be discussed below.

ASIC 109 contains the drivers and voltage sources for the LCD 183 display. As discussed above, there are 52 pins for the segment drivers and 32 pins for the back plane drivers, for a total of 84 pins driving the LCD 183 display. The LCD 183 display requires an "AC" type of voltage drive to prevent permanent damage to the basic material. This "AC" type of voltage consists of a 75 Hz square wave applied to both terminals of a particular segment. When the signals applied to each terminal are "in phase", the segments remain transparent or "off". When the signals applied to each terminal are "out of phase", the segment becomes polarized and is "on".

These terminals are normally referred to as segment (referring to the top plane connection), and back plane (referring to the bottom plane connection). When the RMS voltage of these two signals exceeds a value referred to as the threshold voltage, the segment becomes visible. The details of the display are considerably more complex and will be discussed at length below. However, in order to achieve the required RMS voltages, the battery voltage supplying power to the integrated circuits must be doubled to approximately 10 volts. The ASIC 109 employs a doubling circuit using the two external capacitors 171 and 173 to achieve the proper display voltage. The LCD 183 display is capacitive in nature requiring little power to operate.

The 5 volt power is supplied from ASIC 109 along a line 175 from a terminal labeled $V_{DD\ SYS}$. As can be seen, the line 175 is connected to microprocessor 105, resistor 135, operating system ROM 107 and ROM 143. As can also be seen, the up cursor button switch 27, a down cursor button switch 29, a menu button switch 31 and an enter button switch 33 are all connected into ASIC 109 to communicate user selections.

A 32 conductor bus 181 having connectors BP0–BP31 extends from the left side of ASIC 109 into a liquid crystal display, or LCD 183. A 52 conductor bus 185 having connectors BP0–BP51 extends from the right side of ASIC 109 into LCD 183. A three conductor bus 187 extends between ASIC 109 and microprocessor 105. Another three conductor bus 189 extends between ASIC 109 and ROM 143.

OPERATION

The ASIC 109 performs a number of systems functions. The clock for the microprocessor 105 is generated by a single pin RC oscillator located on the ASIC 109, and includes in its circuit, crystal 155 and resistor 157 which were shown connected to ASIC 109. Typically the clock may use a Schmitt input invertor with a discharge device to generate a ~2 Mhz sawtooth waveform. This 2 Mhz signal is divided by 2 and output as a ~1 Mhz square wave with 50% duty cycle as the clock input to the microprocessor 105.

The read/write memory is also located within the ASIC 109. This memory consists of 384 bytes of general purpose RAM, 208 bytes of LCD 183 display RAM, and 16 registers performing various functions. The ASIC is addressed with 12 address bits. Bus 145 is a bidirectional data bus for writing and reading eight bits of data. Internal chip selects for read and write operations are derived from the read/write signal from the read/write line on bus 187.

The LCD 183 display RAM on ASIC 109 is located at system address 0180/H to 024F/H, to that the ASIC 109 address counter which generates addresses when the display is being refreshed has an identical address sequence generated in hardware to maintain compatibility with the processor data locations.

Two of the ASIC registers are used for controlling two special modes, namely the status and control register for controlling reset, test modes, interrupts, and setting functions; and the marker register for various special test mode control and data reading and writing in conjunction with the test modes.

In the system 21, the real time clock is continuously running on the ASIC 109, even when the slidable cover 25 is closed. This clock is powered by the lithium battery 111 and read and set using the registers located at the 030B to 030F. The real time clock time base consists of a 32 Khz crystal controlled oscillator, which is divided to provide counts of seconds, minutes, hours and days. The Oscillator is located on the ASIC 109, while the other portions of the circuit forming the real time clock include capacitors 149 and 153, resistor 157, and crystal 155.

In order to conserve the power of the batteries 55, the microprocessor 105 is active and powered up only when there is user activity at the keypad of the four button switches 27, 29, 31 and 33. There are two modes of shut down, and consequently two modes of start up. When the directory case is closed, the microprocessor 105 and all memories are powered down. From this powered down condition, restart is a boot-up operation.

A secondary shutdown operation occurs when there has been no user input from the keypad of the four button switches 27, 29, 31 and 33 for a two minute period. In this event, the microprocessor 105 and the operating system ROM 107 and ROM 143 are powered down. However, the last state information is preserved in the general purpose RAM within the ASIC 109 which remains powered up. Start-up resulting from the closure of one of the four button switches 27, 29, 31 and 33 resumes the previous state.

The shutdown of power to the microprocessor 105 and memories is controlled by ASIC 109.

The LCD display may consist of two columns of characters, as is shown in TABLE I below.

TABLE I

| LEFT | RIGHT | |
|---|---|---|
| CCCCCCCCCCCCC | CCCCCCCCCCCC | ROW 1 |
| CCCCCCCCCCCCC | CCCCCCCCCCCC | ROW 2 |
| CCCCCCCCCCCCC | CCCCCCCCCCCC | ROW 3 |
| CCCCCCCCCCCCC | CCCCCCCCCCCC | ROW 4 |

The left column contains four rows of thirteen characters, while the right column contains four rows of twelve characters. Each character consists of a 4×4 matrix for addressing individual segments. The columns are segment drivers and the rows are back plane drivers. To display a character the column information (4 bits) is synchronized with the row back plane select, and the rows are strobed from top to bottom using four back plane signals for each row. The column segments are common to the four rows of characters, and the row, or back plane signals are common to the 13 or 12 characters in a row of a block.

Preferably the display is stored as encoded segment data in the following order: ROW1 LEFT:RIGHT, ROW2 LEFT:RIGHT, ROW3 LEFT:RIGHT, ROW4 LEFT:RIGHT. This configuration forms 208 words of encoded segment data. This data is translated from ASCII and written to the 208 byte static LCD RAM previously mentioned as located within the ASIC 109. The ASIC 109 is then enabled to "read" the LCD RAM and performs a hardware translation to drive the display properly. Each row in a block has four back plane signals and 52 segment signals. The segment data corresponding to a back plane row is serialized in a 52 bit shift register and transferred to parallel laches. The latched data is presented to the segment drivers while the back plane is selected. While a back plane select occurs, the shift register is loaded with the next 52 bits of data serially. Data is transferred to the latches in synchronization with the next back plane select.

The data is stored in the LCD RAM within the ASIC 109 as 52 bytes for each row, 13 bytes for each back plane select. Each byte represents a nibble for each left column character and a nibble for each right column character. The LCD RAM within the ASIC 109 is read twice through all 208 addresses, with the first read involving serialization of the high nibble data, and the second read involving the serialization of the low nibble data.

The LCD RAM within the ASIC 109 is arranged into words which are eight bits long. The 208 words are arranged into a 52×4 set. A scan of the display LCD 183 requires 416 "reads" of the RAM data, the first 208 "reads" of the D7, D6, D5, and D4 bits, and the second 208 "reads" of the D3, D2, D1, and D0 bits of the data.

Preferably the back plane select signal is 13 read cycles long, namely the time required to both read and serialize 13 nibbles of segment data.

Nominal input frequency is 1 Mhz. In actuality, the 1 Mhz is divided by 16 (62.5 Khz) for the clock to the back plane address counter. The LSB of address is divided by 2, for an address LSB frequency of 31.25 Khz. This in turn corresponds to a RAM read cycle of 31.25/13≈2.4 Khz, which fixes the actual LCD frequency as 2.4 Khz/32=75 Hz. This frequency varies directly with the variation of the input frequency from the processor which is supplied by the RC oscillator on the ASIC 109.

The chip has a test mode implemented which allows the higher frequency input to be used as the back plane clock frequency, thus speeding the back plane select rate by a factor of 208 for testing purposes.

ASIC 109 also supports a circuit to provide the proper signals for charging supply capacitors to double the voltage of the batteries 55. The supply capacitor is recharged at 2400 Hz and must supply sufficient charge to sustain a 20 volt charge at 75 Hz for the 52 segment drivers.

The firmware executed by the circuitry of system 21 to enable user operations is as follows. Referring to FIG. 11, a logic flowchart for operation of the system 21 is illustrated. A POWER ON block 301 is at the head of the logic flow stream. This block is activated when the slidable cover 25 is raised on the base 23 of the system 21 exposing the screen 35, as is shown in FIG. 2. From POWER ON block 301, the logic flows to a decision diamond 303 titled ASIC INITIALIZED? If the ASIC 109 is not initialized, the logic flows to a command block 305 entitled INITIALIZE ASIC, which causes the ASIC 109 to become initialized. Once the ASIC 109 is initialized, the logic flows to a command block 307 entitled INITIALIZATION, which prepares the memory and storage portions of the circuitry of system 21 for operation.

Returning to the ASIC INITIALIZED? decision diamond 303, a YES decision leads to a SHUTDOWN decision diamond 309 which determines if the system 21 is returning to normal power from the power conserving shutdown mode. A NO decision leads to INITIALIZATION command block 307. A YES decision leads to a NEW MEMORY DOOR decision diamond 311, at which time the identification number of the ROM 143 is tested for a change since the last time the system 21 was used. A YES decision at NEW MEMORY DOOR decision diamond 311 leads to INITIALIZATION command block 307. A NO decision at NEW MEMORY DOOR decision diamond 311 leads to a RESTART INTERRUPTED ROUTINE terminal block 313, which causes control of the operations to be returned to the last operation being executed, at the time of the switch to the power conserving shutdown mode.

From a INITIALIZATION command block 307, the logic flow proceeds to a VALID MEMORY DOOR decision diamond 315, where certain identifying characteristics of the replaceable ROM 143 are tested and compared with expected data. Data for comparison is the type of data of the ROM 143 compared with the type of data for which the system 21 was programmed.

A NO decision leads to a REQUEST MEMORY DOOR command block 317, where the logic flow is placed on hold until a valid ROM 143 is sensed to be in place. From command block 317, and once a valid ROM 143 is sensed to be in place, the logic continues to a NEW MEMORY DOOR decision diamond 319 at which time the identification number of the ROM 143 is tested for a change since the last time the system 21 was used. From the VALID MEMORY DOOR decision diamond 315, a YES decision would similarly have arrived at decision diamond 319. A YES decision from decision diamond 319 would logically flow to a CLEAR SAVED SCREEN command block 321, where any saved screen resulting from operations with a previous ROM 143 will be cleared. The logic then flows to a REVISION OK? decision diamond 323, where the functionality of the system 21 required by the ROM 143 is tested. For example, the system 21 may be programmed with additional commands in the future that would be used by a future ROM 143 which would not be accepted by the current operating system ROM 107.

A NO decision from decision diamond 323 leads to a REQUEST ANOTHER MEMORY DOOR command block 341, where the logic flow is placed on hold until a different ROM 143 is sensed to be in place. From command block 341, and once a different ROM 143 is sensed to be in place, the logic leads back to CLEAR SAVED SCREEN command block 321, which would logically lead again to decision diamond 323. A YES decision from decision diamond 323 logically leads to a MEMORY DOOR TYPE classification block 325, where the ROM 143 is classified into one of three categories, namely data, test or clock set.

If the identity of ROM 143 is of the data type, the logic leads to DATA start block 327. From block 327, the logic arrives at a ASIC INIT decision diamond 329 where the initialized status of the ASIC 109 is tested. The ASIC 109 is only initialized when the batteries are installed. A YES decision leads to a ENTER KEY? decision diamond 331 and the pressing of the enter key button switch 33 is tested. A YES decision leads to a TEST AUTHORIZED? decision diamond 333, at which time a certain sequence of key presses and key releases is tested. A YES decision from decision diamond 333 leads to a SELF TEST termination block 335, where the system 21 undergoes a self test to determine its working ability as shown in FIG. 36.

Figure 36:
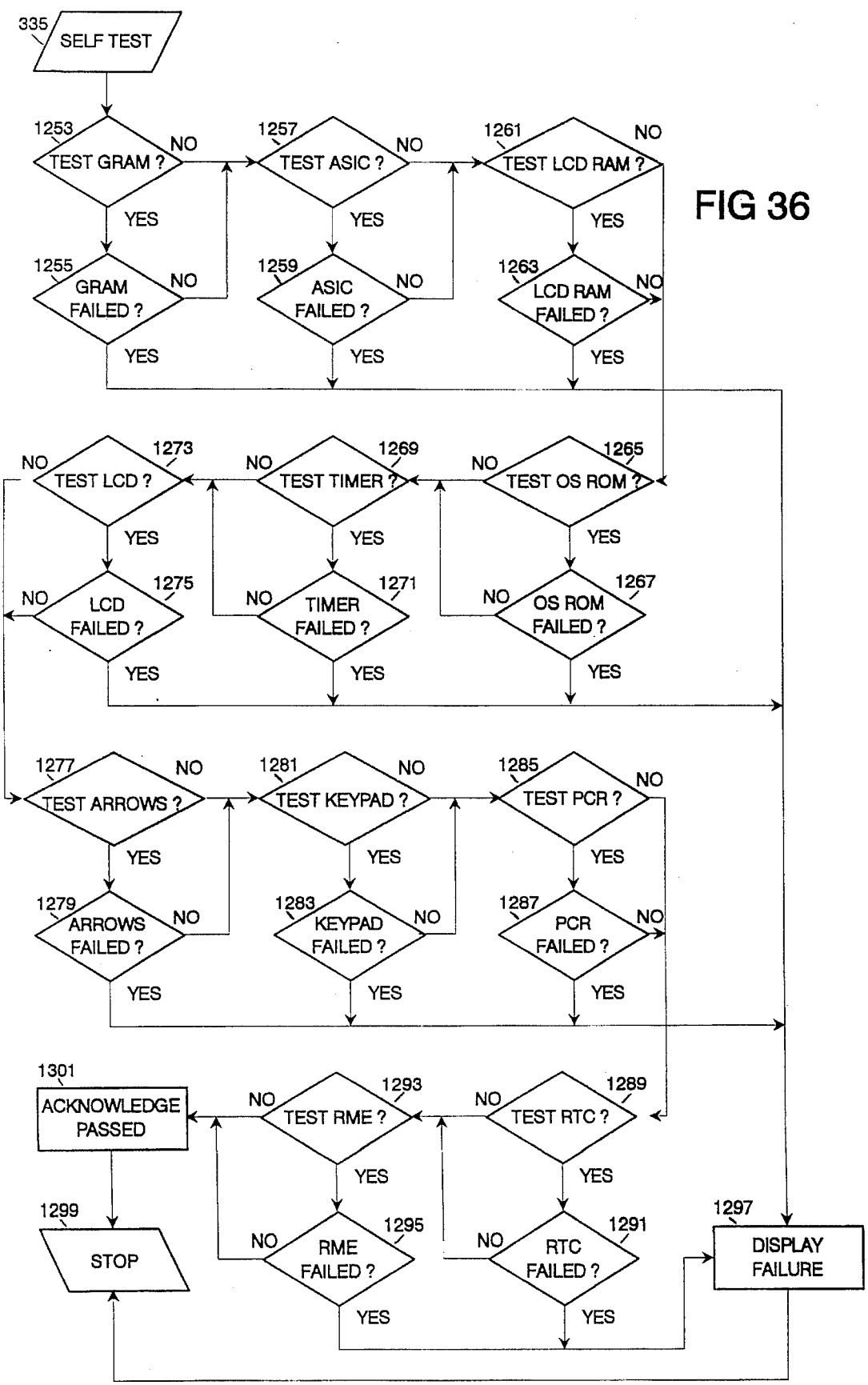
FIG. 36 is a logic flowchart of a SELF TEST subroutine.

From MEMORY DOOR TYPE classification block 325, a determination that the ROM 143 is a test ROM will cause the logic to lead to a TEST start block 337, and then to SELF TEST termination block 335, where the system 21 undergoes a self test to determine its working ability as shown in FIG. 36. The test MEMORY DOOR TYPE is for use in manufacturing to test the system 21 during final assembly.

In the event that the NO decision was reached for any one of the decision diamonds ASIC INIT 329, ENTER KEY? 331 or TEST AUTHORIZED? 333, the logic flows to a COMMAND INTERPRETER block 339. The workings of the command interpreter will be examined in subsequent figures.

From MEMORY DOOR TYPE classification block 325, the logic may flow to a RTC start block 343, where the real time clock of the ASIC 109 is set. The logic flows in serial fashion from RTC start block 343 to a GET CLOCK command block 345, to a SET ASIC RTC block 347, to STOP block 349. Each block in this group assists the final assembly people of the manufacturer to automate the setting of the real time clock if the batters are installed prior to shipment.

At the top of FIG. 11 is an INITIALIZE SYSTEM BLOCK 350 which provides a path into the initialization portion of the flow chart of FIG. 11 without the need to pass through the power on sequence beginning at POWER ON block 301.

Figure 12A:
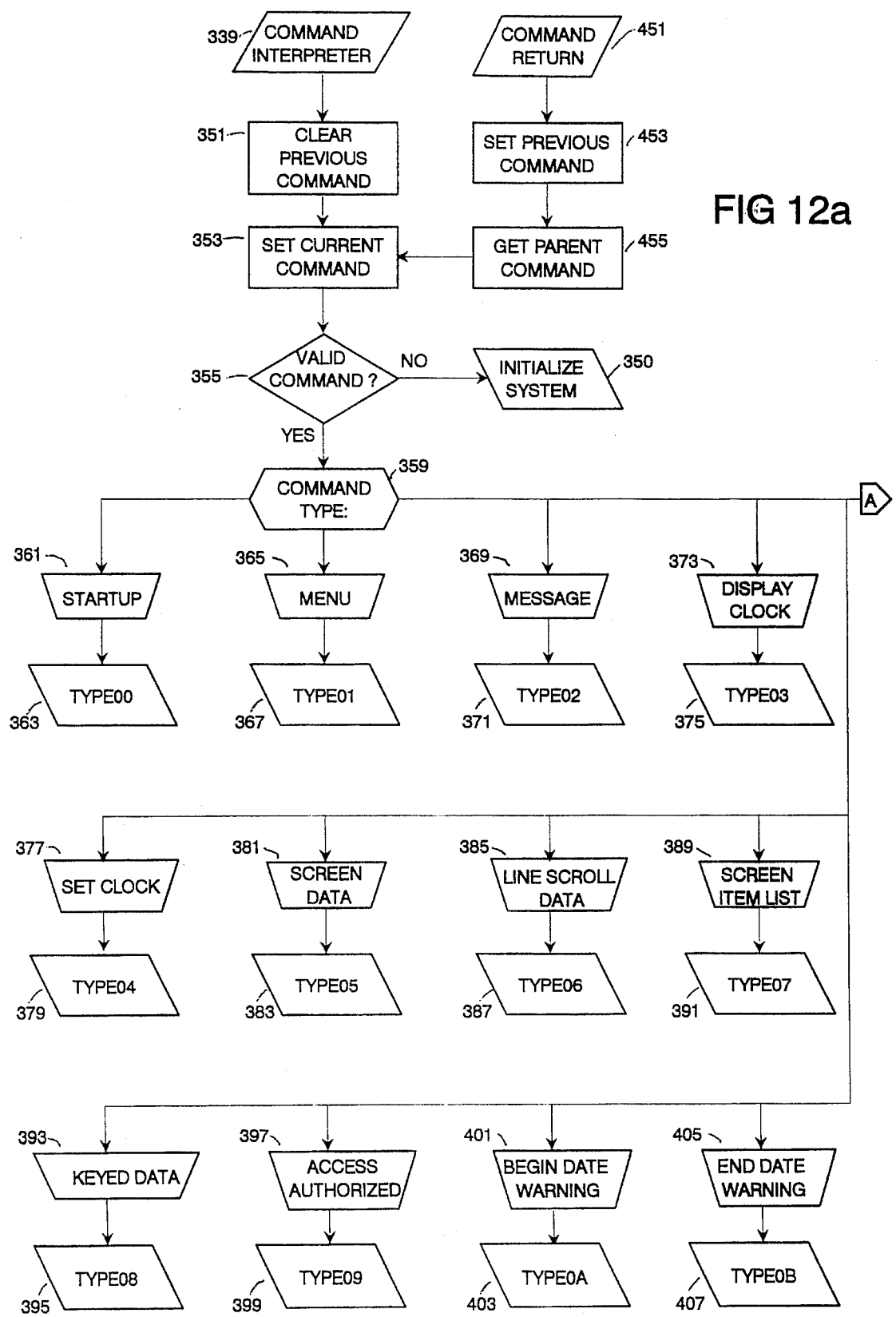
FIGS. 12 and 12B, is a logic flowchart of the command interpreter selection sequence for the directory of FIGS. 1–11.
Figure 12B:
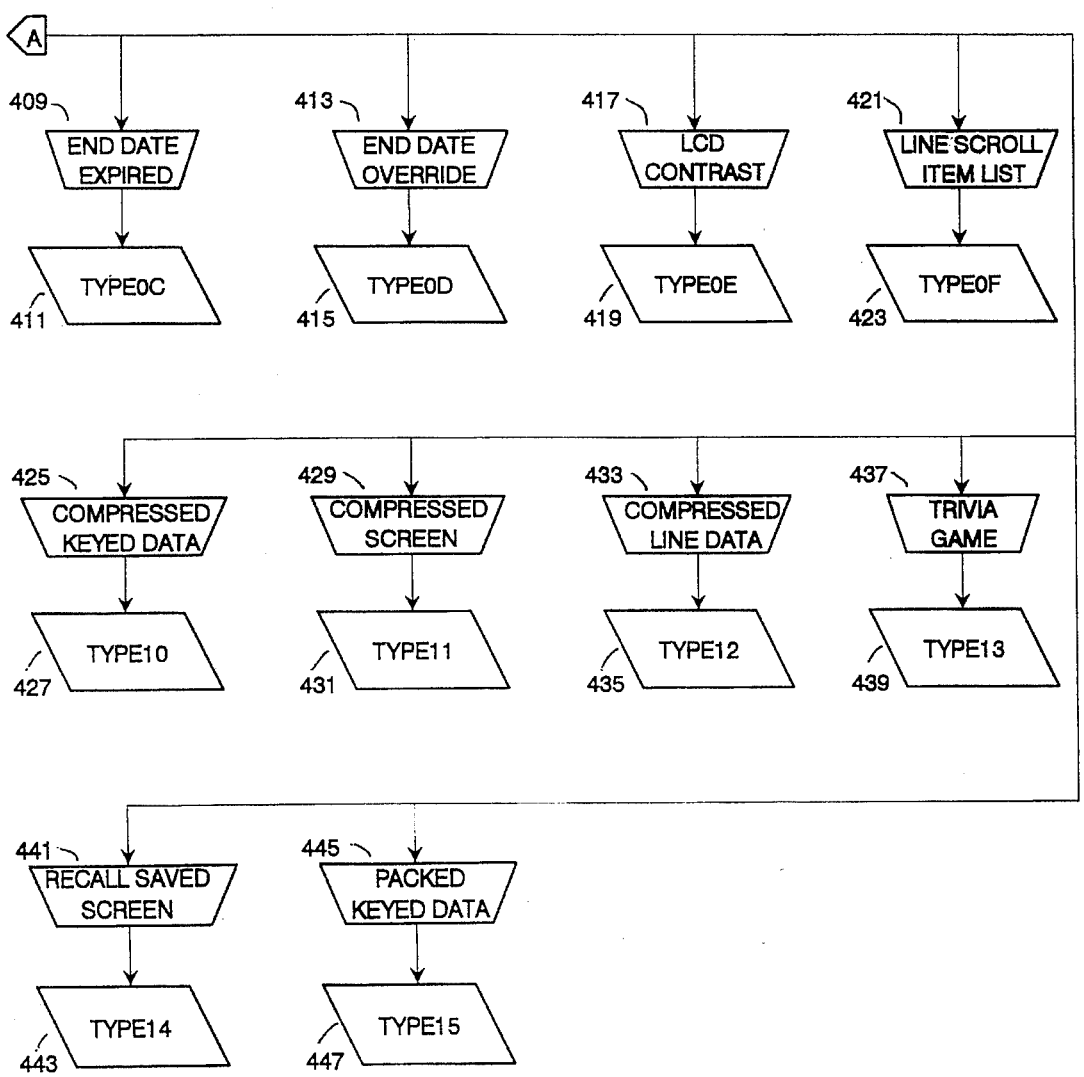

Referring to FIG. 12, a flowchart of the COMMAND INTERPRETER block 339, which was referenced in FIG. 11, is shown. From the COMMAND INTERPRETER block 339, the logic flows to a CLEAR PREVIOUS COMMAND block 351 where all vestiges of activity resulting from the last command are cleared. From the CLEAR PREVIOUS COMMAND block 351, the logic flows to a SET CURRENT COMMAND INDEX block 353 which is the first step in the selection of the proper command processor to handle the next task.

From the SET CURRENT COMMAND block 353, the logic flows to a VALID COMMAND decision diamond 355. A YES decision, triggered by the existence of a valid index number of the command and the command is of a type which the system 21 is programmed to execute, causes the logic to flow to a COMMAND TYPE classification block 359. At COMMAND TYPE classification block 359 the logic is routed in accord with the various types of command types available. In FIG. 12, the command types are, beginning from the left side of COMMAND TYPE classification block 359, a STARTUP start block 361 logically leading to a TYPE 00 command handler 363, a MENU start block 365 logically leading to a TYPE 01 command handler 367, a MESSAGE start block 369 logically leading to a TYPE 02 command handler 371, a DISPLAY CLOCK start block 373 logically leading to a TYPE 03 command handler 375, a SET CLOCK start block 377 logically leading to a TYPE 04 command handler 379, a SCREEN DATA start block 381 logically leading to a TYPE 05 command handler 383, a LINE SCROLL DATA start block 385 logically leading to a TYPE 06 command handler 387, a SCREEN ITEM LIST start block 389 logically leading to a TYPE 07 command handler 391, a KEYED DATA start block 393 logically leading to a TYPE 08 command handler 395, an ACCESS AUTHORIZED start block 397 logically leading to a TYPE 09 command handler 399, a BEGIN DATE WARNING start block 401 logically leading to a TYPE 0A command handler 403, an END DATE WARNING start block 405 logically leading to a TYPE 0B command handler 407, an END DATE EXPIRED start block 409 logically leading to a TYPE 0C command handler 411, add blocks 413 to 427 a COMPRESSED SCREEN SCROLL start block 429 logically leading to a TYPE 11 command handler 431, a COMPRESSED LINE DATA start block 433 logically leading to a TYPE 12 command handler 435, a TRIVIA GAME start block 437 logically leading to a TYPE 13 command handler 439, a RECALL SAVED SCREEN start block 441 logically leading to a TYPE 14 command handler 443, and finally a PACKED KEYED DATA start block 445 logically leading to a TYPE 15 command handler 447.

If the VALID COMMAND decision diamond 355 resulted in a NO decision, the logic flows to the INITIALIZE SYSTEM block 350 which was previously shown on FIG. 11. This INITIALIZE SYSTEM block 350 which is shown on FIG. 12 does not have any paths leading from it, since it represents a return to the logic flow sequence of FIG. 11.

Adjacent the COMMAND INTERPRETER block 339 is a COMMAND RETURN block 451. From COMMAND RETURN block 451, the logic flows to a SET PREVIOUS COMMAND block 453 which is used by some command handlers to determine the last child command executed. From SET PREVIOUS COMMAND block 453, the logic flows to a GET PARENT COMMAND block 455. From GET PARENT COMMAND block 455, the logic flows back to SET CURRENT COMMAND INDEX 353, and the command selection path logic flows described for FIG. 12 are again repeated.

Figure 13:
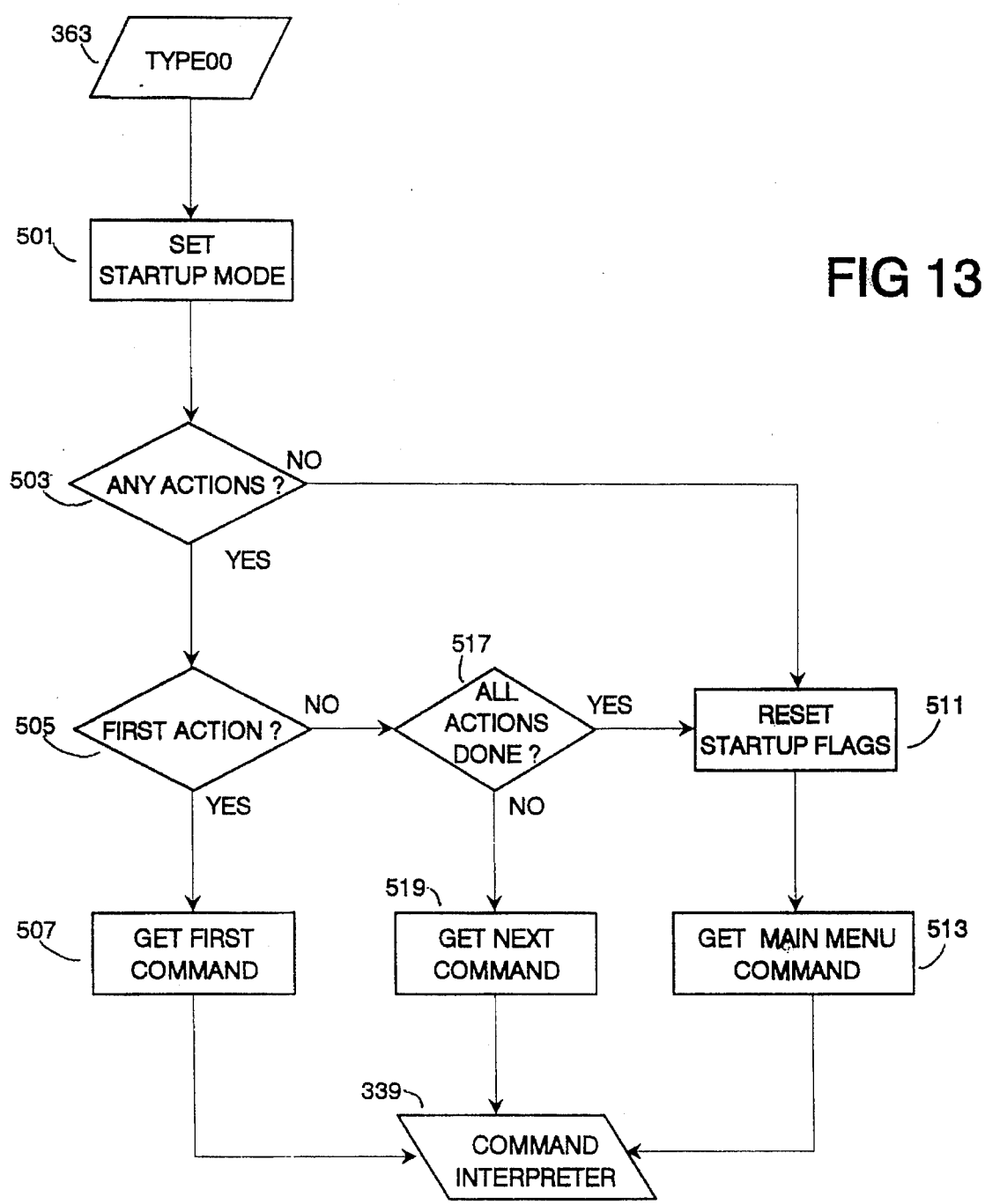
FIG. 13, is a logic flowchart of the type 00 command handler shown in FIG. 12.

The following figures will include a description of the various command handlers outlined in FIG. 12. Referring to FIG. 13, the command handler type 00 is illustrated, which processes a list of command that are to be executed in sequence. From TYPE 00 block 363, which was shown in FIG. 12, the logic flows to a SET STARTUP MODE command block 501, where a flag is set that can be tested by child commands. The logic next flows to an ANY ACTIONS? decision diamond 503.

If a YES result occurs, the logic flows to a FIRST ACTION decision diamond 505. If there is a first action to be completed, there is a YES result, and the logic flows to a GET FIRST COMMAND block 507, where the command index of the first child command needed is acquired. From the GET FIRST COMMAND block 507, the logic flows to the COMMAND INTERPRETER 339, where the necessary child command is executed, and which was previously shown on FIG. 12.

In the event of a NO decision at the ANY ACTIONS? decision diamond 503, the logic flows to a RESET STARTUP FLAGS command block 511, where the startup mode flag and the display clock inhibit flag are reset. From the RESET STARTUP FLAGS command block 511, the logic flows to the GET MAIN MENU COMMAND command block 513, where the main menu command index is acquired. The logic next flows back to the COMMAND INTERPRETER 339, where the necessary command is executed, and which was previously shown on FIG. 12.

In the event of a NO decision from the FIRST ACTION decision diamond 505, the logic flows to an ALL ACTIONS DONE decision diamond 517. A YES decision at the ALL ACTIONS DONE decision diamond 517 leads back to RESET STARTUP FLAGS command block 511. A NO decision at the ALL ACTIONS DONE decision diamond 517 leads to a GET NEXT COMMAND command block 519, where the command index of the next child command is acquired. The logic then flows to the COMMAND INTERPRETER 339, where the necessary command is executed, and which was previously shown on FIG. 12.

Figure 14:
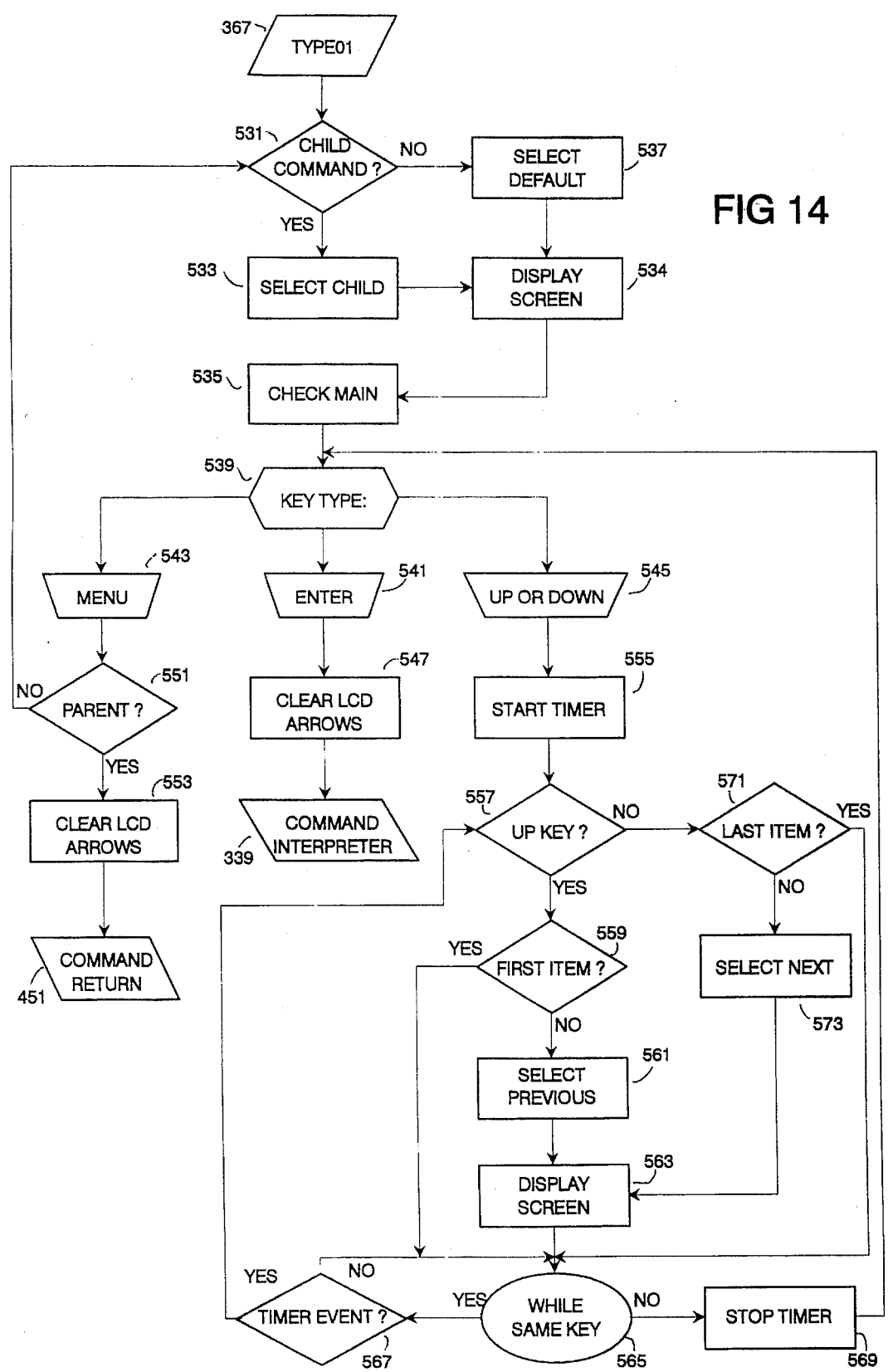
FIG. 14, is a logic flowchart of the type 01 command handler shown in FIG. 12.

Referring to FIG. 14, the command handler type 01 is illustrated, which processes a menu command that allows a command from the menu to be executed. From TYPE 01 block 367, which was shown in FIG. 12, the logic flows to a CHILD COMMAND decision diamond 531, where it is determined if this point in the command execution sequence originated from a child command, or whether this execution sequence began from a parent command. If a YES decision is reached, the logic flows to a SELECT CHILD command block 533, where the previous child command is selected by the program. From the SELECT CHILD command block 533, the logic flows to a DISPLAY SCREEN command block 534, where the command menu is displayed with the child command selected.

In the event that a NO decision was formulated at the CHILD COMMAND decision diamond 531, the logic flows to a SELECT DEFAULT command block 537, where the default command is selected by the program. The logic then flows to the DISPLAY SCREEN command block 534, where the command menu is displayed with the default command selected.

Figure 32:
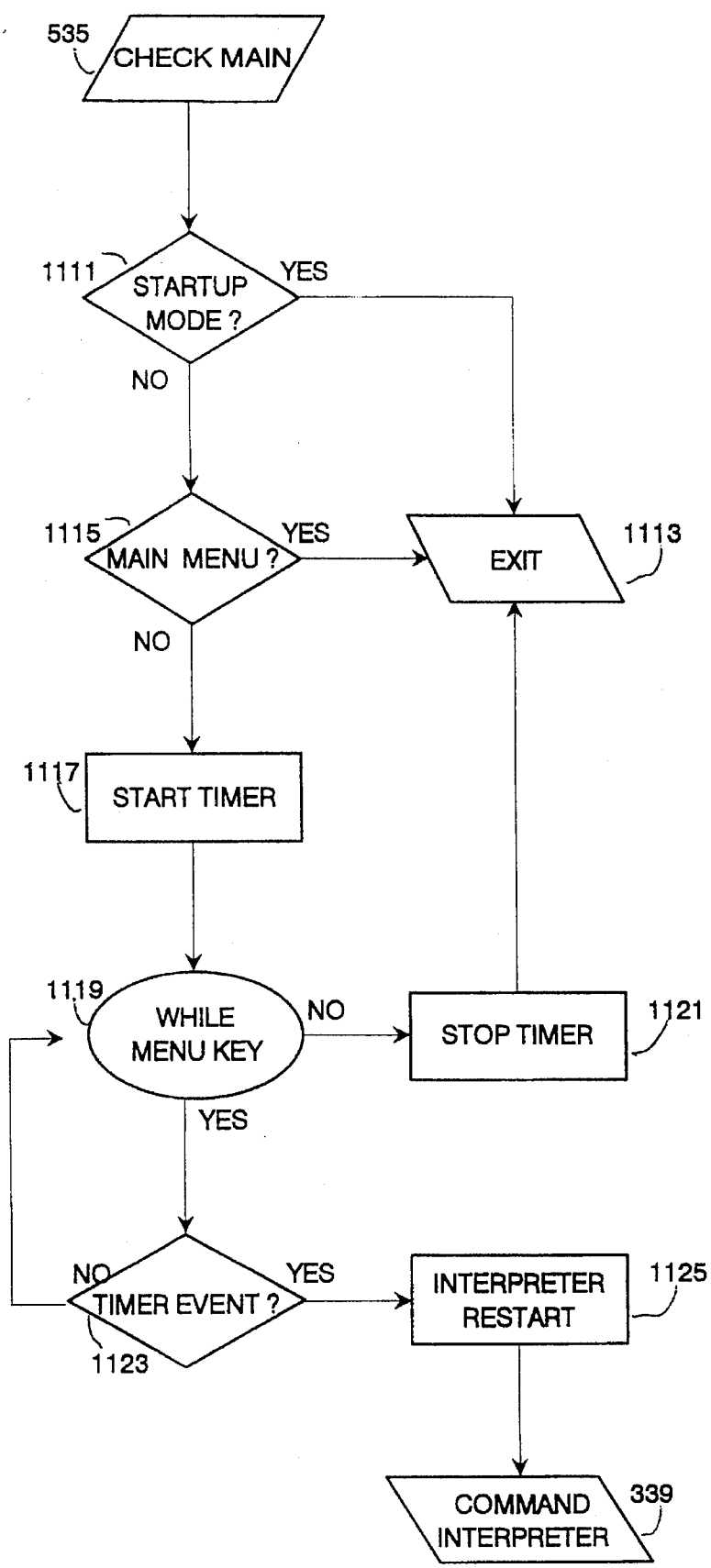
FIG. 32 is a logic flowchart of a CHECK MAIN MENU subroutine utilized in FIGS. 14, 18, 19, 20, 21, 28, and 29.

From the DISPLAY SCREEN command block 534, the logic flows to a CHECK MAIN command block 535, where command block 535, where a subroutine is called to test if a return to the main menu is being requested which is illustrated on FIG. 32. From the CHECK MAIN command block 535, the logic flows to a KEY TYPE classification block 539. From the KEY TYPE classification block 539 the logic can flow to an ENTER start block 541, a MENU start block 543, or a UP OR DOWN start block 545, depending upon whether the enter button switch 33, menu button switch 31 or, either of the up or down cursor button switches 27 or 29, respectively are activated.

From the ENTER start block 541, the logic flows to a CLEAR LCD ARROWS command block 547, where the LCD arrows appearing on screen 35 are deactivated. From the CLEAR LCD ARROWS command block 547, the logic flows to COMMAND INTERPRETER block 339, which previously appeared at FIG. 12.

From the MENU start block 543, the logic flows to a PARENT decision diamond 551, at which the presence of a parent command is tested. If a NO decision is reached, the logic flows back to the CHILD COMMAND decision diamond 531. If a YES decision is reached, the logic flows to a CLEAR LCD ARROWS command block 553, where the LCD arrows appearing on the screen 35 are de-activated. The logic then continues to flow to a COMMAND RETURN block 451 which previously appeared at FIG. 12.

From the UP OR DOWN start block 545, the logic flows to a START TIMER command block 555, which will be used subsequently in the logic flow to determine when to select another command while the up or down cursor button switches 27 or 29 are continuously activated. From the START TIMER command block 555, the logic flows to an UP KEY decision diamond 557. A YES decision leads the logic flow to a FIRST ITEM decision diamond 559. A NO decision from the FIRST ITEM decision diamond 559 leads to a SELECT PREVIOUS command block 561 which selects the previous command on the screen.

From the SELECT PREVIOUS command block 561, the logic proceeds to a DISPLAY SCREEN command block 563, where a menu of commands containing the selected command is displayed on the screen. From the DISPLAY SCREEN command block 563 the logic flows to a WHILE SAME KEY decision oval 565. If the same key, namely one of the up or down cursor button switches 27 or 29, is still being pressed, a YES decision occurs and the logic flows to a TIMER EVENT decision diamond 567. If the timer event has occurred, a YES decision results and the logic flows back to the UP KEY decision diamond 557. If the timer event has not occurred, a NO decision results and the logic flows back to the WHILE SAME KEY decision oval 565. A YES decision from the FIRST ITEM decision diamond 559 also leads the WHILE SAME KEY decision oval 565.

A NO decision at the WHILE SAME KEY decision oval 565 leads to a STOP TIMER command block 569. From the STOP TIMER command block 569, the logic then flows back to the KEY TYPE classification block 539.

A NO decision from the UP KEY decision diamond 557 causes the logic to flow to a LAST ITEM decision diamond 571. A YES decision causes the logic to flow to the WHILE SAME KEY decision oval 565. A NO decision causes the logic to flow to a SELECT NEXT command block 573, which selects the next command on the screen. From the SELECT NEXT command block 573 the logic flows to the DISPLAY SCREEN command block 563.

Figure 15:
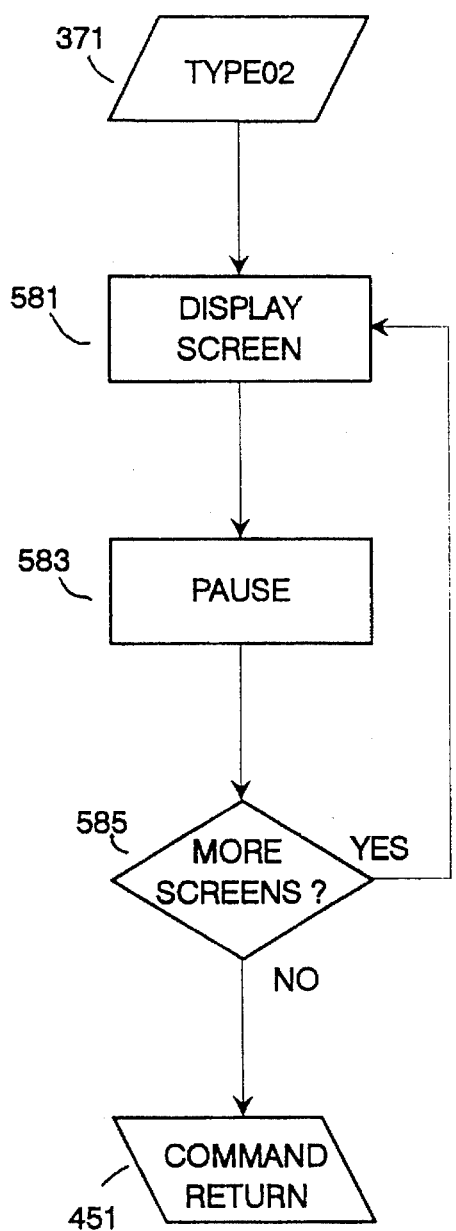
FIG. 15, is a logic flowchart of the type 02 command handler shown in FIG. 12.

Referring to FIG. 15, the command handler type 02 is illustrated, which processes a message command that displays a series of messages on the screen. From TYPE 02 block 371, which was shown in FIG. 12, the logic flows to a DISPLAY SCREEN command block 581, where a message screen is displayed. The logic then flows to a PAUSE command block 583, where the logic flow is suspended for an interval of time or until one of the key switches is activated. From the PAUSE command block 583, the logic flows to a MORE SCREENS decision diamond 585. The existence of more message screens results in a YES result, and the logic flows back to DISPLAY SCREEN command block 581. The existence of no more screens results in a NO result, and the logic flows to a COMMAND RETURN block 451 which was previously shown on FIG. 12.

Figure 16:
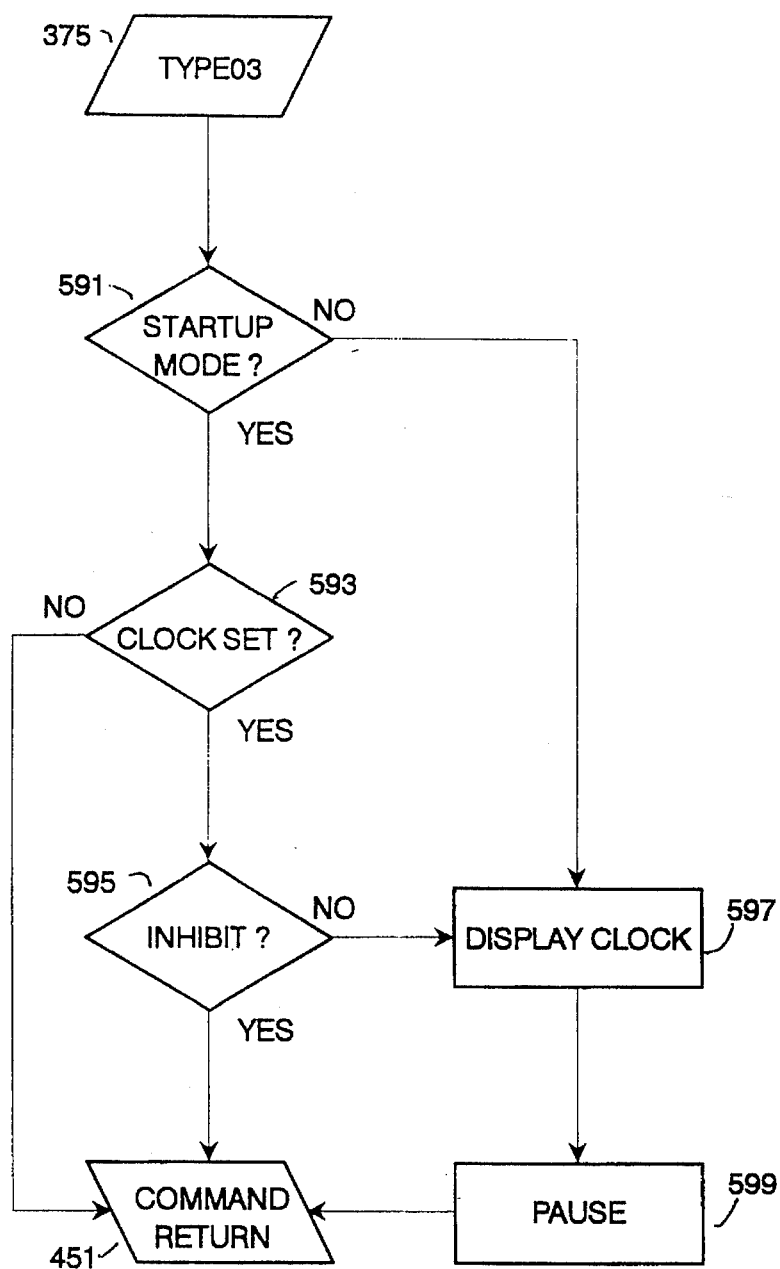
FIG. 16, is a logic flowchart of the type 03 command handler shown in FIG. 12.

Referring to FIG. 16, the command handler type 03 is illustrated, which processes a display clock command that displays the current day, date and time on the screen. From TYPE 03 block 375, which was shown in FIG. 12, the logic flows to a START UP MODE? decision diamond 591, where the start up mode is tested. A YES answer causes the logic to flow to a CLOCK SET decision diamond 593 where the set state of the clock is tested.

A NO decision at the CLOCK SET decision diamond causes the logic to flow to the COMMAND RETURN block 451 which was previously shown on FIG. 12. A YES decision at the CLOCK SET decision diamond causes the logic to flow to an INHIBIT decision diamond 595, where the clock display inhibited flag is tested.

A YES decision at the INHIBIT decision diamond 595 causes the logic to flow to the COMMAND RETURN block 451 which was previously shown on FIG. 12. A No decision at the START UP MODE decision diamond 591, or at the INHIBIT decision diamond 595 causes the logic to flow to a DISPLAY CLOCK command block 597 where a screen with the current Day, Date and Time is displayed. From the DISPLAY CLOCK command block 597 the logic flows to a PAUSE command block 599, where the logic flow is suspended for an interval of time or until one of the key switches is activated. From the PAUSE command block 599 the logic flows to A COMMAND RETURN block 451 which was previously shown on FIG. 12.

Figure 17:
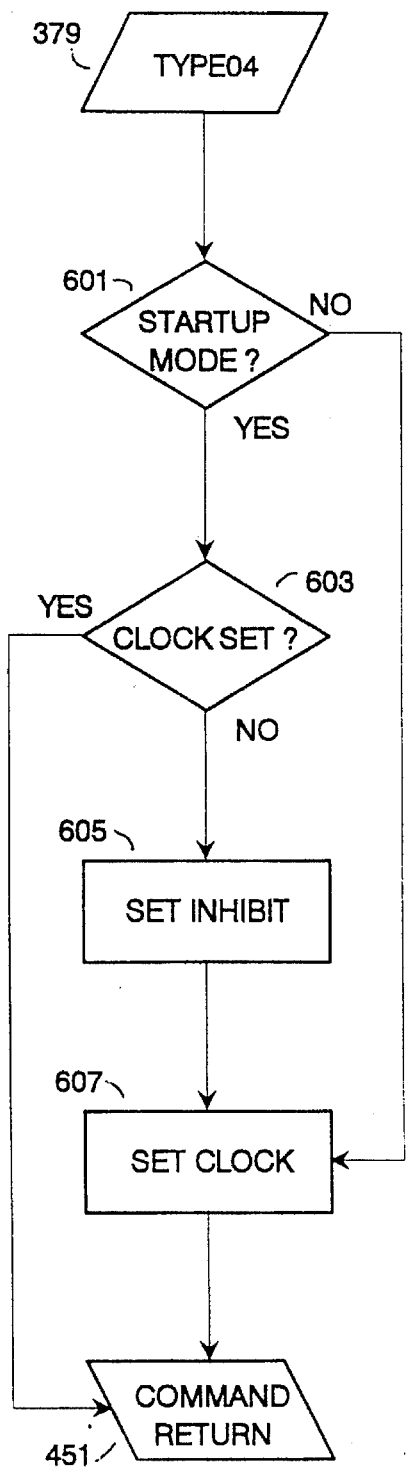
FIG. 17, is a logic flowchart of the type 04 command handler shown in FIG. 12.

Referring to FIG. 17, the command handler type 04 is illustrated, which processes a set clock command that allows the ASIC Real Time Clock to be set. From TYPE 04 block 379, which was shown in FIG. 12, the logic flows to a START UP MODE? decision diamond 601, where the start up mode is tested. A YES answer causes the logic to flow to a CLOCK SET decision diamond 603 where the set state of the clock is tested.

A NO decision at the CLOCK SET decision diamond causes the logic to flow to a SET INHIBIT block 605, which sets the clock display inhibited flag. From SET INHIBIT block 605 the logic flows to a SET CLOCK block 607 where the current date and time may be entered. From the SET CLOCK block 607, the logic flows to the COMMAND RETURN block 451 which was previously shown on FIG. 12. A No decision at the START UP MODE? decision diamond 601 causes the logic to flow to the SET CLOCK block 607. A YES decision at the CLOCK SET? decision diamond 603 also causes the logic to flow to the COMMAND RETURN block 451.

Figure 18:
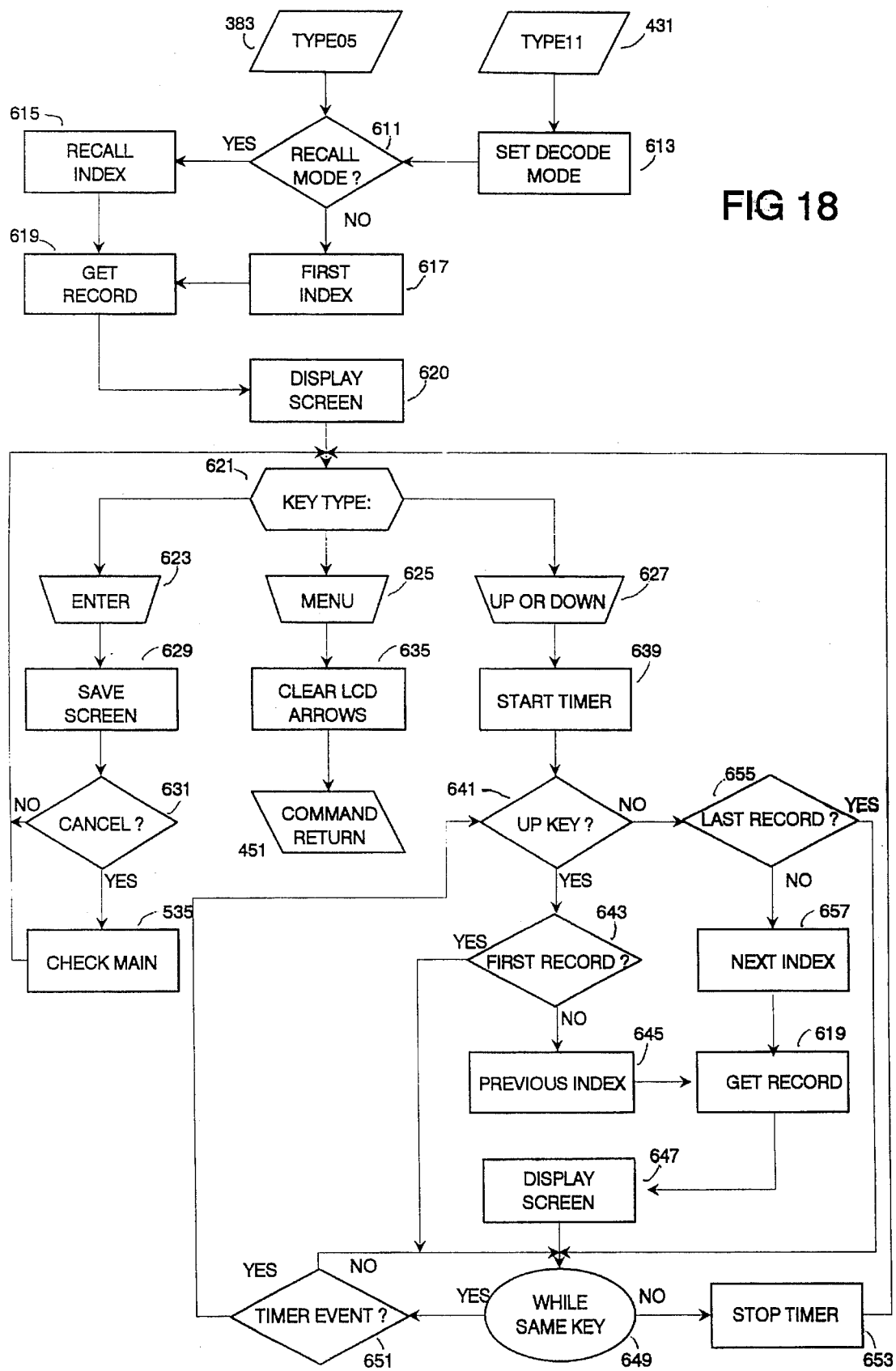
FIG. 18, is a logic flowchart of the types 05 and 11 command handlers shown in FIG. 12.

Referring to FIG. 18, the command handler types 05 and 11 are illustrated, which processes a display either plain or compressed data with scrolling by screen commands. At the upper left center of FIG. 18, is the TYPE 05 block 383, which was shown in FIG. 12. At the upper right center of FIG. 18 is the TYPE 11 block 431, which was also shown in FIG. 12.

From TYPE 05 block 383, the logic flows to a RECALL MODE decision diamond 611, where the recall mode is tested. From TYPE 11 block 431, the logic flows to a SET DECODE MODE command block 613, which sets the compressed data flag. From the SET DECODE MODE command block 613, the logic also flows to the RECALL MODE decision diamond 611.

Figure 35:
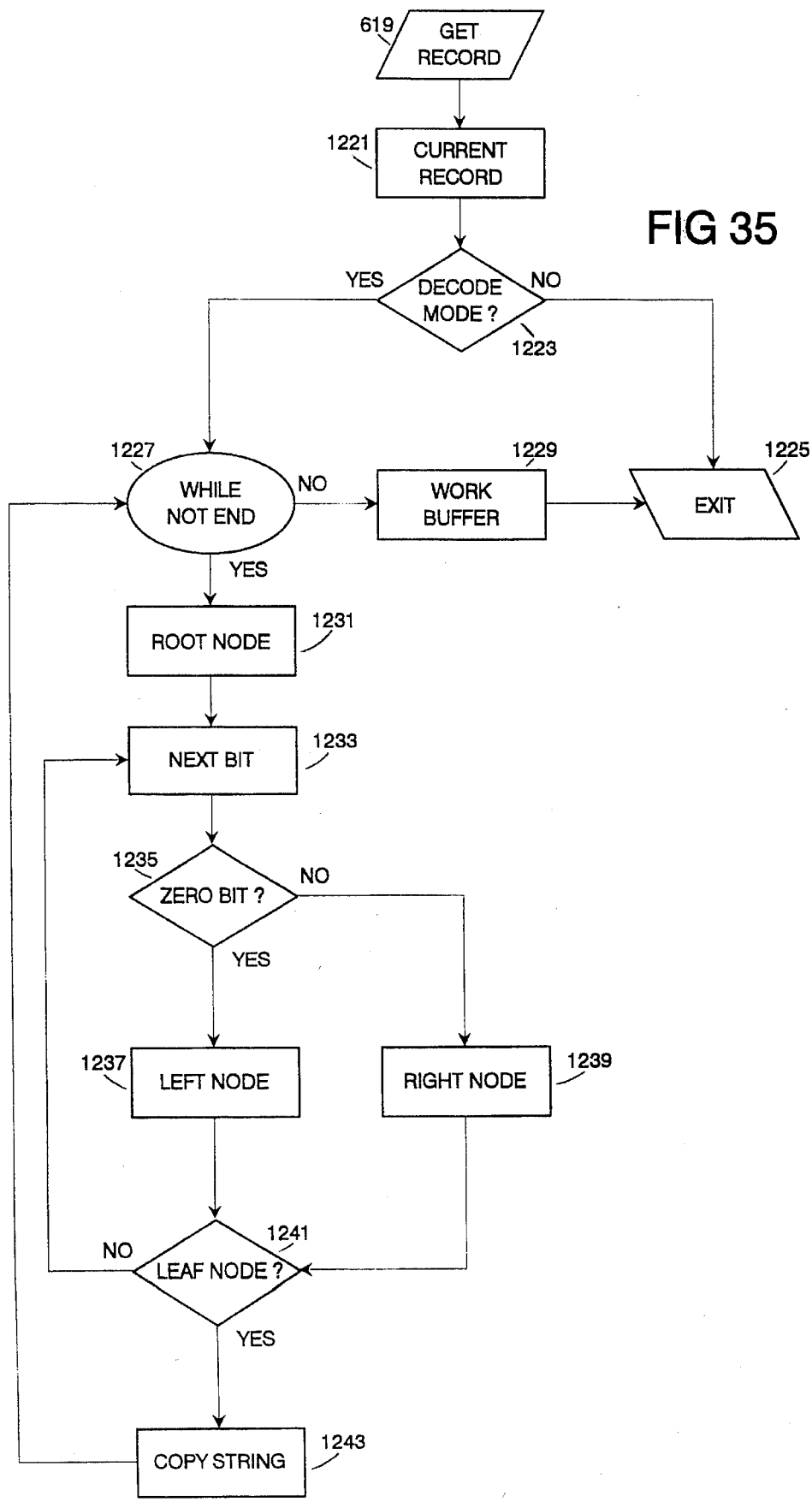
FIG. 35 is a logic flowchart of a GET RECORD subroutine.

A YES decision from the RECALL MODE decision diamond 611 leads to a RECALL INDEX command block 615 where the record index of the saved screen is acquired and the recall mode is reset. A NO decision from the RECALL MODE decision diamond 611 leads to a FIRST INDEX command block 617 where the record index is reset. The logic from both the RECALL INDEX command block 615 and the FIRST INDEX command block 617 flow to a GET RECORD command block 619, where a subroutine is called to retrieve the record from the ROM 143 which is illustrated in FIG. 35. From the GET RECORD DISPLAY SCREEN command block 620, where the data record is displayed on the screen. From the DISPLAY SCREEN command block 620, the logic flows to a command block 619, the logic flows to a KEY TYPE classification block 621.

From the KEY TYPE classification block 621 the logic can flow to an ENTER start block 623, MENU start block 625, or a UP OR DOWN start block 627, depending upon whether the enter button switch 33, menu button switch 31 or, either of the up or down cursor button switches 27 or 29, respectively are activated.

From the ENTER start block 623, the logic flows to a SAVE SCREEN command block 629 where a subroutine is called to save the current record, recall a previously saved record or swap the current record for a previously saved record. From the SAVE SCREEN command block 629, the logic flows to a CANCEL decision diamond 631, where the status of the save screen function is tested. A YES decision logically leads to a CHECK MAIN command block 535, which was shown on FIG. 14. The logic flow from the CHECK MAIN command block 535, and from a NO decision at the CANCEL decision diamond 631 both lead back to KEY TYPE classification block 621.

From the MENU start block 625, the logic flows to a CLEAR LCD ARROWS command block 635, where the LCD arrows appearing on screen 35 are deactivated and the decode mode is reset. The logic then continues to flow to a COMMAND RETURN block 451 which previously appeared at FIG. 12.

From the UP OR DOWN start block 627, the logic flows to a START TIMER command block 639, which will be used subsequently in the logic flow to determine when to display another data record while the up or down cursor button switches 27 or 29 are continuously activated. From the START TIMER command block 639, the logic flows to an UP KEY decision diamond 641. A YES decision leads the logic flow to a FIRST RECORD? decision diamond 643. A NO decision from the FIRST RECORD? decision diamond 643 leads to a PREVIOUS INDEX command block 645, which decrements the current record index. From the PREVIOUS INDEX command block 645, the logic flow leads to a GET RECORD command block 619.

From the GET RECORD command block 619, the logic flows to a DISPLAY SCREEN command block 647, where the data record is displayed on the screen. From the DISPLAY SCREEN command block 647, the logic flows to a WHILE SAME KEY decision oval 649. A YES decision at the WHILE SAME KEY decision oval 649 leads to a TIMER EVENT decision diamond 651. A YES result at the TIMER EVENT decision diamond 651 causes the logic to flow back to the UP KEY decision diamond 641. A NO result at the TIMER EVENT decision diamond 651 causes the logic to flow back to the WHILE SAME KEY decision oval 649.

A NO decision at the WHILE SAME KEY decision oval 649 leads to a STOP TIMER command block 653. The logic then leads from the STOP TIMER command block 653 back to the KEY TYPE classification block 621.

A NO decision at the UP KEY decision diamond 641 leads to a LAST RECORD decision diamond 655. A YES decision at the LAST RECORD decision diamond 655 leads back to the WHILE SAME KEY decision oval 649. A NO decision at the LAST RECORD decision diamond leads to NEXT INDEX command block 657, which increments the current record index. From the NEXT INDEX command block 657, the logic flows again to the GET RECORD command block 619, and from there to other paths as outlined above.

Figure 19:
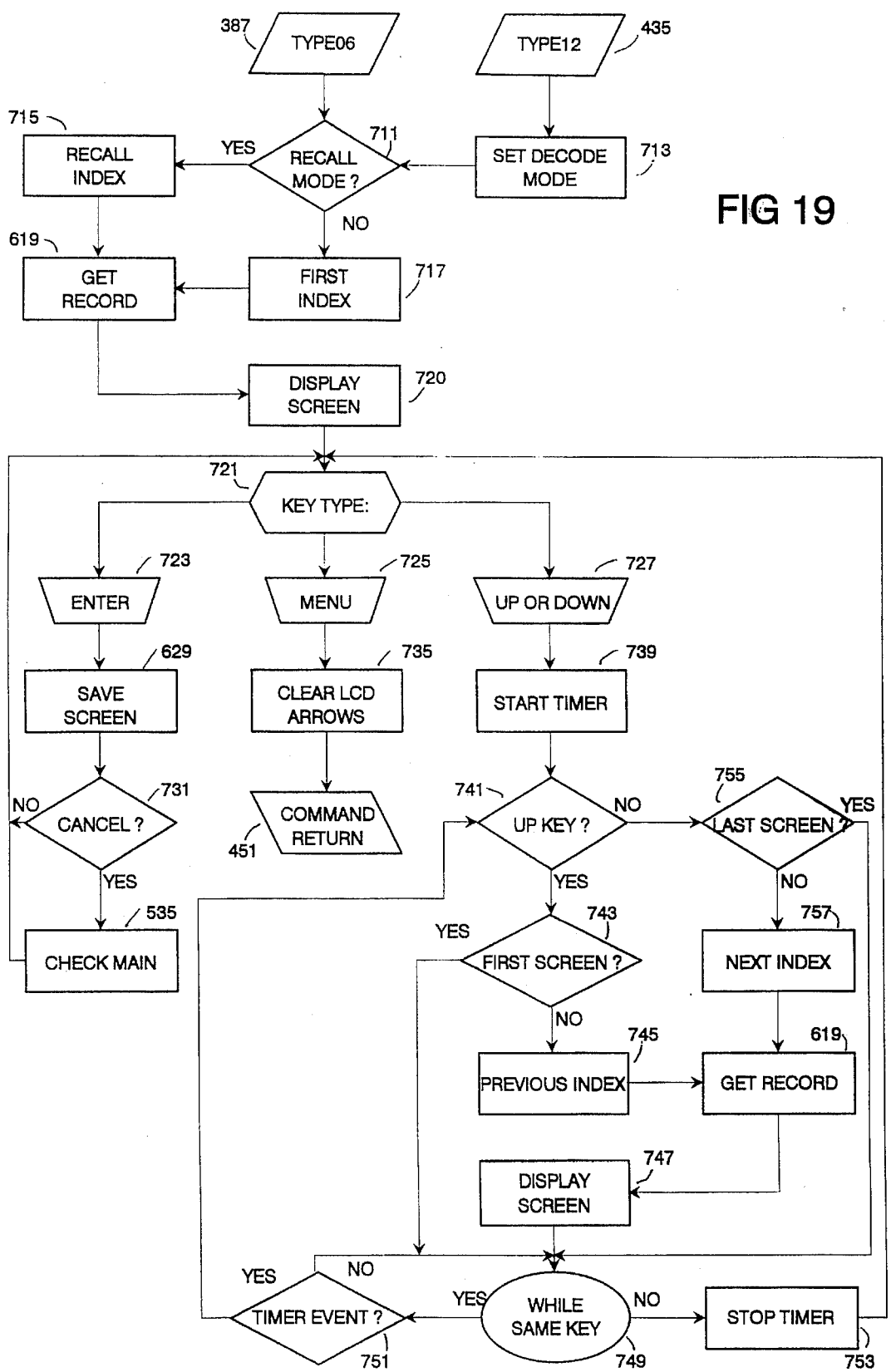
FIG. 19, is a logic flowchart of the types 06 and 12 command handlers shown in FIG. 12.

Referring to FIG. 19, the command handler types 06 and 12 are illustrated, which processes a display either plain or compressed data with scrolling by line commands. At the upper left center of FIG. 19, is the TYPE 06 block 387, which was shown in FIG. 12. At the upper right center of FIG. 19 is the TYPE 12 block 435, which was also shown in FIG. 12.

From TYPE 06 block 387, the logic flows to a RECALL MODE decision diamond 711, where the recall mode is tested. From TYPE 12 block 435, the logic flows to a SET DECODE MODE command block 713, which sets the compressed data flag. From the SET DECODE MODE command block 713, the logic also flows to the RECALL MODE decision diamond 711.

A YES decision from the RECALL MODE decision diamond 711 leads to a RECALL INDEX command block 715 where the record index of the save screen is acquired. A NO decision from the RECALL MODE decision diamond 711 leads to a FIRST INDEX command block 717 where the record index is reset. The logic from both the RECALL INDEX command block 715 and the FIRST INDEX command block 717 flow to a GET RECORD command block 619 where a subroutine is called to retrieve the record from the ROM 143 which is illustrated on FIG. 35. From the GET RECORD command block 619, the logic flows to a DISPLAY SCREEN command block 720, where the data record is displayed on the screen. From the DISPLAY SCREEN command block 720, the logic flows to a KEY TYPE classification block 721.

From the KEY TYPE classification block 721 the logic can flow to an ENTER start block 723, MENU start block 725, or a UP OR DOWN start block 727, depending upon whether the enter button switch 33, menu button switch 31 or, either of the up or down cursor button switches 27 or 29, respectively are activated.

From the ENTER start block 723, the logic flows to a SAVE SCREEN command block 629, where a subroutine is called to save the current record, recall a previously saved record, or swap the current record for a previously saved record. From the SAVE SCREEN command block 629, the logic flows to a CANCEL decision diamond 731, where the status of the save screen function is tested. A YES decision logically leads to a CHECK MAIN command block 535, which was shown in FIG. 14. The logic flow from the CHECK MAIN command block 535, and from a NO decision at the CANCEL decision diamond 731 both lead back to KEY TYPE classification block 721.

From the MENU start block 725, the logic flows to a CLEAR LCD ARROWS command block 735, where the LCD arrows appearing on screen 35 are deactivated and the decode mode is reset. The logic then continues to flow to a COMMAND RETURN block 451 which previously appeared at FIG. 12.

From the UP OR DOWN start block 727, the logic flows to a START TIMER command block 739, which will be used subsequently in the logic flow to determine when to display another data record while the up or down cursor button switcher 27 or 29 are continuously activated. From the START TIMER command block 739, the logic flows to an UP KEY decision diamond 741. A YES decision leads the logic flow to a FIRST SCREEN? decision diamond 743. A NO decision from the FIRST SCREEN? decision diamond 743 leads to a PREVIOUS INDEX command block 745, which decrements the current record index and scrolls the screen down one line. From the PREVIOUS INDEX command block 745, the logic flow leads to a GET RECORD command block 619, which was shown in FIG. 18.

From the GET RECORD command block 619, the logic flows to a DISPLAY SCREEN command block 747, where the data record displayed on the screen. From the DISPLAY SCREEN command block 747, the logic flows to a WHILE SAME KEY decision oval 749. A YES decision at the WHILE SAME KEY decision oval 749 leads to a TIMER EVENT decision diamond 751. A YES result at the TIMER EVENT decision diamond 751 causes the logic to flow back to the UP KEY decision diamond 741. A NO result at the TIMER EVENT decision diamond 751 causes the logic to flow back to the WHILE SAME KEY decision oval 749.

A NO decision at the WHILE SAME KEY decision oval 749 leads to a STOP TIMER command block 753. The logic then leads from the STOP TIMER command block 753 back to the KEY TYPE classification block 721.

A NO decision at the UP KEY decision diamond 741 leads to a LAST SCREEN decision diamond 755. A YES decision at the LAST SCREEN decision diamond 755 leads back to the WHILE SAME KEY decision oval 749. A NO decision at the LAST RECORD decision diamond leads to NEXT INDEX command block 757, which increments the current record index and scrolls the screen up one line. From the NEXT INDEX command block 757, the logic flows again to the GET RECORD command block 619, and from there to other paths as outlined above.

Figure 20:
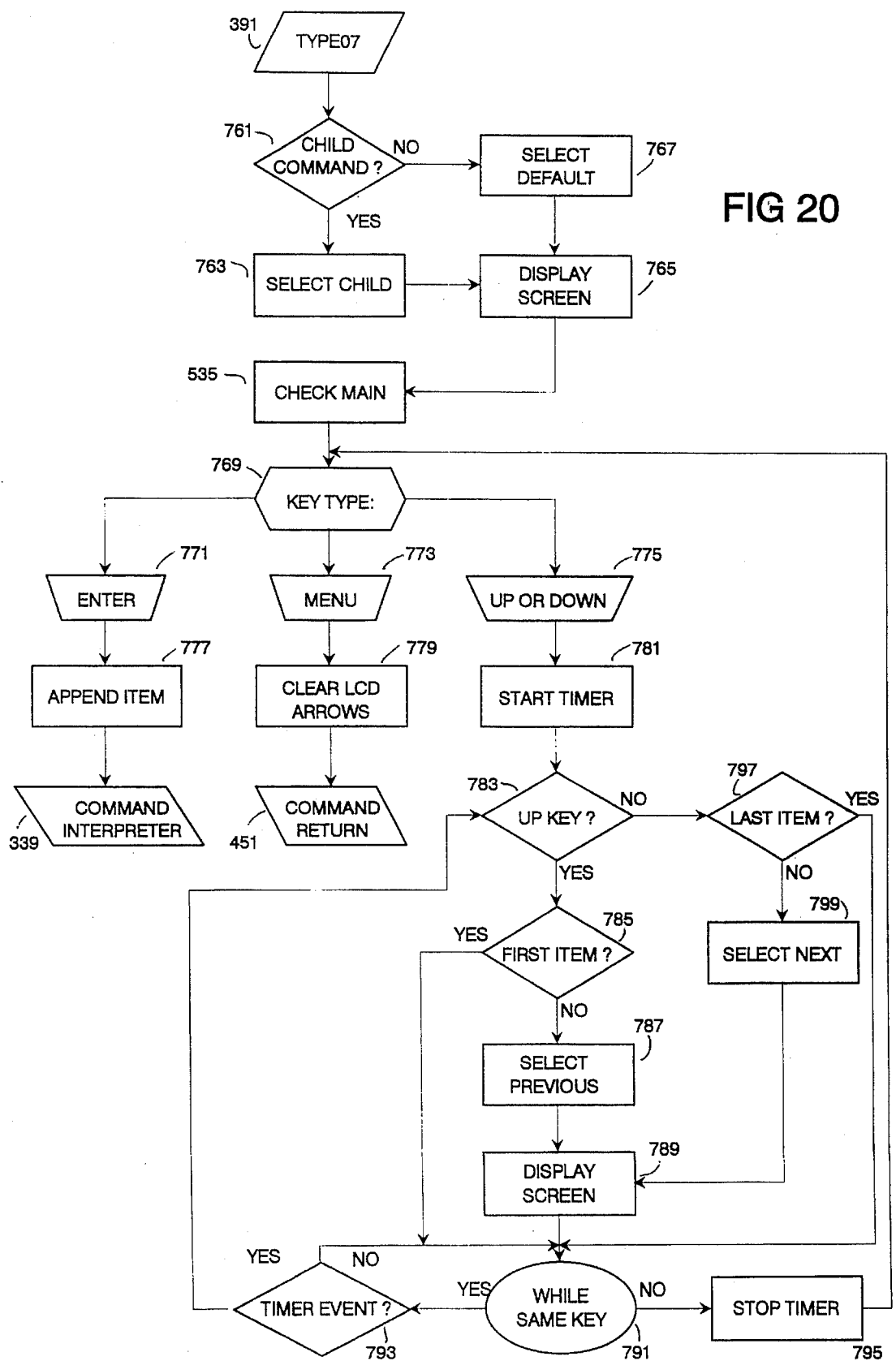
FIG. 20, is a logic flowchart of the type 07 command handler shown in FIG. 12.

Referring to FIG. 20, the command handler type 07 is illustrated, which processes a select item from list with screen scrolling command. From TYPE 07 block 391, which was shown in FIG. 12, the logic flows to a CHILD COMMAND? decision diamond 761, where it is determined if this point in the command execution sequence originated from a child command or whether this execution sequence began from a parent command. If a YES decision is reached, the logic flows to a SELECT CHILD.command block 763, where the previous child item is selected by the program and the previous child item is removed from the end of the search key. From the SELECT CHILD command block 763, the logic flows to a DISPLAY SCREEN command block 765, where a list of items is displayed with the child item selected.

In the event that a NO decision was formulated at the CHILD COMMAND decision diamond 761, the logic flows to a SELECT DEFAULT command block 767, where the default item is selected by the program. The logic then flows to the DISPLAY SCREEN command block 765, where a list of items is displayed with the default item selected.

From the DISPLAY SCREEN command block 765, the logic flows to a KEY TYPE classification block 769. From the KEY TYPE classification block 769 the logic can flow to an ENTER start block 771, a command block 765, the logic flows to a CHECK MAIN command block 535, which was shown in FIG. 14. From the CHECK MAIN command block 535, the logic flows to a KEY TYPE: MENU start block 773, or a UP OR DOWN start block 775, depending upon whether the enter button switch 33, menu button switch 31 or, either of the up or down cursor button switches 27 or 29, respectively are activated.

From the ENTER start block 771, the logic flows to a APPEND ITEM command block 777, where the selected item is appended to the end of the search key and 35 are deactivated. From the APPEND ITEM command block 777, the logic flows to a COMMAND INTERPRETER block 339 which previously appeared at FIG. 12.

From the MENU start block 773, the logic flows to a CLEAR LCD ARROWS command block 779, where the arrows appearing on screen 35 are deactivated. From the CLEAR LCD ARROWS command block 779 the logic flows to a COMMAND RETURN block 451 which previously appeared at FIG. 12.

From the UP OR DOWN start block 775, the logic flows to a START TIMER command block 781, which will be used subsequently in the logic flow to determine when to select another item while the up or down cursor button switches 27 or 29 are continuously activated. From the START TIMER command block 781, the logic flows to an UP KEY decision diamond 783. A YES decision leads the logic flow to a FIRST ITEM decision diamond 785. A NO decision from the FIRST ITEM decision diamond 785 leads to a SELECT PREVIOUS command block 787, which selects the previous item on the screen.

From the SELECT PREVIOUS command block 787, the logic proceeds to a DISPLAY SCREEN command block 789, where a list of items containing the selected item is displayed on the screen. From the DISPLAY SCREEN command block 789 the logic flows to a WHILE SAME KEY decision oval 791. If the same key, namely one of the up or down cursor button switches 27 or 29, is still being pressed, a YES decision occurs and the logic flows to a TIMER EVENT decision diamond 793. If the timer event has occurred, a YES decision results and the logic flows back to the UP KEY decision diamond 783. If the timer event has not occurred, a NO decision results and the logic flows back to the WHILE SAME KEY decision oval 791. A YES decision from the FIRST ITEM decision diamond 785 also leads the WHILE SAME KEY decision oval 791.

A NO decision at the WHILE SAME KEY decision oval 791 leads to a STOP TIMER command block 795. From the STOP TIMER command block 795, the logic then flows back to the KEY TYPE classification block 769.

A NO decision from the UP KEY decision diamond 783 causes the logic to flow to a LAST ITEM decision diamond 797. A YES decision causes the logic to flow to the WHILE SAME KEY decision oval 791. A NO decision causes the logic to flow to a SELECT NEXT command block 799, which selects the next item on the screen. From the SELECT NEXT command block 799 the logic flows to the DISPLAY SCREEN command block 789.

Figure 21:
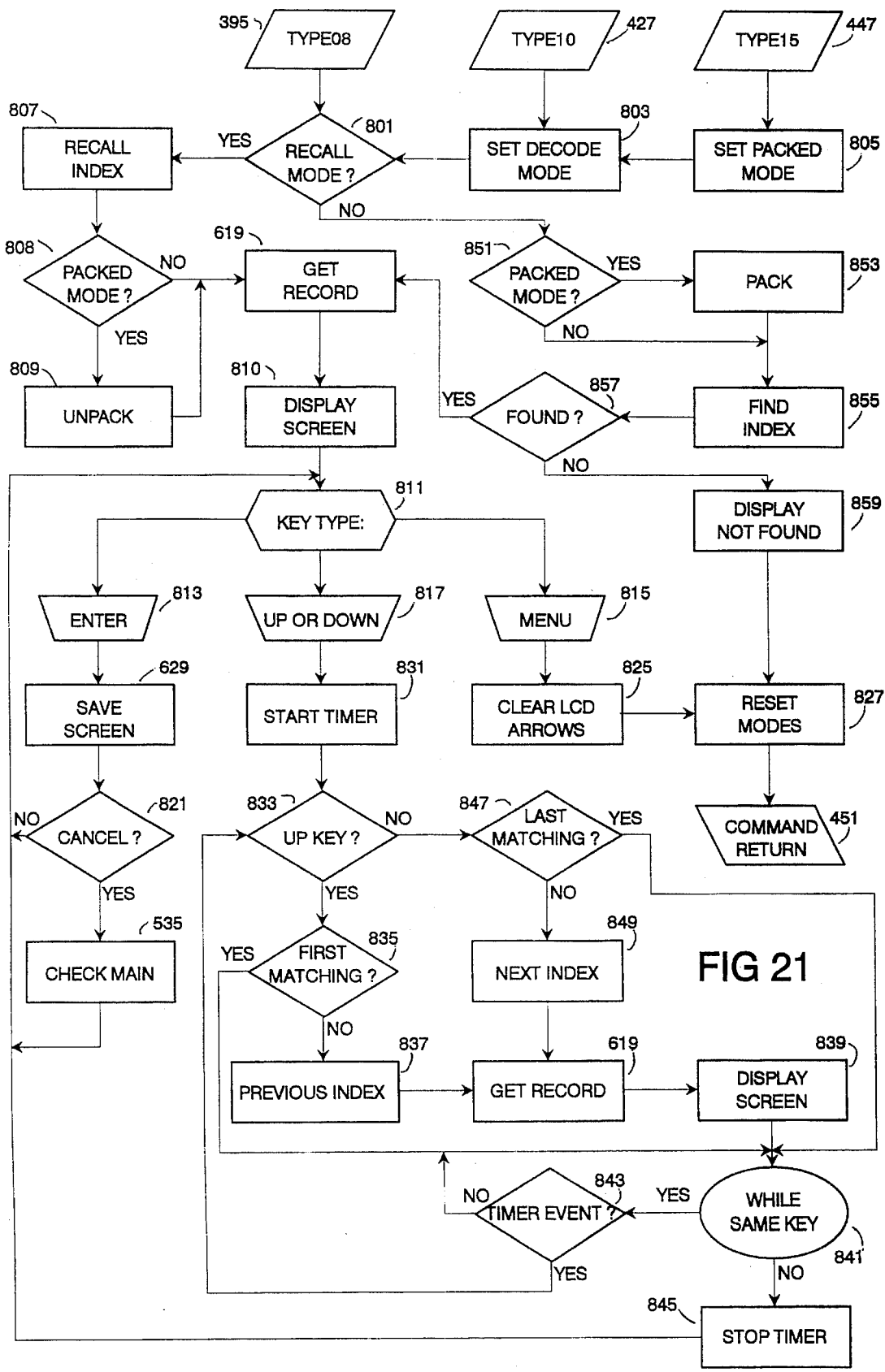
FIG. 21, is a logic flowchart of the types 08, 10 and 15 command handlers shown in FIG. 12.

Referring to FIG. 21, the command handler types 08, 10, and 15 are illustrated, which process a display either plain, compressed, or packed data with search key commands. From TYPE 08 block 395, which was shown in FIG. 12, the logic flows to a RECALL MODE decision diamond 801. From TYPE 10 block 427, which was shown in FIG. 12, the logic flows to a SET DECODE MODE command block 803, which sets the compressed data flag. From the SET DECODE MODE command block 803, the logic flows to the RECALL MODE decision diamond 801. From TYPE 15 block 447, which was shown in FIG. 12, the logic flows to a SET PACKED MODE command block 805, which sets the packed search key flag. From the SET PACKED MODE command block 805 the logic flows to the SET DECODE MODE command block 803.

If a YES decision is reached from the RECALL MODE decision diamond 801, the logic flows to a RECALL INDEX command block 807, where the record index of the saved screen is acquired and the recall mode is reset. From the RECALL INDEX command block 807, the logic flows to a PACKED MODE? decision diamond 808, where the state of the packed search key flag is tested. A YES decision leads the logic flow to a UNPACK command block 809, where the search key of the record being recalled is unpacked. From the UNPACK command block 809 or a NO decision results from the PACKED MODE? decision diamond 808, the logic flows to a GET RECORD command block 619, where a subroutine is called to retrieve the record from the ROM 143 which is illustrated on FIG. 35. From the GET RECORD command block 619 the logic flows to a DISPLAY SCREEN command block 810, where the data record is displayed on the screen. From the DISPLAY SCREEN command block 810 the logic flows to a KEY TYPE classification block 811. From the KEY TYPE classification block 811 the logic can flow to an ENTER start block 813, MENU start block 815, or a UP OR DOWN start block 817, depending upon whether the enter button switch 33, menu button switch 31 or, either of the up or down cursor button switches 27 or 29, respectively are activated.

From the ENTER start block 813, the logic flows to a SAVE SCREEN command block 629, where a subroutine is called to save the current record, recall a previously saved record, or swap the current record for a previously saved record. From the SAVE SCREEN command block 6299, the logic flows to a CANCEL decision diamond 821, where the status of the save screen function is tested. A YES decision logically leads to a CHECK MAIN command block 535, which was shown in FIG. 14. The logic flow from the CHECK MAIN command block 535, and from a NO decision at the CANCEL decision diamond 821 both lead back to KEY TYPE classification block 811.

From the MENU start block 815, the logic flows to a CLEAR LCD ARROWS command block 825, where the arrows appearing on screen 35 are deactivated. From the CLEAR LCD ARROWS command block 825 the logic flows to a RESET MODES command block 827, where the decode mode and packed mode are reset. From the RESET MODES command block 827 the logic flows to the COMMAND RETURN block 451 which previously appeared at FIG. 12.

From the UP OR DOWN start block 817, the logic flows to a START TIMER command block 831, which will be used subsequently in the logic flow to determine when to display another data record while the up or down cursor button switches 27 or 29 are continuously activated. From the START TIMER command block 831, the logic flows to an UP KEY decision diamond 833. A YES decision leads the logic flow to a FIRST MATCHING decision diamond 835, where the search key of the record is tested. A NO decision from the FIRST MATCHING decision diamond 835 leads to a PREVIOUS INDEX command block 837, which decrements the current record index.

From the PREVIOUS INDEX command block 837, the logic proceeds to a GET RECORD command block 619, which was shown in FIG. 18. From the GET RECORD command block 619, the logic flows to a DISPLAY SCREEN command block 839, where the data record is displayed on the screen. From the DISPLAY SCREEN command block 839 the logic flows to a WHILE SAME KEY decision oval 841. If the same key, namely one of the up or down cursor button switches 27 or 29, is still being pressed, a YES decision occurs and the logic flows to a TIMER EVENT decision diamond 843. If a timer event has occurred, a YES decision results and the logic flows back to the UP KEY decision diamond 833. If a timer event has not occurred, a NO decision results and the logic flows back to the WHILE SAME KEY decision oval 841. A YES decision from the FIRST MATCHING decision diamond 835 also leads the WHILE SAME KEY decision oval 841.

A NO decision at the WHILE SAME KEY decision oval 841 leads to a STOP TIMER command block 845. From the STOP TIMER command block 845, the logic then flows back to the KEY TYPE classification block 811.

A NO decision from the UP KEY decision diamond 833 causes the logic to flow to a LAST MATCHING decision diamond 847, where the search key of the record is tested. A YES decision causes the logic to flow to the WHILE SAME KEY decision oval 841. A NO decision causes the logic to flow to a NEXT INDEX command block 849, which increments the current record index. From the NEXT INDEX command block 849 the logic flows back to the GET RECORD command block 619, and from there to other paths as outlined above.

Referring back to the RECALL MODE decision diamond 801, a NO decision causes the logic to flow to a PACKED MODE decision diamond 851, where the state of the packed search key flag is tested. From the PACKED MODE decision diamond 851 a YES result leads to a PACK command block 853, where the current search key is packed. The logic from the PACK command block 853, and a NO result from the PACKED MODE decision diamond 851 lead to a FIND INDEX command block 855, where the set of data records is searched for the first matching search key. The logic then flows to a FOUND decision diamond 857, where the status of the search function is tested. A YES result at the FOUND decision diamond 857 causes the logic to flow back to the GET RECORD command block 619. A NO result at the FOUND decision diamond 857 causes the logic to flow to a DISPLAY NOT FOUND command block 859. The logic then flows to the RESET MODES command block 827.

Figure 22:
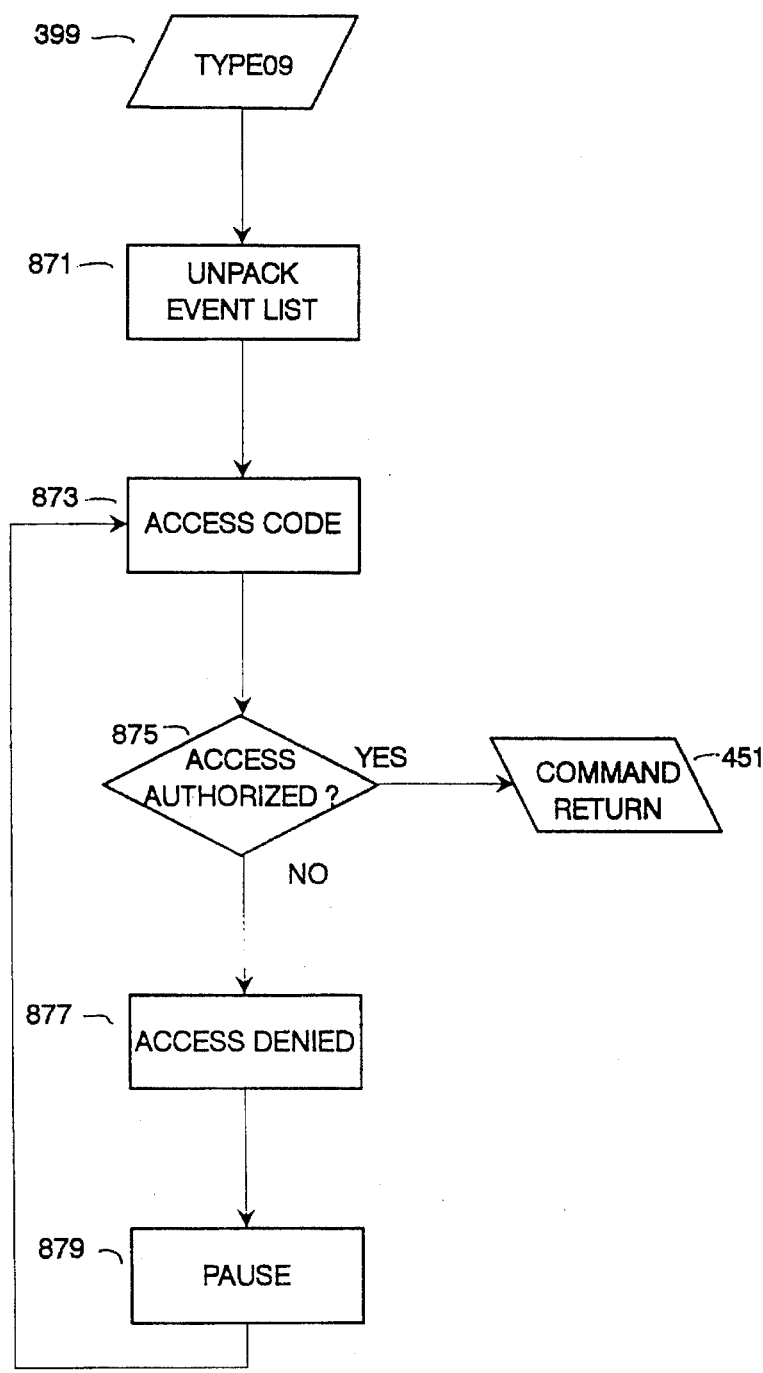
FIG. 22, is a logic flowchart of the type 09 command handler shown in FIG. 12.

Referring to FIG. 22, the command handler type 09 is illustrated, relating to the restricting of access to the system 21. From TYPE 09 block 399, which was shown in FIG. 12, the logic flows to a UNPACK EVENT LIST command block 871, where the list of button events (switch activations or deactivations) is acquired from the ROM 143 and unpacked to subsequently verify if access to the system 21 is authorized. The logic then flows to a ACCESS CODE command block 873, where a screen requesting the access code is displayed. From the ACCESS CODE command block 873, the logic flows to an ACCESS AUTHORIZED decision diamond 875. If access is authorized a YES decision will result, and the logic flows to COMMAND RETURN block 451 which was previously shown on FIG. 12. A lack of authorization will cause a NO result which will logically lead to a ACCESS DENIED command block 877, where a message indicating that the access was denied is displayed on the screen. From the ACCESS DENIED command block 877, the logic flows to a PAUSE command block 879, where the logic flow is suspended until one of the button switches is activated. Once a button is pressed, the logic flows back to the ACCESS CODE command block 873.

Figure 23:
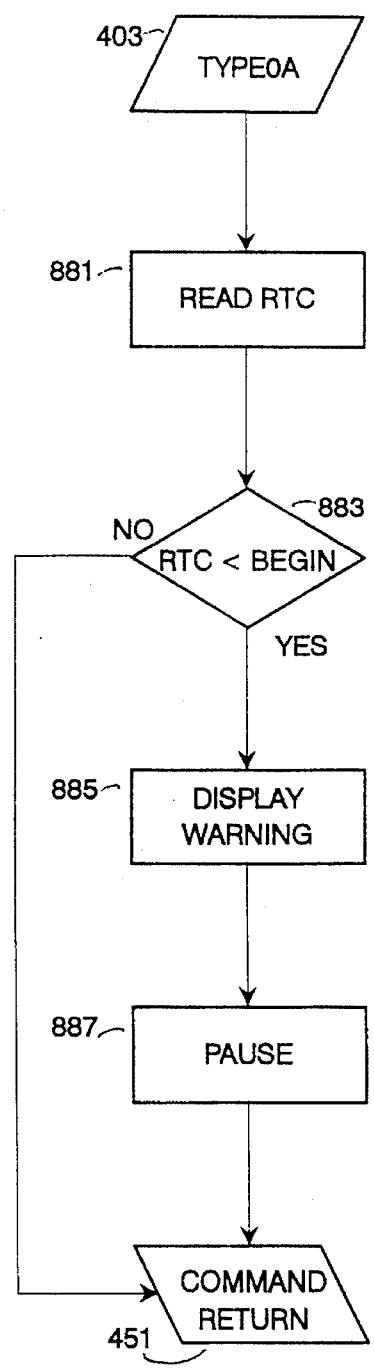
FIG. 23, is a logic flowchart of the type 0A command handler shown in FIG. 12.

Referring to FIG. 23, the command handler type 0A is illustrated, which warns of the use of an information chip at an earlier date than intended. From TYPE 0A block 403, which was shown in FIG. 12, the logic flows to a READ RTC command block 881, where the real time clock is read. The logic next flows to a RTC<BEGIN decision block 883, where the real time clock is compared to the date that the information on the chip becomes effective. A YES answer causes the logic to flow to a DISPLAY WARNING command block 885, where a warning message is displayed on the screen, and then to a PAUSE command block 887, where the logic flow is suspended for an interval of time or until one of the button switches is activated. The logic then flows to the COMMAND RETURN block 451 which was previously shown on FIG. 12. A NO answer at the RTC<BEGIN decision block 883 also causes the logic to flow to the COMMAND RETURN block 451.

Figure 24:
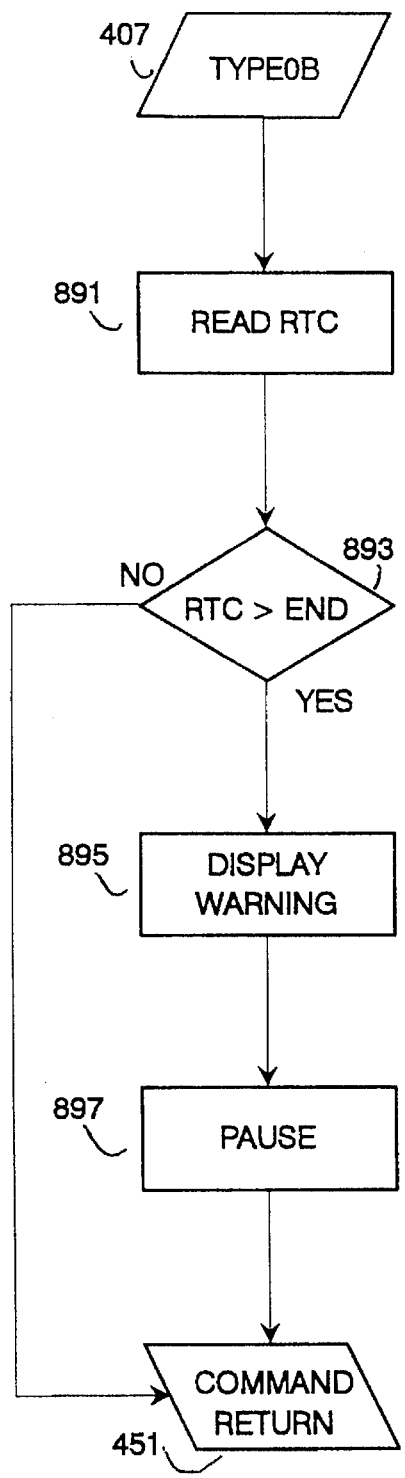
FIG. 24, is a logic flowchart of the type 0B command handler shown in FIG. 12.

Referring to FIG. 24, the command handler type 0B is illustrated, which warns of the use of an information chip which is obsolete. From TYPE 0A block 407, which was shown in FIG. 12, the logic flows to a READ RTC command block 891, where the real time clock is read. The logic next flows to a RTC>END decision block 893, where the real time clock is compared to the date that the information on the chip becomes obsolete. A YES answer causes the logic to flow to a DISPLAY WARNING command block 895, where a warning message is displayed on the screen, and then to a PAUSE command block 897, where the logic flow is suspended for an interval time or until one of the button switches is activated. The logic then flows to the COMMAND RETURN block 451 which was previously shown on FIG. 12. A NO answer at the RTC>END decision block 893 also causes the logic to flow to the COMMAND RETURN block 451.

Figure 25:
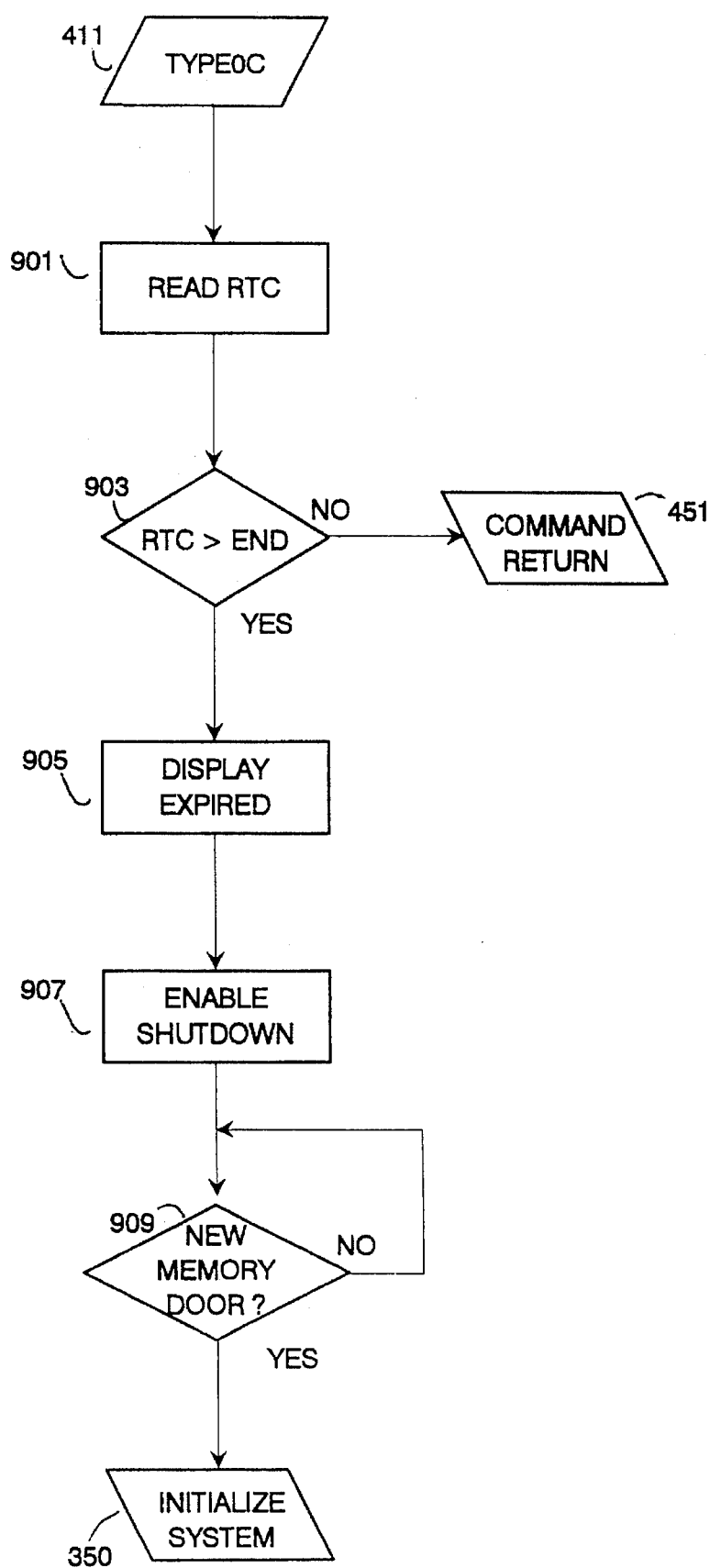
FIG. 25, is a logic flowchart of the type 0C command handler shown in FIG. 12.

Referring to FIG. 25, the command handler type 0C is illustrated, which prevents the use of an information chip which is obsolete, yet which enables the restart of the system after information chip replacement. From TYPE 0C block 411, which was shown in FIG. 12, the logic flows to a READ RTC command block 901, where the real time clock is read. The logic next flows to a RTC>END decision diamond 903, where the real time clock is compared to the date that the information on the chip becomes obsolete.

A YES answer causes the logic to flow to a DISPLAY EXPIRED command block 905, where a message indicating that the information is obsolete is displayed on the screen, and then to an ENABLE SHUTDOWN command block 907, which will allow the system 21 to switch to the power conserving shutdown mode if none of the buttons are activated for an interval of time. The logic then flows to a NEW MEMORY DOOR decision diamond 909, where the identification number of the ROM 143 is tested for a change. A NO answer loops back into the NEW MEMORY DOOR decision diamond 909. A YES answer causes the logic to flow to the INITIALIZE SYSTEM block 350 previously shown in FIG. 11. At the RTC>END decision diamond 903, a NO answer causes the logic to flow to the COMMAND RETURN block 451 which was previously shown on FIG. 12.

Figure 26:
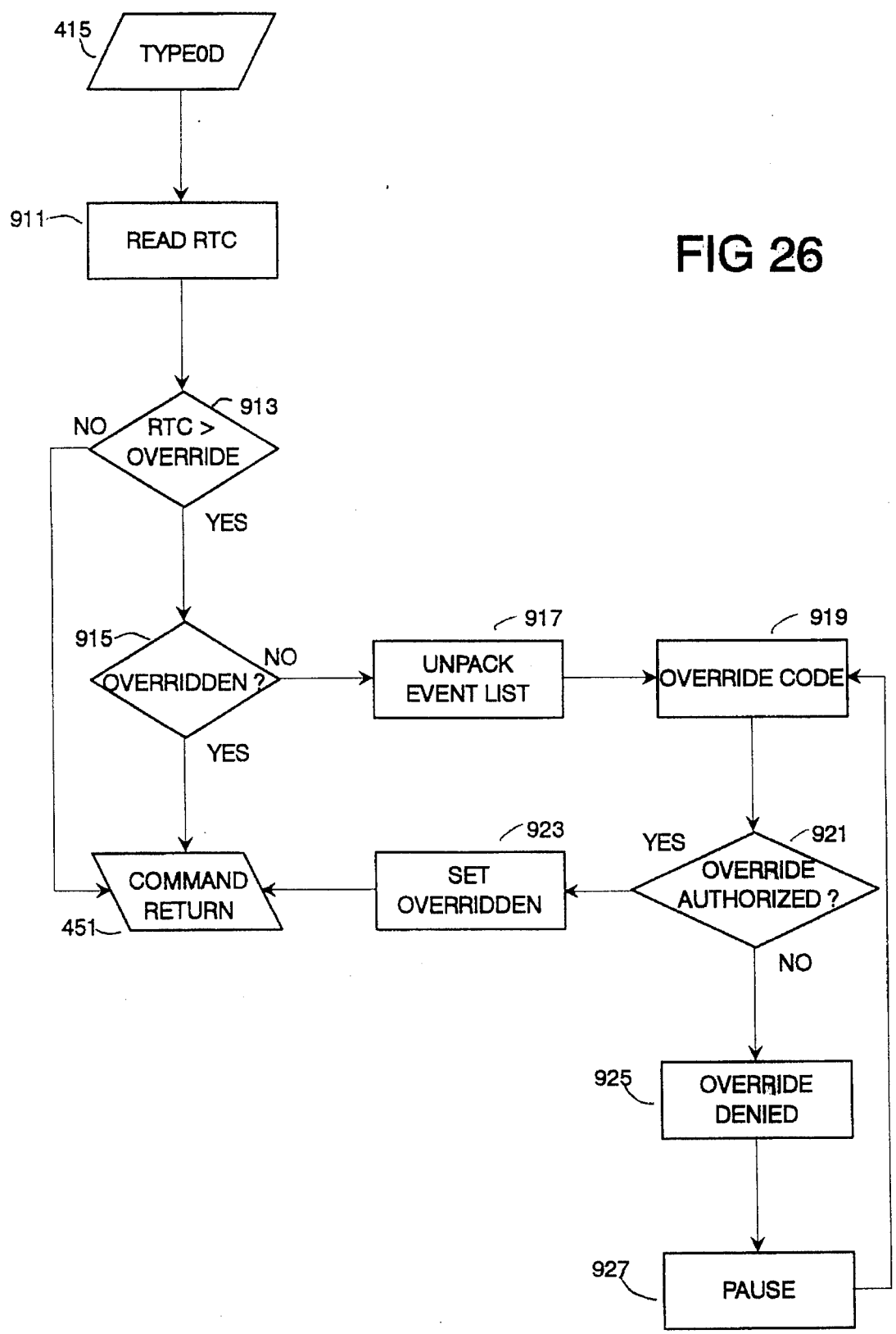
FIG. 26, is a logic flowchart of the type 0D command handler shown in FIG. 12.

Referring to FIG. 26, the command handler type 0D is illustrated, which enables an override to access an obsolete information chip even where access would normally be denied. From TYPE 0D block 415, which was shown in FIG. 12, the logic flows to a READ RTC command block 911, where the real time clock is read. The logic next flows to a RTC>OVERRIDE decision diamond 913, where the real time clock is compared to the date that the information on the chip becomes obsolete.

A YES answer causes the logic to flow to an OVERRIDDEN decision diamond 915, where the state of the previously overridden flag is tested. A YES answer at OVERRIDDEN decision diamond 915, and a NO decision at RTC>OVERRIDE both cause the logic to flow to the COMMAND RETURN block 451.

A NO decision at OVERRIDDEN decision diamond 915 causes the logic to flow to an UNPACK EVENT LIST 917, where the list of button events (switch activations or deactivations is acquired from the ROM 143 and unpacked to subsequently verify if access to the directory is authorized and then to a OVERRIDE CODE command block 919, where a message requesting the override access code is displayed on the screen. From OVERRIDE CODE command block 919 the logic flows to an OVERRIDE AUTHORIZED decision diamond 921. A YES answer causes the logic to flow to a SET OVERRIDDEN command block 923, and then to the COMMAND RETURN block 451. A NO answer causes the logic to flow to a OVERRIDE DENIED command block 925, where a message indicating that the access was denied is displayed on the screen, and then to a PAUSE command block 927, where the logic flow is suspended for an interval of time or until one of the button switches is activated. The logic then flows back to the OVERRIDE CODE command block 919.

Figure 27:
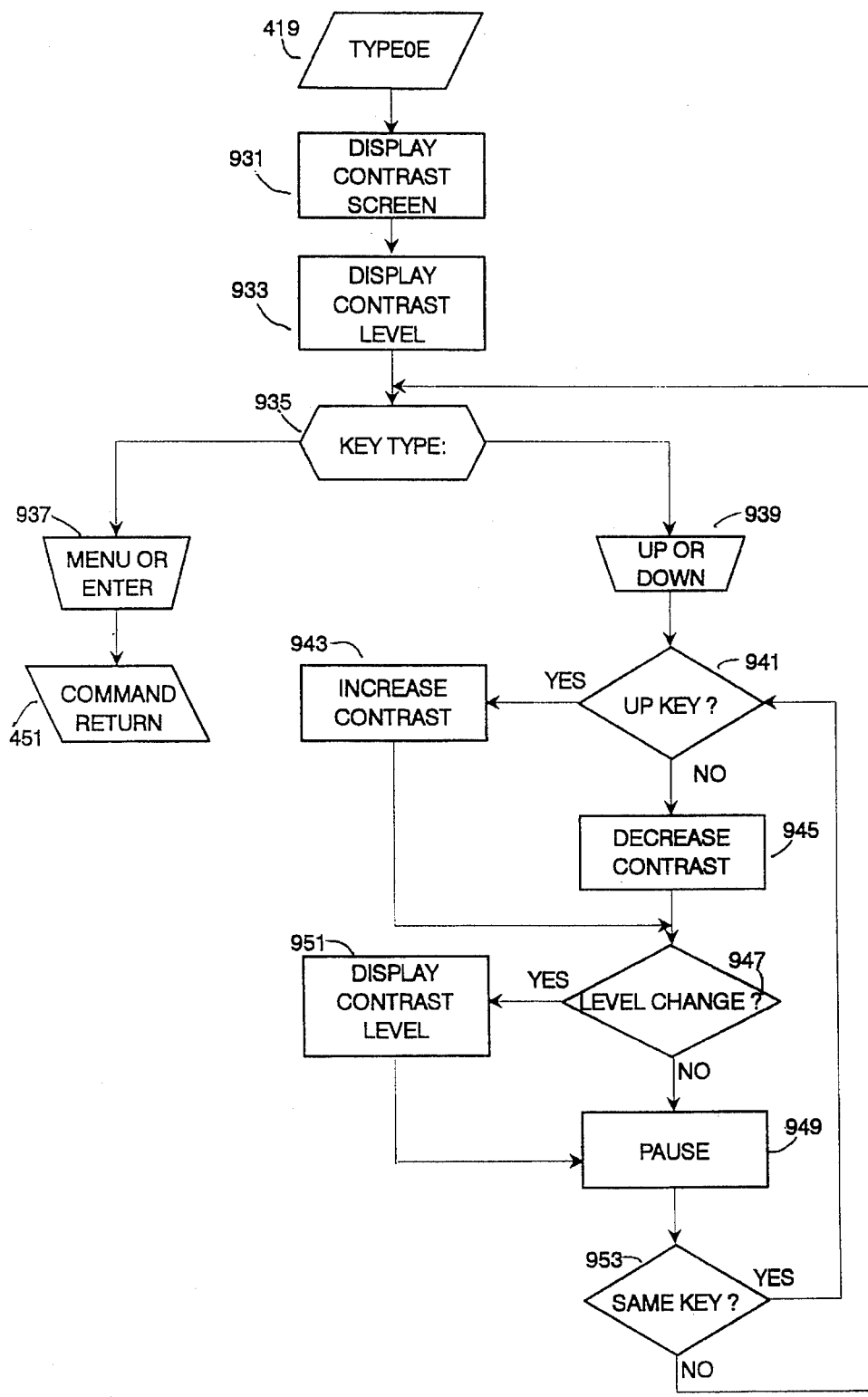
FIG. 27, is a logic flowchart of the type 0E command handler shown in FIG. 12.

Referring to FIG. 27, the command handler type 0E is illustrated, which enables the setting of the contrast for the display 35. From TYPE 0E block 419, which was shown in FIG. 12, the logic flows to a DISPLAY CONTRAST SCREEN command block 931, where the user is exposed to an instruction screen to assist in adjusting the contrast. The logic next flows to a DISPLAY CONTRAST LEVEL command block 933, where the current contrast level is displayed on the screen, and then to a KEY TYPE classification block 935. From the KEY TYPE classification block 935 the logic can flow to an ENTER OR MENU start block 937, or an UP OR DOWN start block 939, depending upon whether the enter or menu button switches 33 or 31 are pressed, or either of the up or down cursor button switches 27 or 29, respectively are activated.

If the enter or menu button switches 33 or 31 are pressed, the logic flows to the ENTER OR MENU start block 937 and then to the COMMAND RETURN block 451 which was previously shown on FIG. 12. If the up or down cursor button switches 27 or 29 are activated the logic flows to the UP OR DOWN start block 939, and then to an UP KEY decision diamond 941. A YES decision leads the logic flow to an INCREASE CONTRAST command block 943, where the contrast is increased by one step. A NO decision leads the logic flow to a DECREASE CONTRAST command block 945, where the contrast reduced by one step.

The logic flow from both the INCREASE CONTRAST ONE command block 943 and the DECREASE CONTRAST command block 945 both lead to a LEVEL CHANGE decision diamond 947, where the current contrast is tested for a multiple of 4. A NO decision leads the logic flow to a PAUSE command block 949, where the flow of logic is suspended for an interval of time. A YES decision leads the logic flow to a DISPLAY CONTRAST LEVEL command block 951, where the new contrast level is displayed on the screen. From DISPLAY CONTRAST LEVEL command block 951, the logic flows to the PAUSE command block 949.

From the PAUSE command block 949, the logic flows to a SAME KEY decision diamond 953. A YES decision leads the logic flow to the UP KEY decision diamond 941. A NO decision leads the logic flow back to KEY TYPE classification block 935.

Figure 28:
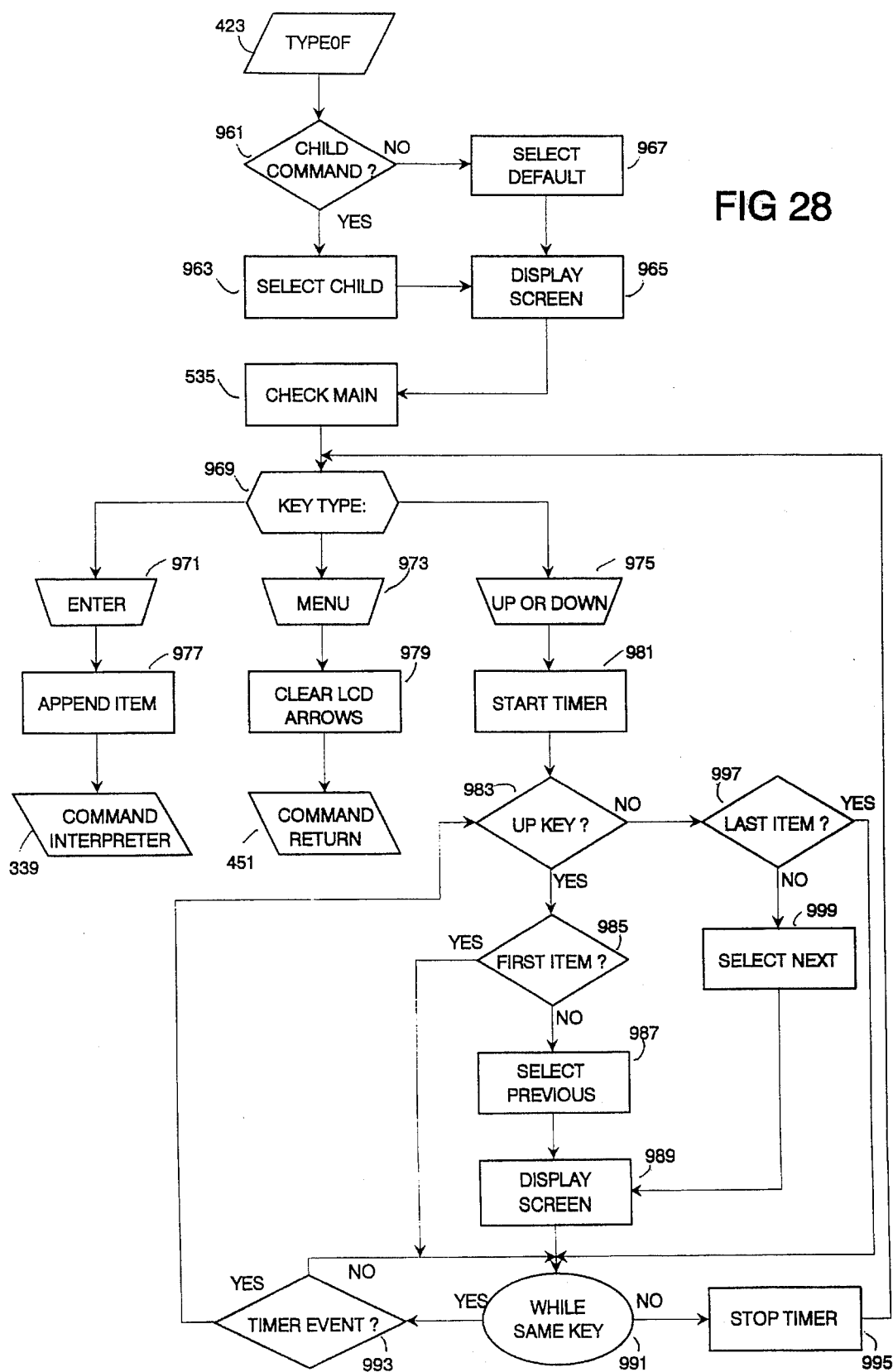
FIG. 28, is a logic flowchart of the type 0F command handler shown in FIG. 12.

Referring to FIG. 28, the command handler type 0F is illustrated, which processes a select item from list with line scrolling command. From TYPE 0F block 423, which was shown in FIG. 12, the logic flows to a CHILD COMMAND? decision diamond 961, where it is determined if this point in the logic flow originated from a child command or whether this execution sequence began from a parent command. If a YES decision is reached, the logic flows to a SELECT CHILD command block 963, where the previous child item is selected by the program and the previous child item is removed from the end of the search key. From the SELECT CHILD command block 963, the logic flows to a DISPLAY SCREEN command block 965, where a list of items is displayed with the child item selected.

In the event that a NO decision was formulated at the CHILD COMMAND decision diamond 961, the logic flows to a SELECT DEFAULT command block 967, where the default item is selected by the program. From the SELECT DEFAULT command block 967, logic flows to the DISPLAY SCREEN command block 765, where a list of items is displayed with the default item selected.

From the DISPLAY SCREEN command block 965, the logic flows to a CHECK MAIN command block 535 which was shown on FIG. 14. From the CHECK MAIN From the DISPLAY SCREEN command block 535, the logic flows to a KEY TYPE classification block 969. From the GET KEY PRESS classification block 969 the logic can flow to an ENTER start block 971, a MENU start block 973, or a UP OR DOWN start block 975, depending upon whether the enter button switch 33, menu button switch 31 or, either of the up or down cursor button switches 27 or 29, respectively are activated.

From the ENTER start block 971, the logic flows to an APPEND ITEM command block 977, where the selected item is appended to the end of the search key and the arrows appearing on screen 35 are deactivated. From the APPEND ITEM command block 977, the logic flows to a COMMAND INTERPRETER block 339 which previously appeared at FIG. 12.

From the MENU start block 973, the logic flows to a CLEAR LCD ARROWS command block 979, where the arrows appearing on screen 35 are deactivated. The logic then flows to the COMMAND RETURN command block 451 which previously appeared at FIG. 12.

From the UP OR DOWN start block 975, the logic flows to a START TIMER command block 981, which will be used subsequently in the logic flow, to determine when to select another item while the up or down cursor button switches 27 or 29 are continuously activated. From the START TIMER command block 981, the logic flows to an UP KEY decision diamond 983. A YES decision leads the logic flow to a FIRST ITEM decision diamond 985. A NO decision from the FIRST ITEM decision diamond 985 leads to a SELECT PREVIOUS command block 987, which selects the previous item on the screen.

From the SELECT PREVIOUS ITEM command block 987, the logic proceeds to a DISPLAY SCREEN command block 989, where a list of items containing the selected item is displayed on the screen. From the DISPLAY SCREEN command block 989 the logic flows to a WHILE SAME KEY decision oval 991. If the same key, namely one of the up or down cursor button switches 27 or 29, is still being pressed, a YES decision occurs and the logic flows to a TIMER EVENT decision diamond 993. If the timer event has occurred, a YES decision results and the logic flows back to the UP KEY decision diamond 983. If the timer event has not occurred, a NO decision results and the logic flows back to the WHILE SAME KEY decision oval 991. A YES decision from the FIRST ITEM decision diamond 985 also leads to the WHILE SAME KEY decision oval 991.

A NO decision at the WHILE SAME KEY decision oval 991 leads to a STOP TIMER command block 995. The logic then flows back to the KEY TYPE classification block 969.

A NO decision from the UP KEY decision diamond 983 causes the logic to flow to a LAST ITEM decision diamond 997. A YES decision causes the logic to flow to the WHILE SAME KEY decision oval 991. A NO decision causes the logic to flow to a SELECT NEXT command block 999, which selects the next item on the screen. From the SELECT NEXT command block 999 the logic flows to the DISPLAY SCREEN command block 989.

Figure 29:
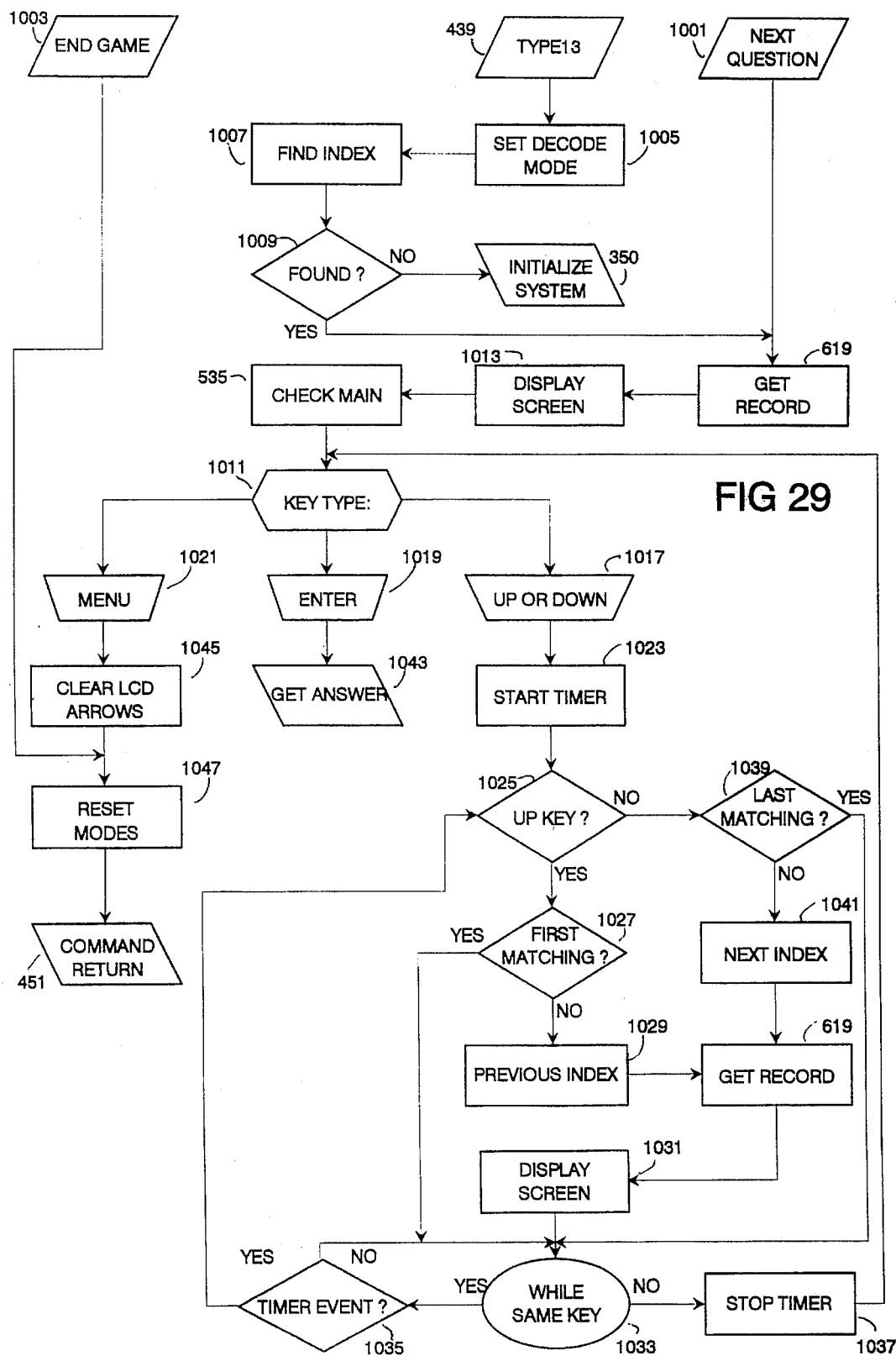
FIG. 29, is the first portion of the logic flowchart of the type 13 command handler shown in FIG. 12.

Referring to FIG. 29, the command handler type 13 is illustrated, which processes a trivia game command. There are three blocks from which the command handler type 13, or trivia game, can be entered, due to the trivia game's ability to flexibly "move about" in the game. At the right center of the diagram is the TYPE 13 block 439, which was shown in FIG. 12. There is also a NEXT QUESTION command block 1001 and an END GAME command block 1003.

From the TYPE 13 block 439 the logic flows to a SET DECODE MODE command block 1005, which sets the compressed data flag, and then to a FIND INDEX command block 1007, where the set of questions is searched for the first matching category which was selected prior to the execution of TYPE 13 command, and then to a FOUND? decision diamond 1009, where it is determined whether or not the needed was found. If a NO decision is reached, the logic flows to an INITIALIZE SYSTEM command block 350 which was previously shown in FIG. 11. If a YES decision is reached, the logic flows to a GET RECORD command block 619, where a subroutine is called to retrieve the record from the ROM 143 which is illustrated at FIG. 35.

From the NEXT QUESTION command block 1001, the logic flows to a GET RECORD command block 619, and then to a DISPLAY SCREEN command block 1013, where the question is displayed on the screen. From the DISPLAY SCREEN command block 1013 the logic flows to a CHECK MAIN command block 535, which was shown on FIG. 14, and finally arriving at the KEY TYPE classification block 1011.

From the KEY TYPE classification block 1011 the logic can flow to an UP OR DOWN start block 1017, an ENTER start block 1019, or a MENU start block 1021, depending upon whether either of the up or down cursor button switches 27 or 29, the enter button switch 33, or menu button switch 31 respectively, are activated.

From the UP OR DOWN start block 1017, the logic flows to a START TIMER command block 1023, which will be used subsequently in the logic flow, to determine when to display another question while the up or down cursor button switches 27 or 29 are continuously activated. From the START TIMER command block 1023, the logic flows to an UP KEY decision diamond 1025. A YES decision leads the logic flow to a FIRST MATCHING decision diamond 1027, where the question category is tested. A NO decision from the FIRST MATCHING decision diamond 1027 leads to a PREVIOUS INDEX command block 1029, which decrements the current question index. From the PREVIOUS INDEX command block 1029, the logic flows to a GET RECORD command block 619, which was shown on FIG. 18. From the GET RECORD command block 619, the logic flows to a DISPLAY SCREEN command block 1031, where the question is displayed on the screen.

A YES decision from the FIRST MATCHING decision diamond 1027, as well as the logic from the DISPLAY SCREEN command block 1031, leads to a WHILE SAME KEY decision oval 1033. If the same key, namely one of the up or down cursor button switches 27 or 29, is still being pressed, a YES decision occurs and the logic flows to a TIMER EVENT decision diamond 1035. If the timer event has occurred, a YES decision results and the logic flows back to the UP KEY decision diamond 1025. If the timer has not occurred, a NO decision results and the logic flows back to the WHILE SAME KEY decision oval 1033.

A NO decision at the WHILE SAME KEY decision oval 1033 leads to a STOP TIMER command block 1037. The logic then flows back to the KEY TYPE classification block 1011.

A NO decision from the UP KEY decision diamond 1025 causes the logic to flow to a LAST MATCHING decision diamond 1039, where the question category is tested. A YES decision causes the logic to flow to the WHILE SAME KEY decision oval 1033. A NO decision causes the logic to flow to a NEXT INDEX command block 1041, which increments the current question index. From the NEXT INDEX command block 1041 the logic flows to the GET RECORD command block 619.

Figure 30:
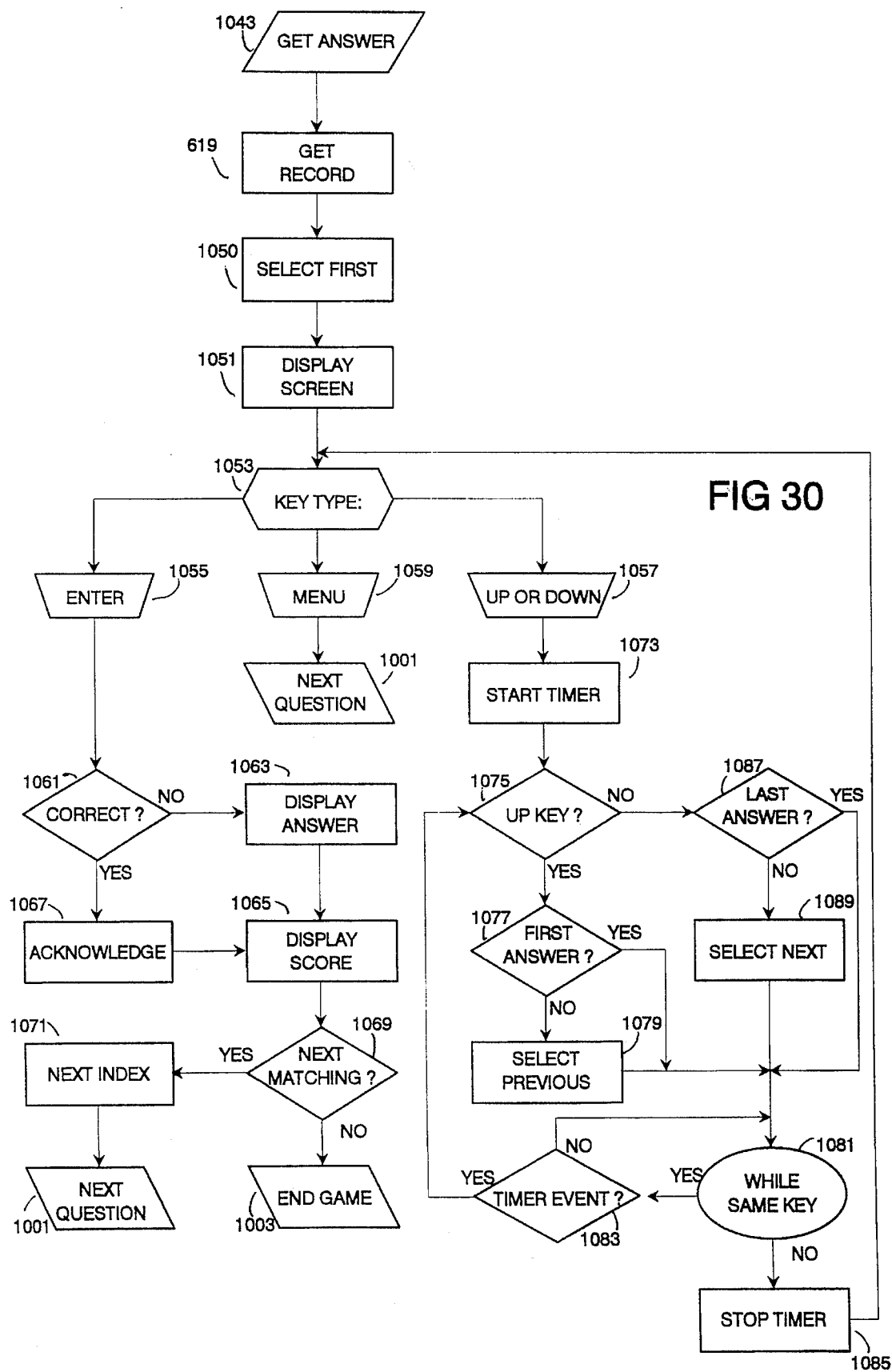
FIG. 30, is the second portion of the logic flowchart of the type 13 command handler shown in FIG. 12.

From the ENTER start block 1019, the logic flows to a GET ANSWER command block 1043 which will be further shown and discussed on FIG. 30.

From the MENU start block 1021, the logic flows to a CLEAR LCD ARROWS command block 1045, where the arrows appearing on screen 35 are deactivated. The logic then flows to a RESET MODES command block 1047, where the decode mode is reset, which also accepts a logic flow from the END GAME command block 1003. The logic then flows to the COMMAND RETURN block 451 previously appeared at FIG. 12.

Referring to FIG. 30, a continuation of the logic flow of the command handler TYPE 13 is illustrated. At the top of the Figure is the GET ANSWER command block 1043 which was shown in FIG. 29. From the GET ANSWER command block 1043, the logic flows to a GET RECORD command block 619, where a subroutine is called to retrieve the record from the ROM 143 which is illustrated at FIG. 35. From the GET RECORD command block 619, the logic flows to a SELECT FIRST command block 1050, where the first of four answers is selected by the program. The logic then flows to the DISPLAY SCREEN command block 1051, where the four answers are displayed on the screen. From the DISPLAY SCREEN command block 1051 the logic flows to a KEY TYPE classification block 1053.

From the KEY TYPE classification block 1053 the logic can flow to an ENTER start block 1055, an UP OR DOWN start block 1057 or a MENU start block 1059, depending upon whether either of the enter button switch 33, the up or down cursor button switches 27 or 29 or menu button switch 31 respectively, are activated.

From the ENTER start block 1055, the logic flows to a CORRECT decision diamond 1061, where the selected answer is tested. A NO result to this question causes the logic to flow to a DISPLAY ANSWER command block 1063, where the correct answer is displayed on the screen. From the DISPLAY ANSWER command block 1063, the logic leads to a DISPLAY SCORE command block 1065, where the number of correctly answered questions is displayed on the screen. A YES result at the CORRECT decision diamond 1061 causes the logic to flow to an ACKNOWLEDGE command block 1067, where a message acknowledging that the question was answered correctly is displayed on the screen. From the ACKNOWLEDGE command block 1067 the logic leads to the DISPLAY SCORE command block 1065.

From the DISPLAY SCORE command block 1065, the logic leads to a NEXT MATCHING decision diamond 1069, where the question category is tested. A NO result leads to the END GAME command block 1003, which was shown on FIG. 29. A YES result leads to a NEXT INDEX command block 1071, which increments the current question index, and then to the NEXT QUESTION command block 1001 shown in FIG. 29.

From the UP OR DOWN start block 1057, the logic flows to a START TIMER command block 1073, which will be used subsequently in the logic flow to determine when to select another answer while the up or down cursor button switches 27 or 29 are continuously activated. From the START TIMER command block 1073, the logic flows to an UP KEY decision diamond 1075. A YES decision from the UP KEY decision diamond 1075 leads the logic flow to a FIRST ANSWER? decision diamond 1077, where the selected answer number is tested. A NO decision from the FIRST ANSWER? decision diamond 1077 leads to a SELECT PREVIOUS command block 1079, which selects the previous answer on the screen.

From the SELECT PREVIOUS command block 1079, as well as from a YES decision from the FIRST ANSWER? decision diamond 1077, the logic flows to a WHILE SAME KEY decision oval 1081. If the same key, namely one of the up or down cursor button switches 27 or 29, is still being pressed, a YES decision occurs and the logic flows to a TIMER EVENT decision diamond 1083. If the timer event has occurred, a YES decision results at the TIMER EVENT decision diamond 1083 and the logic flows back to the UP KEY decision diamond 1075. If the timer event has not occurred, a NO decision results and the logic flows back to the WHILE SAME KEY decision oval 1081.

A NO decision at the WHILE SAME KEY decision oval 1081 leads to a STOP TIMER command block 1085. The logic then flows back to the KEY TYPE classification block 1053.

A NO decision from the UP KEY decision diamond 1075 causes the logic to flow to a LAST ANSWER? decision diamond 1087, where the selected answer number is tested. A YES decision at the LAST ANSWER? decision diamond 1087 causes the logic to flow to the WHILE SAME KEY decision oval 1081. A NO decision causes the logic to flow to a SELECT NEXT command block 1089, which selects the next answer on the screen. From the SELECT NEXT command block 1089 the logic flows to the WHILE SAME KEY decision oval 1081.

From the MENU start block 1059, the logic flows to a NEXT QUESTION command block 1001 which previously appeared at FIG. 29.

Figure 31:
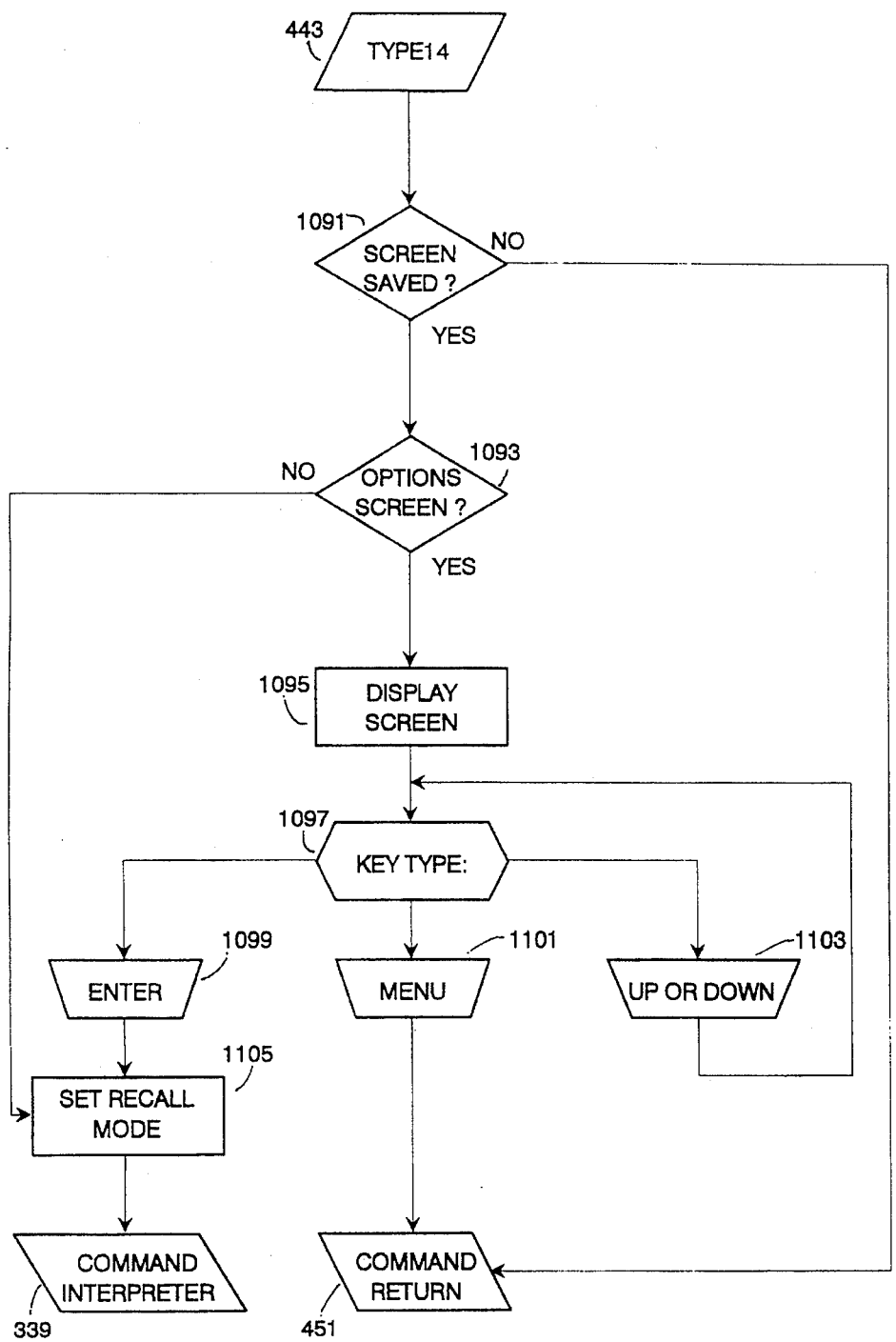
FIG. 31, is a logic flowchart of the type 14 command handler shown in FIG. 12.

Referring to FIG. 31, the command handler type 14 is illustrated, which processes a recall saved screen command. From TYPE 14 block 443, which was shown in FIG. 12, the logic flows to a SCREEN SAVED? decision diamond 1091 to determine if a screen has been saved. If a YES decision is reached, the logic flows to an OPTIONS SCREEN decision diamond 1093, where the state of the response required parameter is tested. If a YES decision is reached at the OPTIONS SCREEN decision diamond 1093, the logic flows to a DISPLAY SCREEN command block 1095, where the recall options are displayed on the screen. From the DISPLAY SCREEN command block 1095 the logic flows to a KEY TYPE classification block 1097. From the KEY TYPE classification block 1097 the logic can flow to an ENTER start block 1099, a MENU start block 1101, or a UP OR DOWN start block 1103, depending upon whether the enter button switch 33, menu button switch 31 or, either of the up or down cursor button switches 27 or 29, respectively are activated.

From the ENTER start block 1099, the logic flows to a SET RECALL MODE command block 1105, where the recall mode is set and the command to display the save screen is acquired. From the SET RECALL MODE command block 1105, the logic flows to the COMMAND INTERPRETER command block 339 which was shown on FIG. 12.

From the MENU start block 1101, the logic flows to the COMMAND RETURN command block 451, which was shown on FIG. 12. A NO result at the SCREEN SAVED? decision diamond 1091, also results in a logic flow to the COMMAND RETURN command block 451.

From the UP OR DOWN start block 1103, the logic flows back to the KEY TYPE classification block 1097.

Referring to FIG. 32, a flow chart for the CHECK MAIN subroutine called by the CHECK MAIN command block 535. From the CHECK MAIN command block 535, the logic flows to a STARTUP MODE decision diamond 1111. A YES decision causes the logic to flow to an EXIT command block 1113 which returns logical control to the flow scheme from which the CHECK MAIN subroutine of FIG. 32 was called.

A NO decision causes the logic to flow to a MAIN MENU decision diamond 1115, where the current command is compared to the main menu command. A YES decision from the MAIN MENU decision diamond 1115 also causes the logic to flow to an EXIT command block 1113 which returns logical control to the flow scheme from which the CHECK MAIN subroutine of FIG. 32 was called.

A NO decision at the MAIN MENU decision diamond 1115, causes the logic to flow to a START TIMER command block 1117 which will be utilized subsequently in the logic flow to determine if the menu button is continuously activated for the required time interval. The logic then flows to a WHILE MENU KEY decision oval 1119. A NO decision at the WHILE MENU KEY decision oval 1119 leads to a STOP TIMER command block 1121. From the STOP TIMER command block 1121, the logic then flows back to the EXIT command block 1113.

A YES decision at the WHILE MENU KEY decision oval 1119 leads to a TIMER EVENT decision diamond 1123. If the timer event has not occurred, a NO decision results and the logic flows back to the WHILE MENU KEY decision oval 1119. If the timer event has occurred, a YES decision results and the logic flows to a INTERPRETER RESTART command block 1125, where the command interpreter is re-initialize to begin execution with the main menu command. From the INTERPRETER RESTART command block 1125, the flow of logic leads to the COMMAND INTERPRETER command block 339 shown in FIG. 12.

Figure 33:
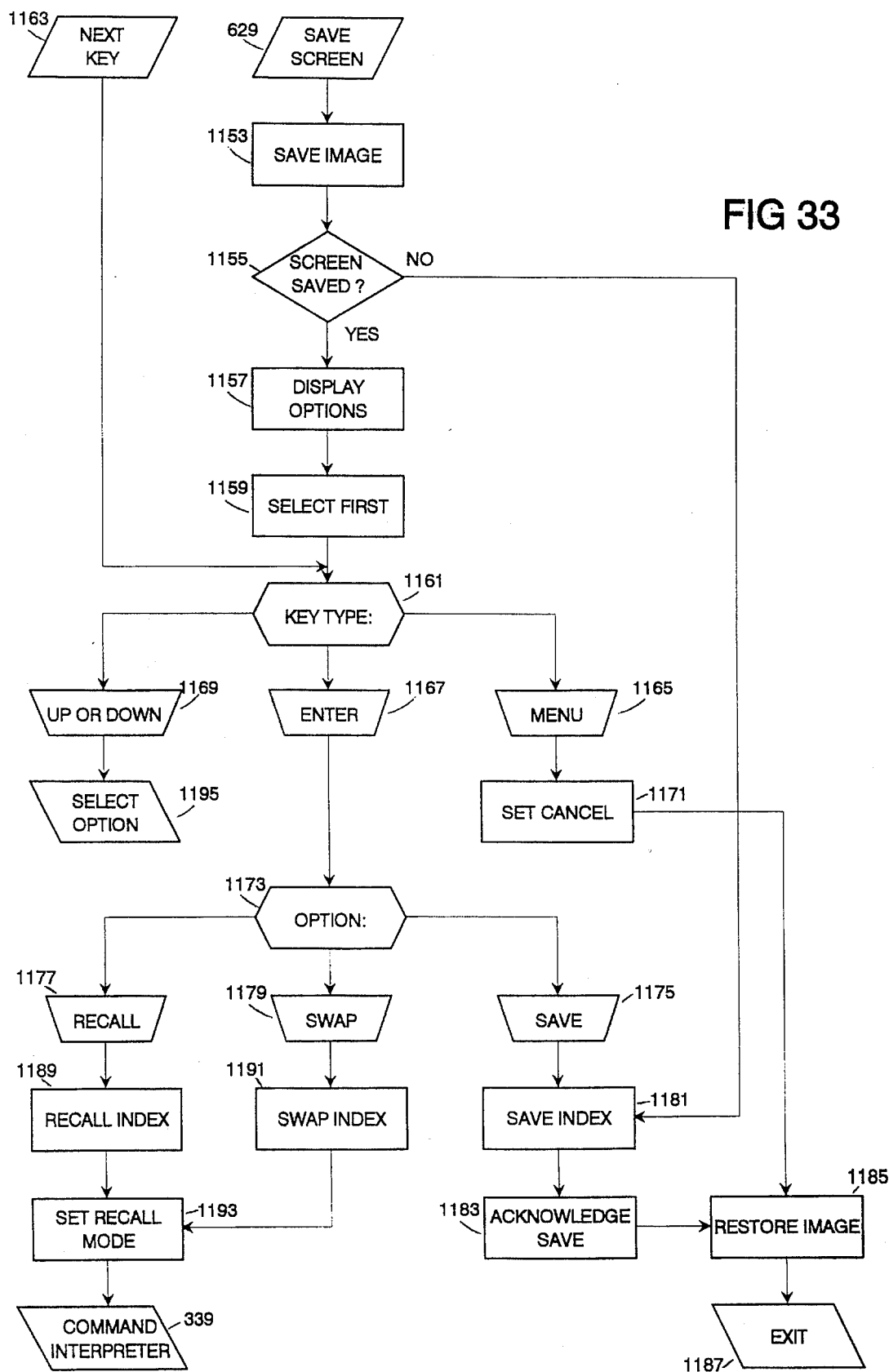
FIG. 33 is a logic flowchart of a SAVE SCREEN subroutine.

Referring to FIG. 33, a flow chart for the SAVE SCREEN subroutine called by the SAVE SCREEN command block 629 in which the first portion of the logic flow relating to the saving of a current screen is shown. From the SAVE SCREEN command block 629, the logic flows to a SAVE IMAGE command block 1153 which stores the image appearing on the screen 35 at the current time. The logic then flows to a SCREEN SAVED decision diamond 1155, where a prior screen's save status is tested. A YES result leads to a DISPLAY OPTIONS command block 1157, where the options are displayed on the screen. The logic then flows to a SELECT FIRST command block 1159 where the first option is selected by the program. The logic then leads to a KEY TYPE classification block 1161. A KEY TYPE command block 1163 also leads into KEY TYPE classification block 1161, and acts as a return path from the second portion of the logic flow as will be shown in FIG. 34.

From the KEY TYPE classification block 1161 the logic can flow to a MENU start block 1165, an ENTER start block 1167, or a UP OR DOWN start block 1169, depending upon whether the menu button switch 31, enter button switch 33, or either of the up or down cursor button switches 27 or 29, respectively are activated.

From the MENU start block 1165, the logic flows to a command block 1171, which will set the cancel save screen status. From the ENTER start block 1167, the logic flows to an OPTION classification block 1173. From the OPTION classification block 1173 the logic can flow to a SAVE start block 1175, a RECALL start block 1177, or a SWAP start block 1179, depending upon whether those options are selected by the user.

From the SAVE start block 1175, the logic flows to a SAVE command block 1181, where the current command and the current record are saved. The logic next flows to an ACKNOWLEDGE SAVE command block 1183, where a message acknowledging the screen was saved is displayed on the screen. The logic from both the SET CHANCE command block 1171 and from the ACKNOWLEDGE SAVE command block 1183, lead to a RESTORE IMAGE command block 1185, which restores the screen image saved by the SAVE IMAGE command block 1153. From the RESTORE IMAGE command block 1185 the logic flow leads to an EXIT block 1187 which returns logical control to the flow scheme from which the SAVE SCREEN subroutine was called.

From the RECALL start block 1177, the logic flows to a RECALL INDEX command block 1189, where the saved command and the saved record index are acquired. From the SWAP start block 1179, the logic flows to a SWAP INDEX command block 1191, where the saved command is swapped with the current command and the saved record index is swapped with the current record index. From both the SWAP INDEX command block 1191 and the RECALL INDEX command block 1189, flows to a SET RECALL MODE command block 1193, where the recall mode is set. The logic then flows to the COMMAND INTERPRETER 339 which was shown at FIG. 12.

Figure 34:
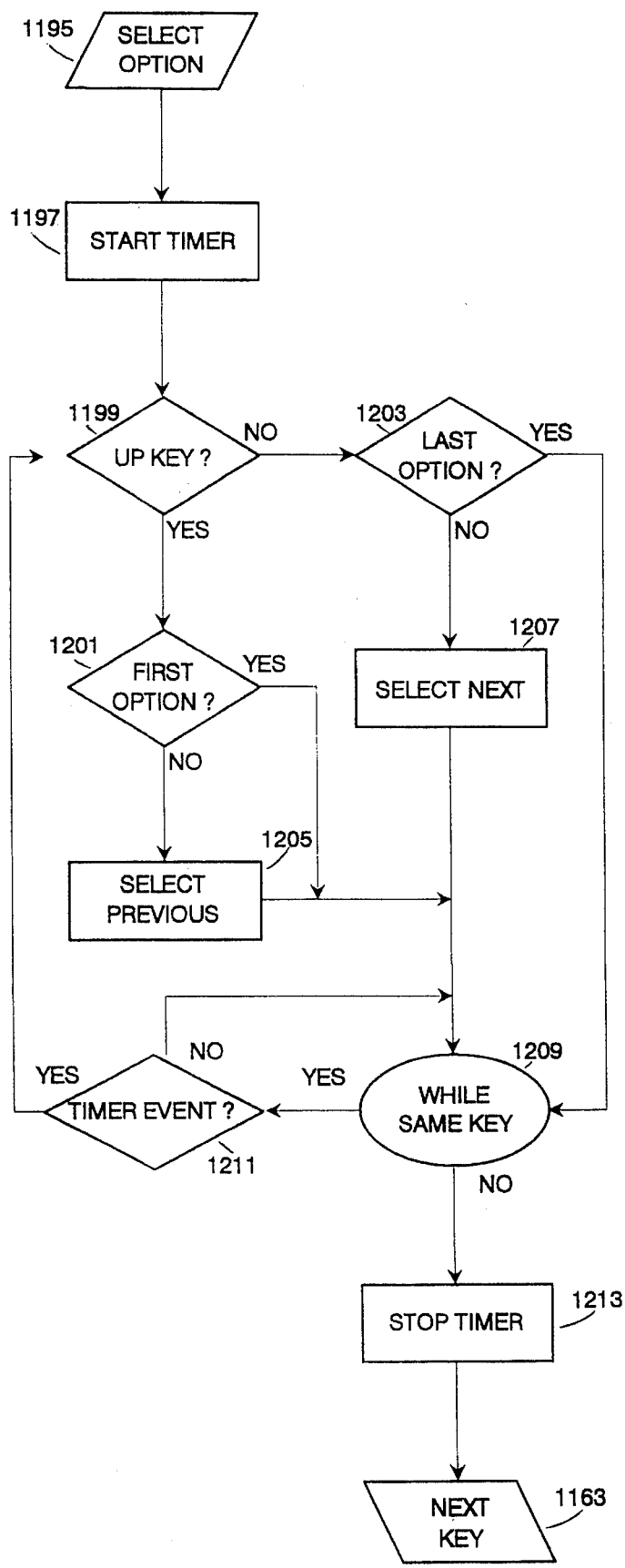
FIG. 34 is a logic flowchart of a SAVE CURRENT SCREEN subroutine.

From the UP OR DOWN start block 1169, the logic flows to a SELECT OPTION command block 1195 which leads to a logical flow continued on FIG. 34.

Referring to FIG. 34, the logic flows from the SELECT OPTION command block 1195 to a START TIMER command block 1197, which will be used subsequently in the logic flow to determine when to select another option while the up or down cursor button switches 27 or 29 are continuously activated. The logic then flows to an UP KEY decision diamond 1199. A YES decision from the UP KEY decision diamond 1199 leads the logic flow to a FIRST OPTION decision diamond 1201. A NO decision from the UP KEY decision diamond 1199 leads the logic flow to a LAST OPTION decision diamond 1203. A NO decision from the FIRST OPTION decision diamond 1201 leads to a SELECT PREVIOUS command block 1205, which selects the previous option on the screen. A NO decision from the LAST OPTION SELECTED? decision diamond 1203 leads to a SELECT NEXT command block 1207 which selects the next option on the screen.

The four logic flows from Yes decisions from the FIRST OPTION decision diamond 1201, the LAST OPTION decision diamond 1203, the SELECT PREVIOUS command block 1205, and the SELECT NEXT command block 1207, all flow to a WHILE SAME KEY decision oval 1209. If the same key, namely one of the up or down cursor button switches 27 or 29, is still being pressed, a YES decision occurs and the logic flows to a TIMER EVENT decision diamond 1211. If the timer event has occurred, a YES decision results at the TIMER EVENT decision diamond 1211 and the logic flows back to the UP KEY decision diamond 1199. If the timer event has not occurred, a NO decision results and the logic flows back to the WHILE SAME KEY decision oval 1209.

A NO decision at the WHILE SAME KEY decision oval 1209 leads to a STOP TIMER command block 1213. The logic then flows back to the NEXT KEY command block 1163 which, as was mentioned in the description of FIG. 33, also acts as a return path into KEY TYPE classification block 1161 of FIG. 33.

Referring to FIG. 35, the logic flow from a GET RECORD subroutine relating to the GET RECORD command block 619 shown in FIGS. 18, 19, and 21, which retrieves and if required decodes a record from the ROM 143. From the GET RECORD command block 619, the logic flows to a CURRENT RECORD command block 1221, where the current record index is used to retrieve a record from the ROM 143, and then to a DECODE MODE decision diamond 1223, where it is determined whether or not the record needs to be decoded.

A NO result leads to an EXIT command block 1225 which indicates a return to a point in the logic flow from which the GET RECORD subroutine was called. A YES result leads to a WHILE NOT END decision oval 1227, where the end of the record status is tested. A NO result at the WHILE NOT END decision oval 1227 leads to a WORK BUFFER command block 1229, where the now decoded record is acquired, followed by EXIT command block 1225 which returns the logic flow to the point where the subroutine was called.

A YES result at the WHILE NOT END decision oval 1227 leads to an ROOT NODE command block 1231, to initialize the code tree to decode the next code in the record. The logic next proceeds to a NEXT BIT command block 1233, where the next bit of the code is acquired. From the NEXT BIT command block 1233, the logic flows to a ZERO BIT decision diamond 1235. If the bit is zero, a YES result occurs and the logic flows to a LEFT NODE command block 1237, where the node at the left branch of the current node is set to be the new current node of the code tree. If the bit is one, a NO result occurs and the logic flows to a RIGHT NODE command block 1239, where the node at the right branch of the current node is set to be the new current node of the code tree. From both the LEFT NODE command block 1237 and the RIGHT NODE command block 1239, the logic flows to a LEAF NODE? decision diamond, 1241. If the current node of the code tree is a leaf node (the end of a branch), a YES result is reached and the logic flows to a COPY STRING command block 1243, where the string represented by the code is copied to a work buffer and the logic flows back to the WHILE NOT END decision of 1227. If the current node of the code tree is not a leaf node, a NO result is reached at the LEAF NODE decision diamond 1241 and the logic flows to the NEXT BIT command block 1233 to continue processing the current code.

Referring to FIG. 36, a flowchart of the SELF TEST directory command block 335, which was shown on FIG. 11, is illustrated. From the SELF TEST directory command block 335, the logic flows to a TEST GRAM decision diamond 1253 where an inquiry is made as to whether a test of the 384 byte general purpose static RAM included in the ASIC 109 should be performed. If this test is included in the SELF TEST directory sequence, a YES result occurs and the logic proceeds to a GRAM FAILED? decision diamond 1255 where an inquiry is made as to whether the test was failed. A NO result at the GRAM FAILED? decision diamond 1255 leads to a TEST ASIC? decision diamond 1257.

A NO result at the GRAM TEST decision diamond 1253, will also lead to the TEST ASIC? decision diamond 1257. Each subsequent test, if not selected will lead to the next test. Following each subsequent test, a FAILED? decision diamond occurs which logically leads to the next test if a NO result to the "failed" question is reached. This applies to the subsequent tests, including TEST ASIC? decision diamond 1257, TEST LCD RAM decision diamond 1261, TEST OS ROM decision diamond 1265, TEST TIMER decision diamond 1269, TEST LCD decision diamond 1273, TEST ARROWS decision diamond 1277, TEST KEYPAD decision diamond 1281, TEST PCR decision diamond 1285, TEST RTC decision diamond 1289, and TEST RME decision diamond 1293.

A YES result at any of the FAILED? decision diamonds 1255, 1259, 1263, 1267, 1271, 1275, 1279, 1283, 1287, 1291, 1295 leads to a DISPLAY FAILURE command block 1277, where information describing the failure is displayed on the screen, and then to the termination at a STOP block 1299. In the event that each and every one of the FAILED? decision diamonds have a NO decision, the logic flow leads to an ACKNOWLEDGE PASSED command block 1301, where a message acknowledging that the self test passed is displayed on the screen, and then the logic flows to the termination at the STOP block 1299.

Data compression is achieved in the system 21 of the present invention by a Modified Static Huffman Coding. A Static Huffman Coding is a statistical data-compression technique which will reduce the average codeword length used to represent the letters of an alphabet. The Huffman Code is an optimum code since it results in the shortest average codeword length. In Addition, Huffman codes have a prefix property which prevents a short code group from being duplicated as the beginning of a longer group.

If one character is represented by the bit combination 100, then 10001 cannot be the codeword for another letter since the scanning process employed on the bit stream from left to right would interpret the 10001 as a 100 bit configuration letter followed by a 01 bit configuration letter. This prefix property of the Huffman Code ensures that the coded word is uniquely decipherable.

Huffman's process, expressed graphically, takes as an input, a list of non-negative weights and constructs a full binary tree whose leaves are labeled with the weights. A binary tree is full if every node has either zero or two children. When the Huffman process is used to construct a code, the weights represent the probabilities associated with the source letters. Initially there is a set of singleton trees, one for each weight in the list. At each step in the process, the trees corresponding to the two smallest weights are merged into a new tree whose weight is the sum of the two smallest weights. The new tree has a root that has two children that are the subtrees represented by the two smallest weights. The two smallest weights are removed from the list, and the sum of the two smallest weights is inserted into the list. This process continues until the weight list contains a single value. If, at any time, there is more than one way to choose a smallest pair of weights, any such pair may be chosen.

The Huffman process determines the lengths of the code words to be mapped to each of the source letters. The usual assignment entails labeling the edge from each parent to its left child with the digit zero, and the edge from each parent to its right child with the digit one. The code word for each source letter is the sequence of labels along the path from the root to the leaf node representing that letter. This process yields a minimal prefix code. Further, the process is guaranteed to produce an optimal code, that is one with the minimum redundancy.

The system 21 of the present invention uses a modified Huffman coding in which the letters of an alphabet are combined into groups of one or more letters which forms a new alphabet. After a weight is calculated for each group in the new alphabet, any group with a weight less than the specified minimum weight is split into smaller groups which forms another new alphabet. This process continues until all groups have a weight of at least the specified minimum or until all groups contain a single letter. The Huffman process is applied to the weights representing the new alphabet.

Figure 37:
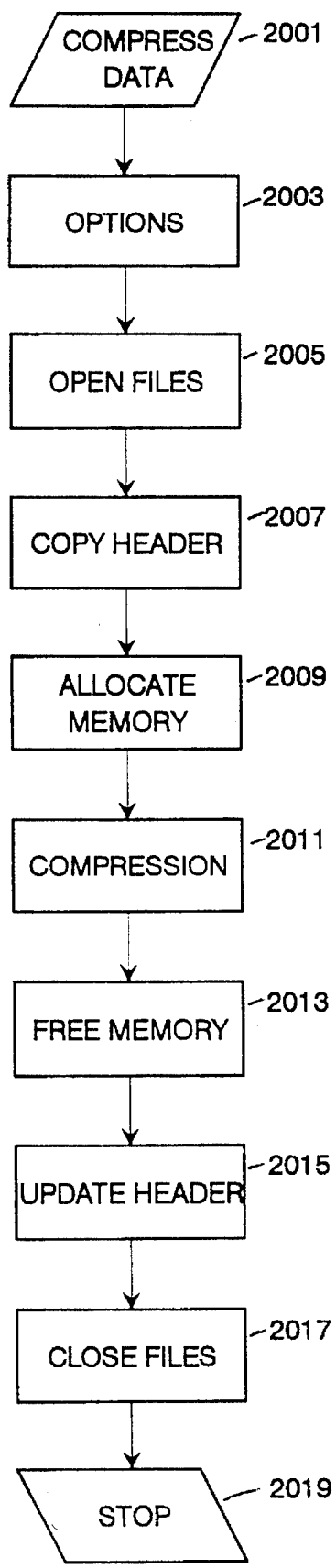
FIG. 37 is a logic flowchart of the data compression method utilized in conjunction with the pocket electronic communication system of the present invention.

Referring to FIG. 37, the main data compression flow chart is illustrated. This flowchart is linear, executing a serial sequence of command blocks, some of which will be expanded and further described in subsequent Figures.

At the head of this linear string of logic flow is a COMPRESS DATA command block 2001 which is the start block for the compression process, followed by an OPTIONS command block 2003. At the OPTIONS command block 2003, the compression process arguments are acquired and the compression options are set. The OPTIONS command block 2003 is followed by an OPEN FILES command block 2005 which causes the commands to open the input file for reading and to create the output file for writing to be executed. Following the OPEN FILES command block 2005 is a COPY HEADER command block 2007 which reads the header record that describes the datasets contained in the input file and writes a copy of this header record to the output file. Following the COPY HEADER command block 2007, is an ALLOCATE MEMORY command block 2009, where the memory space necessary to handle the hash table, string storage area and code tree is dynamically allocated. This step is followed by a COMPRESSION command block 2011, which invokes the program process flows of the following FIGS. 38–45 that contain the specific techniques to accomplish the data compression. Following the COMPRESSION command block 2011, is a FREE MEMORY command block 2013, where the memory space is released so that it may be used for other purposes. Next is an UPDATE HEADER command block 2015, which updates the output file header record created by the COPY HEADER command block 2007 with the dataset descriptions changed by the compression process. The next command is a CLOSE FILES command block 2017, which prevents further reading from the input file and writing to the output file. The last block is a STOP command block 2019 which returns control from the compression process, back to the point in the logic flow from which the compression process was initiated.

Figure 38:
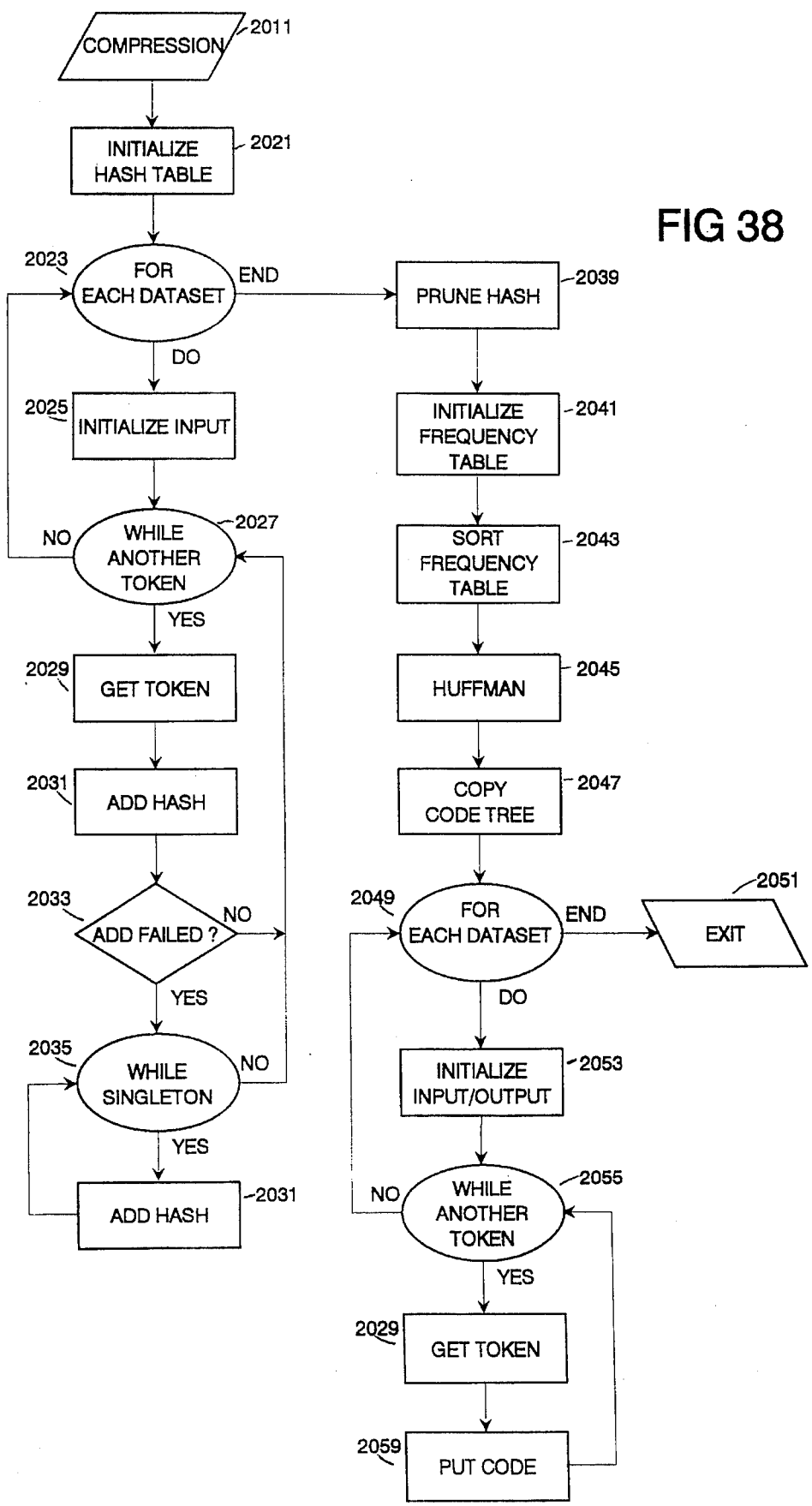
FIG. 38 is a logic flowchart of the data compression subroutine utilized in conjunction with the data compression method of the present invention.

Referring to FIG. 38, the logic flow for the specific techniques to accomplish the data compression is shown. At the head of the logic flow is the COMPRESSION command block 2011 which was shown in FIG. 37. When the logic flow reaches block 2011 of FIG. 37, the logic flow within FIG. 38 is invoked.

From the COMPRESSION command block 2011, the logic flows to a INITIALIZE HASH TABLE command block 2021, where the hash table that will contain information about each token of the alphabet is initialized. The logic next flows to a FOR EACH DATASET decision oval 2023 which is a loop that directs a series of actions for each set of data. The outlets of oval 2023 are a DO path and an END path, the END outlet occurring only upon the end of the last set of data in the input file.

From the DO outlet of FOR EACH DATASET decision oval 2023 the logic flows to an INITIALIZE INPUT command block 2025 where the input file is further ordered for processing the next set of data. The logic next flows to a WHILE ANOTHER TOKEN decision oval 2027 which is another loop which directs a series of actions for the tokens in each set of data. The outlets of oval 2027 are a NO path and an YES path, the NO outlet occurring only upon the end of the last of the tokens for the current set of data. A NO outlet of the WHILE ANOTHER TOKEN decision oval 2027 leads back to the FOR EACH DATASET decision oval 2023.

From the YES outlet of the WHILE ANOTHER TOKEN decision oval 2027 the logic flows to a GET TOKEN command block 2029 where the next token from the input file is obtained by calling a subroutine to be described later in FIG. 39. The logic next flows to an ADD HASH command block 2031 where the next token from the input file is appropriately placed within the hash table by a subroutine to be described in FIG. 40.

The logic next flows to an ADD FAILED decision diamond 2033 which tests the proper execution of the add token to the hash table step occurring in command block 2031. A NO decision at the ADD FAILED decision diamond 2033 leads back to the WHILE ANOTHER TOKEN decision oval 2027. A YES decision at the ADD FAILED decision diamond 2033 leads to a WHILE SINGLETON decision oval 2035. The outlets of oval 2035 are a NO path and a YES path, the YES outlet occurring so long as there are more singletons within the current token. A NO decision at the WHILE SINGLETON decision oval 2035 leads back to the WHILE ANOTHER TOKEN decision oval 2027. A YES decision at the WHILE SINGLETON decision oval 2035 leads to a ADD HASH command block 2031 where the next singleton from the token is appropriately placed within the hash table by a subroutine to be described in FIG. 40. The logic flow then leads back to the WHILE SINGLETON decision oval 2035.

Referring back to the top of the logic flow of FIG. 38, an END decision at the FOR EACH DATASET decision oval 2023 causes the logic to flow to a PRUNE HASH command block 2039 which calls a subroutine to be described later in FIG. 41. From the PRUNE HASH command block 2039 the logic flows to an INITIALIZE FREQUENCY TABLE command block 2041, where the frequency distribution table is created from the token frequency information in the hash table in order to provide a starting point for the Huffman process.

The logic next flows to a SORT FREQUENCY TABLE command block 2043, where the sorting process arranges the frequency distribution table from the lowest frequency to the highest frequency. The logic next flows to a HUFFMAN command block 2045 which calls a subroutine to be later described in FIG. 42 where each token of the alphabet is assigned an optimal variable length bit string as it's code. The logic next flows to a COPY CODE TREE command block 2047 which calls a subroutine to be later described in FIG. 44 to write the code tree to the output file.

The logic next flows to a FOR EACH DATASET decision oval 2049. The outlets of oval 2049 are a DO path and an END path, the END outlet occurring only upon the end of the last set of data in the input file. The END outlet of the FOR EACH DATASET decision oval 2049 leads to an EXIT command block 2051 which returns the subroutine of FIG. 38 to the point in the logic flow from which it was called.

From the DO outlet of the FOR EACH DATASET decision oval 2049 the logic flows to an INITIALIZE INPUT/ OUTPUT command block 2053, where the input file and output file are further ordered for processing the next set of data. The logic next flows to a WHILE ANOTHER TOKEN decision oval 2055 which is another loop which directs a series of actions for the tokens in each set of data. The outlets of oval 2055 are a NO path and a YES path, the NO outlet occurring only upon the end of the last of the tokens for the current set of data, and logically leading back to the FOR EACH DATASET decision oval 2049.

From the YES outlet of the WHILE ANOTHER TOKEN decision oval 2055 the logic flows to a GET TOKEN command block 2029 where the next token from the input file is obtained. The logic next flows to a PUT CODE command block 2059 where the code for the token obtained is appropriately placed within the output file. The logic then flows back to the WHILE ANOTHER TOKEN decision oval 2055.

Figure 39:
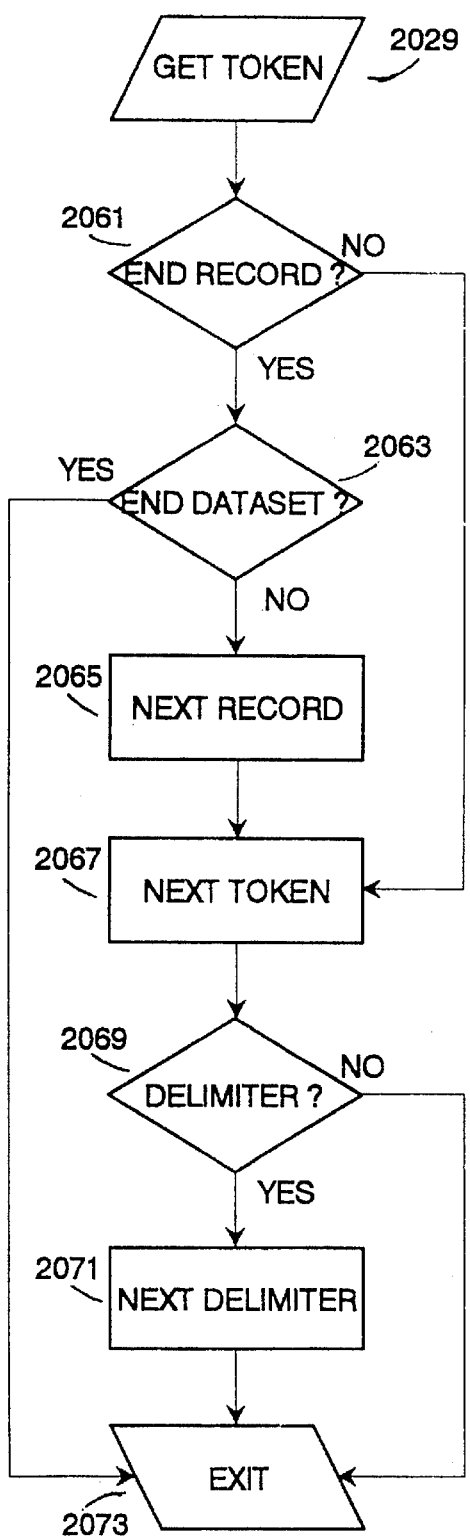

Referring to FIG. 39, the logic flow for the GET TOKEN command block 2029 shown on FIG. 38 is illustrated. From the GET TOKEN command block 2029, the logic flows to an END RECORD decision diamond 2061. A YES result occurs whenever the input record has been completely processed, and the logic flow proceeds to an END DATASET decision diamond 2063. A NO result occurs at the END DATASET decision diamond 2063 so long as all the input records of the set of data have not been completely processed, and the logic flow proceeds to a NEXT RECORD command block 2065, where the next data record is read from the input file. The logic next flows to a NEXT TOKEN command block 2067, where the string of singletons up to the next delimiter are acquired. A NO result at END RECORD decision diamond 2061 also leads to the NEXT TOKEN command block 2067. The logic next flows to a DELIMITER decision diamond 2069. A YES result occurs so long as the token length is zero, and the logic flow proceeds to a NEXT DELIMITER command block 2071, where token is set to be the delimiter. The logic then proceeds to an EXIT command block 2073 which returns the subroutine of FIG. 39 to the point in the logic flow from which it was called. A NO result at DELIMITER decision diamond 2069, or a YES decision at the END DATASET decision diamond 2063 will also cause the logic flow to terminate at the EXIT command block 2073. Referring to FIG. 40, the logic flow for the ADD HASH command block 2031 shown on FIG. 38, is illustrated. From the ADD HASH command block 2031, the logic flows to a CALCULATE HASH command block 2075, where a hash table index is calculated from the token. The logic next flows to a WHILE ENTRY USED decision oval 2077. A YES result occurs so long as the hash table entry is being used, and the logic flow then proceeds to a MATCHES TOKEN decision diamond 2079. A NO result occurs so long as the token fails to match the hash table entry, and the logic flows to a NEXT HASH command block 2081, where the hash table index for another entry is calculated. The logic next flows back to the WHILE ENTRY USED decision oval 2077.

A NO result at the WHILE ENTRY USED decision oval 2077, or a YES result at the MATCHES TOKEN decision diamond 2079 leads to an ADD TOKEN decision diamond 2083. A YES result, which indicates that the token should be added to the hash table, causes the logic to flow to an ENTRY USED decision diamond 2085. A NO result at the ENTRY USED decision diamond 2085 causes the logic to flow to a MEMORY AVAILABLE decision diamond 2087. If the string storage area has room enough for the token, a YES result causes the logic to flow to a COPY STRING command block 2089, where the token string is placed in the string storage area and the token frequency is set to one in the hash table entry. The logic then flows to an COUNT ENTRY command block 2091, where the number of entries in the hash table is incremented. The logic then flows to an TABLE FULL decision diamond 2093. A YES result at the TABLE FULL decision diamond 2093 occurs if the hash table is full and leads to a PRUNE HASH command block 2039 which was mentioned at FIG. 38, and will be further explained at FIG. 41. The logic then leads to an EXIT command block 2097 which returns the subroutine of FIG. 40 to the point in the logic flow from which it was called. A NO result at either of the TABLE FULL decision diamond 2093, or the MEMORY AVAILABLE decision diamond 2087, or the ADD TOKEN decision diamond 2083, also causes the logic to flow to the EXIT command block 2097.

A YES result at the ENTRY USED decision diamond 2085 causes the logic to flow to an INCREMENT FREQUENCY command block 2099, where the token frequency is incremented in the hash table entry. From the INCREMENT FREQUENCY command block 2099, the logic again flows to the EXIT command block 2097.

Referring to FIG. 41, the subroutine associated with the PRUNE HASH command block 2039 of FIGS. 38 and 40 is illustrated. From the PRUNE HASH command block 2039, the logic flows to an INITIALIZE command block 2103, where the number of deleted tokens is set to zero. The logic then flows to a FOR EACH ENTRY decision oval 2105 which is a loop that directs a series of actions for each hash table entry. The outlets of oval 2105 are a DO path and an END path, the END outlet occurring only upon the end of the processing for the last hash table entry present.

From the END outlet of FOR EACH ENTRY decision oval 2105 the logic flows to a ANY DELETED decision diamond 2107, where the number of deleted tokens is tested for a positive value. A NO result leads to an EXIT command block 2109 which returns the subroutine of FIG. 41 to the point in the logic flow from which it was called. A YES result leads to a FOR EACH ENTRY decision oval 2111 which is another loop which directs a series of actions for each hash table entry. The outlets of oval 2111 are a DO path and an END path, the END outlet occurring only upon the end of the processing of the last hash table entry present, and leads to the EXIT command block 2109.

A DO decision at the FOR EACH ENTRY decision oval 2111 leads to an ENTRY AVAILABLE decision diamond 2113, which determines if the current hash table entry is unused. A NO result from the ENTRY AVAILABLE decision diamond 2113 leads to a REAGE ENTRY command block 2115, where the age of the token is adjusted. The logic from both the REAGE ENTRY command block 2115, and from a YES decision at the ENTRY AVAILABLE decision diamond 2113 leads back to the FOR EACH ENTRY decision oval 2111.

A DO result at the FOR EACH ENTRY decision oval 2105 causes the logic to flow to an ENTRY AVAILABLE decision diamond 2117, which determines if the current hash table entry is unused. If the entry is not in use, a YES result occurs, leading the logic to flow back to the FOR EACH ENTRY decision oval 2105. If the entry is in use, a NO result occurs, and the logic flows to a MINIMUM FREQUENCY decision diamond 2119. If the token frequency is greater than the minimum, a YES result occurs, leading the logic to flow back to the FOR EACH ENTRY decision oval 2105. If the token frequency is less than minimum, a NO result occurs, and the logic flows to a REMOVE ENTRIES decision diamond 2121.

A YES result at the REMOVE ENTRIES decision diamond 2121 indicates that the hash table entry should be removed and causes the logic to flow to an MINIMUM AGE decision diamond 2123. If the age of the token is less than minimum, a NO result occurs, leading the logic to flow back to the FOR EACH ENTRY decision oval 2105. A YES result at the MINIMUM AGE decision diamond and from a NO result at the REMOVE ENTRIES decision diamond 2121, causes the logic to flow to a WHILE SINGLETON decision oval 2125. If there is another singleton in the token string, a YES result occurs and the logic flows to a ADD HASH command block 2031, where the hash table is searched for the singleton by calling a subroutine which was shown on FIG. 40. From the ADD HASH command block 2031, the logic flows to an ADD FREQUENCY command block 2129, where the token frequency of the token being removed is added to the singleton found in the previous step. From the ADD FREQUENCY command block 2129, the logic flows back to the WHILE SINGLETON decision oval 2125.

A NO result at the WHILE SINGLETON decision oval 2125 causes the logic to flow to a MARK ENTRY command block 2131, where the hash table entry is marked as deleted. From the MARK ENTRY command block 2131, the logic flows to a REMOVE ENTRIES decision diamond 2133.

A NO result at the REMOVE ENTRIES decision diamond 2133 causes the logic to flow back to the FOR EACH ENTRY decision oval 2105. A YES result at the REMOVE ENTRIES decision diamond 2133 indicates that the hash table entry should be removed and causes the logic to flow to a REMOVE STRING command block 2135, where the token string is removed from the string storage area. The logic then flows to a DELETE ENTRY command block 2137, where the token is removed from the hash table and the hash table entry is marked as available. The logic then flows to an COUNT DELETED command block 2139, where the number of deleted tokens is incremented. The logic then flows back to the FOR EACH ENTRY decision oval 2105.

Referring to FIG. 42, the logic flow for the HUFFMAN command block 2045 of FIG. 38, which creates a binary code tree by the Huffman process, is illustrated. From the HUFFMAN command block 2045, the logic flows to an INITIALIZE command block 2141, where the tree node pointers are initialized to NIL. The logic then flows to a FOR EACH ENTRY decision oval 2143 which is a loop which directs a series of actions for each frequency table entry to construct the initial list of non-negative token weights. The outlets of oval 2143 are a DO path and an END path, the END outlet occurring only upon the end of the processing for the last frequency table entry present.

From the DO outlet of FOR EACH ENTRY decision oval 2143, the logic flows to a NEXT AVAILABLE command block 2145 where the node pointer is assigned the first node on the list of available nodes and the node is removed from the list of available nodes. The logic next flows to a NODE WEIGHT command block 2147, where the current node weight is assigned the token frequency from the current frequency table entry. The logic next flows to an INITIALIZE NODE command block 2149, where the left child, right child and link node pointers are initialized to NIL.

The logic then flows to a FIRST ENTRY decision diamond 2151. If the entry is the first frequency table entry, a YES result occurs, and the logic flows to a FIRST NODE command block 2153, where pointers are assigned to the first node of the initial list of nodes being constructed. The logic then flows to a PREVIOUS NODE command block 2155, where the previous node pointer is assigned the current node pointer. If the entry is not the first frequency table entry, a NO result occurs, and the logic flows to a LINK PREVIOUS command block 2154, where the current node is linked to the previous node by assigning the current node pointer to the previous node link pointer. The logic then flows to the PREVIOUS NODE command block 2155. From the PREVIOUS NODE command block 2155, the logic flows back to the FOR EACH ENTRY decision oval 2143.

An END result at the FOR EACH ENTRY decision oval 2143 leads to a WHILE ANOTHER NODE decision oval 2157 which is a loop which directs a series of actions for each node in the initial list of token weights to construct a full binary tree whose leaves are the weights of the tokens. The outlets of oval 2157 are a NO path and a YES path, the YES outlet occurring only so long as there is a node in the list of token weights.

From the YES outlet of WHILE ANOTHER NODE decision oval 2157, the logic flows to a PICK TWO NODES command block 2159, where the next two nodes in the list of token weights, which will also be the two smallest weights, are selected. The logic next flows to a CALCULATE WEIGHT command block 2161, where the two weights are added together and assigned to the next available node which is removed from the list of available nodes. The logic next flows to a LINK PARENT command block 2163, where the two nodes with the smallest weights are assigned to the left child node pointer and the right child node pointer of the current node which contains the sum of the two smallest weights.

The logic then flows to a WHILE ANOTHER LINK decision oval 2165 which is a loop which directs a series of actions for each node in the list of token weights to find the location to insert the current node into the list of token weights. The outlets of oval 2165 are a NO path and a YES path, the YES output occurring only so long as there is a node in the list of token weights that has not been examined. From the YES outlet of WHILE ANOTHER LINK decision oval 2165, the logic flows to a NEXT WEIGHT BIGGER decision diamond 2167, where the token weight of the next node in the list is compared to the weight of the current node. A NO result leads to a NEXT LINK command block 2169, where the pointer to the next node in the list is acquired. From the NEXT LINK command block 2169, the logic flows back to the WHILE ANOTHER LINK decision oval 2165.

A NO result at the WHILE NEXT LINK decision oval 2165, or a YES result at the NEXT WEIGHT BIGGER decision diamond 2167, both lead to an INSERT NODE command block 2171, where the current node is inserted into the list of token weights. The logic then leads to a NEXT NODE command block 2173, where the insertion node pointer is assigned the current node and the token weight list pointer is assigned to the next node following the two smallest weight nodes thus removing the two smallest weight nodes from the list of token weights. The logic then leads back to the WHILE ANOTHER NODE decision oval 2157.

From the WHILE ANOTHER NODE decision oval 2157, the logic leads to a ASSIGN CODE command block 2175, where the branches of the binary tree that has now been constructed are assigned a zero or a one to construct the code for each of the leaf nodes. This command calls a subroutine to be described in conjunction with FIG. 43. The logic then proceeds to an EXIT command block 2177 which returns the subroutine of FIG. 42 to the point in the logic flow from which it was called.

Referring to FIG. 43, the logic flow for the ASSIGN CODE command block 2175 of FIG. 42, which assigns a one to the left sub-tree and a zero to the right sub-tree, or assigns the constructed code to the token, is illustrated. From the ASSIGN CODE command block 2175, the logic flows to a LEAF NODE decision diamond 2179. A NO result causes the logic to flow to a LEFT CHILD command block 2181, where a pointer to the left sub-tree is acquired. The logic then flows to an ASSIGN CODE command block 2175, where a one is assigned to the left sub-tree. The logic then flows to a RIGHT CHILD command block 2183, where a pointer to the right sub-tree is acquired. The logic then flows to an ASSIGN CODE command block 2175, where a zero is assigned to the right sub-tree. The logic then proceeds to an EXIT command block 2185 which returns the subroutine of FIG. 43 to the point in the logic flow from which it was called.

A YES result at the LEAF NODE decision diamond 2179 leads to a SET CODE command block 2187, where the code is assigned to the token in the hash table associated with the leaf node. The logic then again flows to the EXIT command block 2185.

Referring to FIG. 44, the logic flow for the COPY CODE TREE command block 2047 which was previously shown in FIG. 38 is illustrated. From the COPY CODE TREE command block 2047, the logic flows to a PUT SIZE command block 2189, where the size of the code tree is written to the output file. The logic then flows to a PUT NODE command block 2191 which calls a subroutine also shown on FIG. 44 to write the root node of the code tree to the output file. From the PUT NODE command block 2191, the logic flows to an EXIT command block 2193 which returns the COPY CODE TREE subroutine of FIG. 43 to the point in the logic flow from which it was called.

Also in FIG. 44, the logic flow for the PUT NODE command block 2191 is also illustrated. From the PUT NODE command block 2191, the logic flows to a LEAF NODE decision diamond 2195. A NO result causes the logic to flow to a PUT LINK command block 2197, where the distance from the beginning of the code tree to the right sub-tree of the node is written to the output file. The logic then flows to a LEFT CHILD command block 2199, where a pointer to the left sub-tree is acquired, and then to a PUT NODE command block 2191 which calls a subroutine that is shown on FIG. 44 to write the left sub-tree of the node to the output file. The logic then flows to a RIGHT CHILD command block 2201, where a pointer to the right sub-tree is acquired, and then to a PUT NODE command block 2191 which calls a subroutine that is shown on FIG. 44 to write the right sub-tree of the node to the output file. The logic then flows to an EXIT command block 2203 which returns the PUT NODE subroutine to the point in the logic flow from which it was called.

A YES result at the LEAF NODE decision diamond 2195 leads to a PUT STRING command block 2205, where the token string associated with the node is written to the output file. The logic then again flows to the EXIT command block 2203.

Referring to FIG. 45, the logic flow for the PUT CODE command block 2059 of FIG. 38 is illustrated. From the PUT CODE command block 2059, the logic flows to a ADD HASH command block 2031, where the hash table is searched for the token. The logic then flows to a TOKEN FOUND decision diamond 2207. A YES result causes the logic to flow to a WRITE CODE command block 2209, where the code associated with the token is written to the output file. The logic then flows to an EXIT command block 2211 which returns the PUT CODE subroutine of FIG. 45 to the point in the logic flow from which it was called.

A NO result at the TOKEN FOUND decision diamond 2207 leads to a WHILE SINGLETON decision oval 2213. The outlets of oval 2213 are a NO path and a YES path, the YES outlet occurring so long as there is another singleton within the token currently being treated. A NO decision at the WHILE SINGLETON decision oval 2213 leads back to the EXIT command block 2211. A YES decision at the WHILE SINGLETON decision oval 2213 leads to a ADD HASH command block 2215, where the hash table is searched for the singleton. The logic flow then leads to a WRITE CODE command block 2217, where the code associated with the singleton is written to the output file. The logic then flows back to the WHILE SINGLETON Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A battery powered pocket electronic communication system comprising:

a housing;

a circuit board, supported by said housing;

display means supported by said circuit board and said housing, for visually displaying information;

computer means supported by said circuit board for decompressing information from at least one computer chip connected to said computer means, and enabling user selection of said information;

a chip carrier fitted flush to said housing such that when in place the chip carrier forms a portion of said housing, said computer chip fastened to said chip carrier;

a chip socket supported by said circuit board which directly receives said computer chip;

input means supported by said housing and said circuit board for enabling a user to select a portion of said information;

battery power supply means, supported by said circuit board, for powering said display means and said computer means.

2. The pocket electronic communication system recited in claim 1 wherein said housing further comprises:

a first portion supporting said circuit board and said display means; and a second portion slidably engaging said first portion to cover and protect said display means when said pocket electronic communication system is not in use.

3. The pocket electronic communication system recited in claim 2 further comprising:

an activation switch supported by said circuit board;

a projection attached to said second portion of said housing engageable with said activation switch to deactivate the pocket electronic communication system when said second portion of said housing covers said first portion of said housing.

4. The pocket electronic communication system recited in claim 3 where said activation switch is configured to open when said second portion of said housing covers said first portion of said housing.

5. The pocket electronic communication system recited in claim 1 wherein said chip carrier forms is a door fittable over a said first portion of said housing.

6. The pocket electronic communication system system of claim 5 wherein said housing and said door form a closed space, and wherein said closed space carries batteries.

7. The pocket electronic communication system recited in claim 1 wherein said input means further comprises:

an up cursor button switch;

a down cursor button switch;

a menu button switch; and an enter button switch.

8. The pocket electronic communication system recited in claim 1 wherein said display means is a liquid crystal display, back plane illuminated using phased signals.

9. The pocket electronic communication system recited in claim 1 wherein said computer means further comprises:

a programmable logic microprocessor;

an operating system ROM connected to said programmable logic microprocessor;

an application specific integrated circuit connected to said programmable logic microprocessor and said operating system ROM; and an information ROM connected to said programmable logic microprocessor, said operating system ROM, and to said application specific integrated circuit.

10. The pocket electronic communication system system of claim 9 further comprising:

a chip carrier fittably engageable with said housing and supporting said information ROM;

a chip socket carried by said circuit board and wherein said information ROM fits within said chip socket when said chip carrier is fittably engaged with said housing.

11. The pocket electronic communication system recited in claim 9 wherein said application specific integrated circuit further comprises:

a general purpose static RAM; and a static RAM used for storing display information.

12. The pocket electronic communication system recited in claim 1 wherein said computer means further comprises means for transferring computational control of said computer means to at least one of the following command handlers: a startup sequence, a menu, a message, a display clock, a screen item list, a line scroll data, a set clock, a end date warning, a begin date warning, a access authorized, a keyed data, a end date expired, a end date override, a LCD contrast, a line scroll item list, a compresses keyed data, a compressed screen, a compressed line data, a trivia game, a packed keyed data and a recall saved screen.

13. The pocket electronic communication system system of claim 1 wherein said computer means further comprises a replaceable information ROM.

14. The pocket electronic communication system system of claim 13 wherein said replaceable information ROM contains compressed data and wherein said computer means further comprises means for decompressing said data.

\* \* \* \* \*